(12) United States Patent
Angeletti et al.

(10) Patent No.: US 9,374,145 B2
(45) Date of Patent: Jun. 21, 2016

(54) BEAM-FORMING NETWORK FOR AN ARRAY ANTENNA AND ARRAY ANTENNA COMPRISING THE SAME

(71) Applicant: Agence Spatiale Europeenne, Paris (FR)

(72) Inventors: Piero Angeletti, Lisse (NL); Giovanni Toso, Haarlem (NL); Daniele Petrolati, Leiden (NL)

(73) Assignee: Agence Spatiale Europeenne, Paris (FR)

( * ) Notice: Subject to any disclaimer, the term of this patent is extended or adjusted under 35 U.S.C. 154(b) by 0 days.

(21) Appl. No.: 14/646,753

(22) PCT Filed: Nov. 26, 2012

(86) PCT No.: PCT/IB2012/002977
§ 371 (c)(1),
(2) Date: May 22, 2015

(87) PCT Pub. No.: WO2014/080240
PCT Pub. Date: May 30, 2014

(65) Prior Publication Data
US 2015/0341098 A1 Nov. 26, 2015

(51) Int. Cl.
*H04K 1/10* (2006.01)
*H04L 27/28* (2006.01)
(Continued)

(52) U.S. Cl.
CPC ............... *H04B 7/0617* (2013.01); *H01Q 3/40* (2013.01); *H01Q 25/00* (2013.01); *H04B 7/0691* (2013.01)

(58) Field of Classification Search
CPC .. H04B 7/0417; H04B 7/0469; H04B 7/0626; H01Q 1/246; H01Q 21/28; H01Q 25/00

USPC .................... 375/260, 267; 343/757, 853, 856
See application file for complete search history.

(56) References Cited

U.S. PATENT DOCUMENTS 3,255,450 A    6/1966  Butler
3,736,592 A *  5/1973  Coleman .............. H01Q 3/2647
                                                       342/370

(Continued)

FOREIGN PATENT DOCUMENTS

EP    2 090 995 A1    8/2009
EP    2 296 225 A1    3/2011
(Continued)

OTHER PUBLICATIONS

International Search Report and Written Opinion for Application No. PCT/IB2012/002977 dated Jul. 24, 2013.
(Continued)

*Primary Examiner* — Freshteh N Aghdam
(74) *Attorney, Agent, or Firm* — Alston & Bird LLP

(57) ABSTRACT

A beam-forming network for an emitting array antenna having at least $N_B$ input ports connected to respective beam ports of the beam-forming network and at least $N_{OSA}>1$ output ports, for associating to each output port a linear combination of input signals from respective input ports; a set of at least $N_{OSA}$ lossless single-mode networks, each having an input port connected to a respective output port of multi-beam network and at least $N_{NOSA}^{OSA}>1$ output ports, for associating to each output port a signal obtained by weighting an input signal from the input port; and a set of at least $N_{NOSA} \geq N_{NOSA}^{OSA}$ lossless multi-mode networks, each having at least $N_{NOSA}^{OSA} N_{OSA}^{NOSA}$ input ports, each one connected to an output port of a respective single-mode network, and at least $N_E^{NOSA}>1$ output ports connected to respective antenna ports of the beam-forming network, for associating to each output port a linear combination of input signals from respective input ports.

13 Claims, 52 Drawing Sheets

(51) Int. Cl.
H04B 7/06 (2006.01)
H01Q 3/40 (2006.01)
H01Q 25/00 (2006.01)

(56) References Cited

U.S. PATENT DOCUMENTS

| | | | |
|---|---|---|---|
| 3,938,160 A | | 2/1976 | Mailloux et al. |
| 4,228,436 A | | 10/1980 | DuFort |
| 4,257,050 A | | 3/1981 | Ploussios |
| 4,692,768 A | * | 9/1987 | Becavin .................. H01Q 3/40 342/368 |
| 5,179,386 A | * | 1/1993 | Rudish .................... G01S 7/021 342/371 |
| 5,812,088 A | | 9/1998 | Pi et al. |
| 6,057,806 A | * | 5/2000 | Lopez .................... H01Q 1/246 343/890 |
| 6,559,797 B1 | | 5/2003 | Chang |
| 7,705,779 B2 | * | 4/2010 | Goldberg ................ H01Q 3/40 342/373 |
| 7,797,816 B2 | | 9/2010 | Toso et al. |
| 2004/0160374 A1 | * | 8/2004 | Johansson ............. H01Q 1/246 343/757 |
| 2011/0102263 A1 | | 5/2011 | Angeletti |

FOREIGN PATENT DOCUMENTS

| | | |
|---|---|---|
| WO | WO 2007/103589 A2 | 9/2007 |
| WO | WO 2009/013527 A1 | 1/2009 |

OTHER PUBLICATIONS

Bradley, A. G., *Methods of Selecting Receive Beam Positions in Multiple Beam Forming Antenna Systems*, IEEE Transactions on Antennas and Propagation, vol. AP-14, No. 3, (May 1, 1966) 260-266.
Wong, M. S. et al., *A Multiple Beam Antenna With Simultaneous Independent Beams Over Limited Scan Sectors*, Antennas and Propagation Society International Symposium (Oct. 15, 1976) 314-319.
Angeletti, P., *Simple Implementation of Vectorial Modulo Operation Based on Fundamental Parallelepiped*, Electronics Letters, vol. 48, No. 3, (Feb. 2, 2012) 159-160.
Bernardini, G. et al., *A New Technique for Twiddle Factor Elimination in Multidimensional FFT's*, IEEE Transactions on Signal Processing, vol. 42, No. 8 (Aug. 1994) 2176-2178.
Betancourt, D. et al., *Bea Forming Networks Design Using Bi-Dimensional Double Fast Fourier Transforms*, Proceedings of the 26$^{th}$ AIAA International Communications Satellite Systems Conference (ICSSC 2008), San Diego, CA, USA (Jun. 10-12, 2008).

Borgiotti, G., *Degrees of Freedom of an Antenna Scanned in a Limited Sector*, IEEE International Symposium (1975) 319-320.
Franchi, P. R. et al., *Theoretical and Experimental Study of Metal Grid Angular Filters for Sidelobe Suppression*, IEEE Transactions on Antennas and Propagation, vol. 31, No. 3, (May 1983) 445-10 450.
Guessoum, A. et al., *Fast Algorithms for the Multidimensional Discrete Fourier Transform*, IEEE Transactions on Acoustics, Speech, and Signal Processing, vol. 34, No. 4 (Aug. 1986), 937-943.
Herd, J. S. et al., *Design Considerations and Results for an Overlapped Sub-Array Radar Antenna*, Proceedings of the 2005 IEEE Aerospace Conference (2005) 1087-1092.
Mailloux, R. J. et al., *A Class of Phase Interpolation Circuits for Scanning Phased Arrays*, IEEE Trans., vol. AP-18 (Jan. 1970) 114-116.
Mailloux, R. J., *An Overlapped Subarray for Limited Scan Application*, IEEE Transactions on Antennas and Propagation, vol. 22, No. 3 (Mar. 1974) 487-489.
Mailloux, R. J. et al., *Grating Lobe Control in Limited Scan Arrays*, IEEE Transactions on Antennas and Propagation, vol. 27, No. 1 (Jan. 1979) 79-85.
Mailloux, R. J., *Synthesis of Spatial Filters With Chebyshev Characteristics*, IEEE Transactions on Antennas and Propagation, vol. 24, No. 2 (Mar. 1976) 174-181.
Mersereau, R. et al., *A Unified Treatment of Cooley-Tukey Algorithms for the Evaluation of the Multidimensional DFT*, IEEE Transactions on Acoustics, Speech, and Signal Processing, vol. 29, No. 9 (Oct. 1981) 1011-1018.
Patton, W., *Limited Scan Arrays*, Phase Array Antennas: Proc. 1970 Phased Array Symposium, A. A. Oliner and G.A. Knittel, Eds. Artech House (1972) 254-270.
Petrolati, P. et al., *Skobelev Network Optimization by Sequential Quadratic Programming*, Electronics Letters, vol. 46, No. 8 (Apr. 2010) 553-554.
Shelton, J. P., *Multiple Feed Systems for Objectives*, IEEE Transactions on Antennas and Propagation, vol. 13 (Nov. 1965) 992-994
Skobelev, S. P., *Analysis and Synthesis of an Antenna Array With Sectoral Partial Radiation Patterns*, Telecommunications and Radio Engineering, vol. 45 (Nov. 1990) 116-119.
Skobelev, S. P., *Methods of Constructing Optimum Phased-Array Antennas for Limited Field of View*, IEEE Antennas Propagation Magazine, vol. 4, No. 2 (Apr. 1998) 39-49.
Stangel, J., *A Basic Theorem Concerning the Electronic Scanning Capabilities of Antennas*, URSI Commission 6, Spring Meeting (Jun. 1974).
Vigano, M. C. et al., *Direct Radiating Arrays With Quasi-Flat-Top Pattern Sub-Arrays*, 29$^{th}$ ESA Antenna Workshop on Multiple Beams and Reconfigurable Antennas, (Apr. 18-20, 2007).

\* cited by examiner

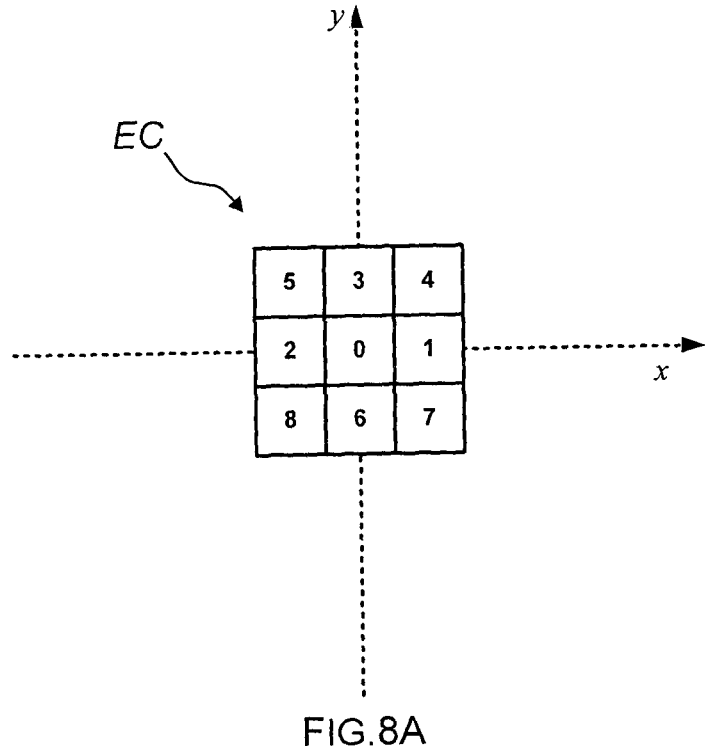

FIG.8A $$\mathbf{M} = \mathbf{D}^{-1}EC$$

$$\mathbf{m}_0 = \begin{bmatrix} 0 \\ 0 \end{bmatrix} \quad \mathbf{m}_1 = \begin{bmatrix} 1 \\ 0 \end{bmatrix} \quad \mathbf{m}_2 = \begin{bmatrix} -1 \\ 0 \end{bmatrix}$$

$$\mathbf{m}_3 = \begin{bmatrix} 0 \\ 1 \end{bmatrix} \quad \mathbf{m}_4 = \begin{bmatrix} 1 \\ 1 \end{bmatrix} \quad \mathbf{m}_5 = \begin{bmatrix} -1 \\ 1 \end{bmatrix}$$

$$\mathbf{m}_6 = \begin{bmatrix} 0 \\ -1 \end{bmatrix} \quad \mathbf{m}_7 = \begin{bmatrix} 1 \\ -1 \end{bmatrix} \quad \mathbf{m}_8 = \begin{bmatrix} -1 \\ -1 \end{bmatrix}$$

FIG.8B

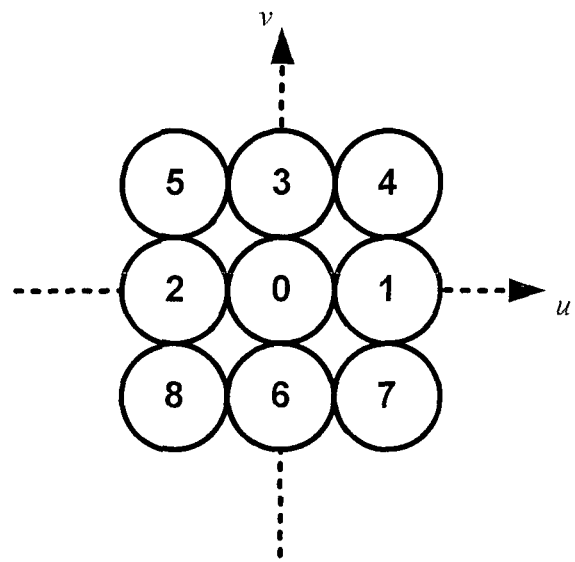

FIG. 9A $$N = M^T = \begin{bmatrix} 3 & 0 \\ 0 & 3 \end{bmatrix}$$

$$k_0 = \begin{bmatrix} 0 \\ 0 \end{bmatrix} \quad k_1 = \begin{bmatrix} 1 \\ 0 \end{bmatrix} \quad k_2 = \begin{bmatrix} -1 \\ 0 \end{bmatrix}$$

$$k_3 = \begin{bmatrix} 0 \\ 1 \end{bmatrix} \quad k_4 = \begin{bmatrix} 1 \\ 1 \end{bmatrix} \quad k_5 = \begin{bmatrix} -1 \\ 1 \end{bmatrix}$$

$$k_6 = \begin{bmatrix} 0 \\ -1 \end{bmatrix} \quad k_7 = \begin{bmatrix} 1 \\ -1 \end{bmatrix} \quad k_8 = \begin{bmatrix} -1 \\ -1 \end{bmatrix}$$

FIG. 9B

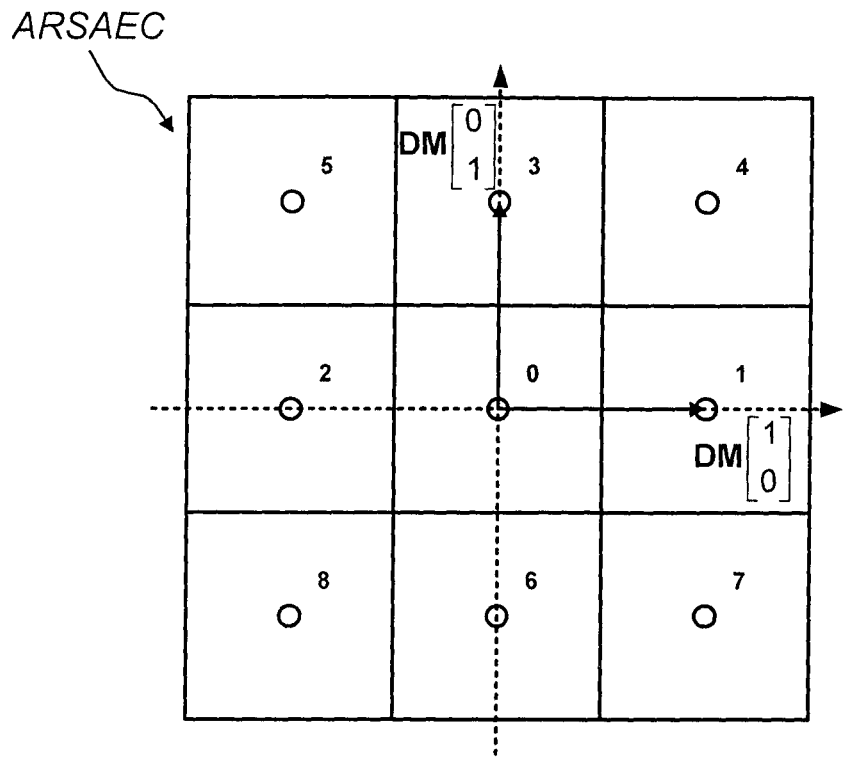

FIG.11A $$Q = (DM)^{-1} ARSAEC$$

$$q_0 = \begin{bmatrix} 0 \\ 0 \end{bmatrix} \quad q_1 = \begin{bmatrix} 1 \\ 0 \end{bmatrix} \quad q_2 = \begin{bmatrix} -1 \\ 0 \end{bmatrix}$$

$$q_3 = \begin{bmatrix} 0 \\ 1 \end{bmatrix} \quad q_4 = \begin{bmatrix} 1 \\ 1 \end{bmatrix} \quad q_5 = \begin{bmatrix} -1 \\ 1 \end{bmatrix}$$

$$q_6 = \begin{bmatrix} 0 \\ -1 \end{bmatrix} \quad q_7 = \begin{bmatrix} 1 \\ -1 \end{bmatrix} \quad q_8 = \begin{bmatrix} -1 \\ -1 \end{bmatrix}$$

FIG. 11B $$Q = (DM)^{-1} ARSAEC$$

$$q_0 = \begin{bmatrix} 0 \\ 0 \end{bmatrix} \quad q_1 = \begin{bmatrix} 1 \\ 0 \end{bmatrix} \quad q_2 = \begin{bmatrix} -1 \\ 0 \end{bmatrix}$$

$$q_3 = \begin{bmatrix} 0 \\ 1 \end{bmatrix} \quad q_4 = \begin{bmatrix} 0 \\ -1 \end{bmatrix}$$

$D = [d_1, d_2]$

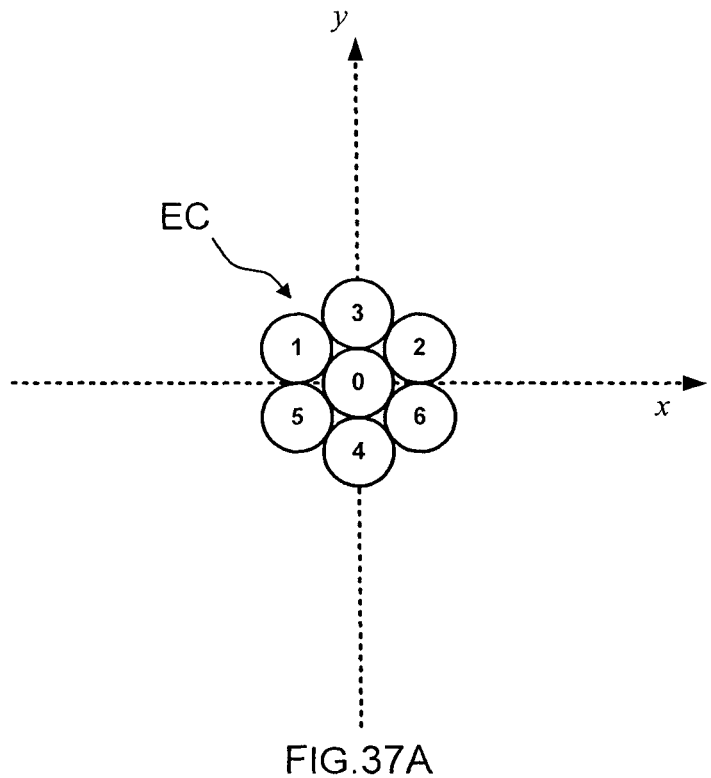

FIG.37A $$\mathbf{M} = \mathbf{D}^{-1}EC$$

$$\mathbf{m}_0 = \begin{bmatrix} 0 \\ 0 \end{bmatrix} \quad \mathbf{m}_1 = \begin{bmatrix} -1 \\ 1 \end{bmatrix} \quad \mathbf{m}_2 = \begin{bmatrix} 1 \\ 0 \end{bmatrix}$$

$$\mathbf{m}_3 = \begin{bmatrix} 0 \\ 1 \end{bmatrix} \quad \mathbf{m}_4 = \begin{bmatrix} 0 \\ -1 \end{bmatrix} \quad \mathbf{m}_5 = \begin{bmatrix} -1 \\ 0 \end{bmatrix}$$

$$\mathbf{m}_6 = \begin{bmatrix} 1 \\ -1 \end{bmatrix}$$

FIG.37B

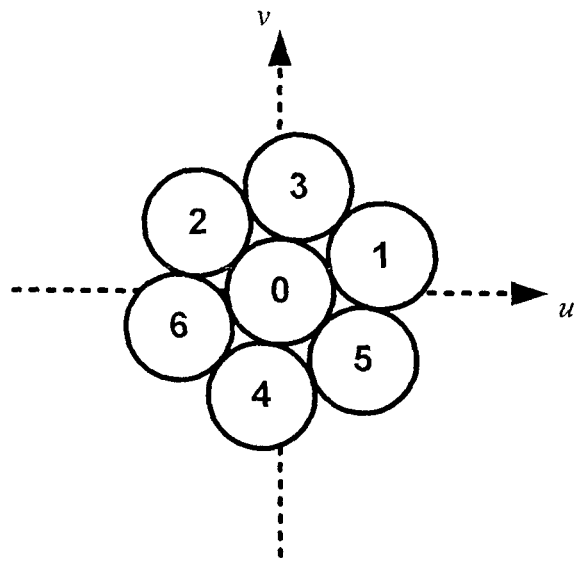

FIG. 38A $$\mathbf{N} = \mathbf{M}^T = \begin{bmatrix} 3 & -2 \\ 2 & 1 \end{bmatrix}$$

$\mathbf{k}_0 = \begin{bmatrix} 0 \\ 0 \end{bmatrix}$ $\qquad \mathbf{k}_1 = \begin{bmatrix} 1 \\ 1 \end{bmatrix}$ $\qquad \mathbf{k}_2 = \begin{bmatrix} -1 \\ 0 \end{bmatrix}$ $\mathbf{k}_3 = \begin{bmatrix} 0 \\ 1 \end{bmatrix}$ $\qquad \mathbf{k}_4 = \begin{bmatrix} 0 \\ -1 \end{bmatrix}$ $\qquad \mathbf{k}_5 = \begin{bmatrix} 1 \\ 0 \end{bmatrix}$ $\mathbf{k}_6 = \begin{bmatrix} -1 \\ -1 \end{bmatrix}$

FIG. 38B $$Q = (DM)^{-1} ARSAEC$$

$q_0 = \begin{bmatrix} 0 \\ 0 \end{bmatrix}$     $q_1 = \begin{bmatrix} 1 \\ 0 \end{bmatrix}$     $q_2 = \begin{bmatrix} 0 \\ 1 \end{bmatrix}$ $q_3 = \begin{bmatrix} -1 \\ 1 \end{bmatrix}$    $q_4 = \begin{bmatrix} -1 \\ 0 \end{bmatrix}$    $q_5 = \begin{bmatrix} 0 \\ -1 \end{bmatrix}$ $q_6 = \begin{bmatrix} 1 \\ -1 \end{bmatrix}$

BEAM-FORMING NETWORK FOR AN ARRAY ANTENNA AND ARRAY ANTENNA COMPRISING THE SAME

FIELD

The invention relates to a beam-forming network for an array antenna, and to an array antenna comprising such a beam-forming network.

The invention applies in particular, but not exclusively, to space-borne emitting or receiving single-beam or multi-beam antennas of the directly radiating array type.

BACKGROUND

Satellite antennas may be split into two large classes: single-beam and multi-beam.

Considering single-beam antennas, a typical target is the development of systems able to scan high gain antenna patterns over limited sectors of space (Limited Field Of View-LFOV-Applications). LFOV applications range from telecommunication satellites (e.g., Low Earth Orbit dynamically reconfigurable coverage), satellite remote sensing (e.g., ScanSARs, Spotlight SARs, Scan On Receive technique) and ground systems (e.g., radars). In scanning systems, the beam pointing directions may be modified essentially in two different ways: either by a mechanical movement or rotation of the antenna or by an electronic scanning.

Typical antennas requiring physical movements for adjusting the beam pointing direction are passive Reflectors, while Direct Radiating Arrays (DRAs) or Array Fed Reflectors (AFRs) represent effective antenna configurations for employing the electronic beam scanning.

DRAs consist of linear or planar arrangements of radiating antenna elements (AEs), while AFRs are constituted by one or more reflectors fed by a linear or planar antenna array. In both DRAs and AFRs, the beam pointing is obtained by electronically varying the phases and/or the amplitudes of the antenna elements constituting the array. This is performed using a beam-forming network (BFN) comprising fixed and/or adjustable weight elements (WEs) i.e. phase shifters and variable attenuators, power dividers and/or combiners, etc.

On the other side, considering multi-beam antennas, one of the most important goals consists in using a multi-beam coverage in order to obtain high gain and support spatial frequency reuse to save power and increase the throughput. Typical multi-beam applications comprise telecommunication satellites generating multi-beam coverage's and ground systems (e.g., ground vehicular and aeronautical telecommunication terminals, antennas for mobile systems base stations, etc.). Like their single-beam counterparts, multi-beam antenna can use passive reflectors or arrays (DRAs, AFRs) provided with suitable BFNs.

In conventional Active Arrays, the number of antenna elements (AEs) coincides exactly with the number of required Weight Elements (WEs). If the antenna is used in transmission, this also coincides with the number of High-Power Amplifiers (HPAs), since each antenna element is provided with a WE (more precisely, one WE per AE is required for each beam to be generated) and a HPA. This implies that the excitation of each AE is controlled by one amplifier and one WE, (together referred to as a Control Element—CE).

DRAs present the most attractive solution among the different antenna configurations in terms of high scanning flexibility and reconfigurability. However, they comprise a much higher number of AEs compared to AFRs and reflectors, resulting in highly complex and bulky BFNs in order to realize the proper set of excitations. This is particularly true in multi-beam applications and when high reconfigurability is required.

The BFN complexity increases with the number of beams $N_B$ and Antenna Elements (AEs) $N_E$. The complexity further increases when beam shape and pointing reconfigurability are required. Indeed, full flexibility would be reached if any beam signal could be independently addressed to any Antenna Element with full freedom of phase and amplitude weighting. This would require $N_B \times N_E$ active Weight Elements.

The placement of the amplifiers before or after the BFN (considering a transmit antenna) depends on the losses and power handling characteristics of the BFN itself. In particular, when the beam signals are single-carrier and/or when $N_B \ll N_E$ it would be preferable to have an amplifier per beam. However, this is not possible if the BFN introduces significant losses.

Basically, there are two sources of losses in any practical BFN design: theoretical and implementation losses. Implementation losses are mainly ohmic, depend on the characteristics of the devices composing the BFN and can be mitigated through accurate device design and by limiting the network complexity. "Theoretical losses" are more fundamental. They derive directly from the Microwave Circuit Theory and may be avoided only imposing precise constraints on the Scattering Matrix of the BFN, which would limit the degrees of freedom in the radiation pattern synthesis, affecting the final radiating performance of the antenna. As a consequence, most BFN are not "lossless" (more precisely: they have theoretical losses in addition to implementation losses). This prevents the use of single-amplifier-per-beam configurations with passive reconfigurable multi-beam BFNs, in favour of active array configurations where the number of amplifiers is equal to the number of antenna elements—see FIG. 1A showing an array AR of antenna element AE, each connected to an individual HPA, all the HPAs being fed by a reconfigurable beam-forming network R-BFN.

Several methods have been proposed in order to reduce the complexity of BFNs, particularly for DRAs. A first approach consists in the use of non regular (sparse) layouts for DRAs and active constrained lens antennas in order to minimize the number of AEs, and therefore of WEs and HPAs ([1], [2]).

Another design method consists in decomposing the array of $N_E$ antenna elements in a number of subarrays $N_{SA}$ (where $N_{SA} \ll N_E$) composed of groups of antenna elements see FIG. 1B. For manufacturability purposes (modularity and scalability) all the sub-arrays are most often exactly identical (composed of $N_E^{SA}$ antenna element) and translationally arranged on a regular Sub-Array Lattice (SAL).

A reconfigurable BFN of an array antenna based on the sub-arraying concept can be advantageously decomposed in a cascade of two simpler BFNs:
- a reconfigurable BFN (R-BFN) comprising $N_B \times N_{SA}$ active weight elements; and
- a fixed passive BFN distributing the signal from each output port of the reconfigurable BFN to a group of Antenna Elements forming a respective Sub-Array (SA).

The sub-arrays can be either disjoined (i.e. non-overlapping—NOSA)—refer to FIG. 1B, or overlapping (OSA), in which case at least some antenna elements belong to several sub-arrays at a time—refer to FIG. 2A and FIG. 2B.

In the Non-Overlapping Sub-Arrays case, the fixed passive BFN reduces to a plurality of identical 1:$N_E^{SA}$ Single Mode Networks (SMNs)—typically comprising only hybrid couplers and fixed phase shifters. Considering that these networks can be realized fulfilling ideal matching and lossless conditions, the HPAs can be moved from the Antenna Elements to the input of the SNMs, thus reducing their number from $N_E$ to $N_E^{SA}$ with evident impact on system cost and complexity (FIG. 1B, where the lossless non-reconfigurable BFN feeding the sub-arrays is designated by reference NOSA-BFN). Unfortunately Non-Overlapped Sub-Array solutions fall short in pattern control and find applications only when severe degradations in sidelobe and grating lobes levels can be accepted.

To overcome the limitations in pattern control typical of Non-Overlapping Sub-Array based architectures, the concept of Overlapping Sub-Arrays (OSA) has been introduced. FIGS. 2A and 2B show OSA architectures with HPAs disposed at the Antenna Elements inputs (2A) and at the output port of the reconfigurable BFN (2B); in the first case, the fixed BFN (OSA-BFN) can be lossy, while the latter case implies that the fixed BFN (OSA-BFN') is lossless.

Some authors investigated the minimum number of control elements achievable using sub-array technique for both linear and planar periodic arrays [1], [4], [5], [6]. Other authors focused their work on the development of appropriated feeding networks aimed at achieving the theoretical goals with low-complexity realizations. A summary of these networks has been presented by Skobelev [6].

Interesting network designs have been carried out by Mailloux et alii [8], [9], [10], [11], [12], [13], DuFort [14], Skobelev [15] and Shelton [17]. More particularly:
    Skobelev [15] analysed a lossless network consisting in power dividers and directional couplers, whose coupling coefficients may be derived by an optimization process. The network, also known as "chessboard network", presents the advantage to be lossless from the point of view of Microwave Circuit Theory. Reference [16] discusses improvements in the radiative performances of the "chessboard network".
    Shelton [17] introduced the concept of Double Transform Network, which consists in using systems able to perform a double Fourier Transform in order to obtain a flat-topped sub-array radiation pattern. Such systems may be realized with constrained networks, lenses and also digitally, preserving the lossless property of the system. Application of the Double Transform method to on-board satellite arrays has been reported in [1].
    DuFort contribution [14] represents another important milestone in the design of beamforming networks for Overlapped Sub-Arrays. It proposes a BFN composed of matched hybrids arranged in cascade, whose coupling coefficients have to be determined in order to approximate an ideal OSA radiation pattern.
    Another interesting contribution to Overlapped Sub-Array techniques is due to Ploussios [19] who designed a BFN architecture valid for both LFOV and multi-beam applications, and also presented an extension to planar arrays.
    Herd [20] proposed an hybrid (analogue/digital) architecture, which is applicable to planar array, however, the BFN doesn't fulfil the lossless property and cannot be used for high power applications.
    Craig and Stirland [21] introduced several embodiments of a new BFN architecture and an optimization method to set the design parameters (distance between radiators, distance between adjacent control points, total number of array radiators and control points . . . ) starting directly from the requirements in terms of radiation properties (Beam-Width, Field Of View, etc.). The proposed BFN may be digital, analogue or hybrid (realized with a combination of digital and analogue devices).

All the approaches mentioned above suffer from at least one of the following drawbacks when used in practical applications:
    Most prior art BFNs (e.g. [14], [15], [17]) are only designed for linear arrays, while most of the practical applications require the use of planar arrays;
    Some prior art BFNs (e.g. [20], [21]) are not lossless from the point of view of the Microwave Circuit Theory, which forces to place the HPAs at the input ports of the antenna elements, and therefore to use $N_E$ of them. Another drawback, in case of HPAs placed at the input ports of the antenna elements, consists in the fact that signals at OSA-OPs may be characterized by different amplitudes (which are set by the BFN), implying that the HPAs have to be operated at a certain Input Power Back-Off (IBO) with respect to saturation. The associated HPA low DC-to-RF power conversion efficiencies, high dissipated powers and need for improved thermal dissipation system put additional stringent constraints to payload feasibility.
    Other prior art BFNs are theoretically lossless but exhibit high complexity (e.g. [14], [15], [19]), and therefore non-negligible implementation losses.

SUMMARY

The invention aims at providing a BFN free from all or at least some of these drawbacks, i.e. suitable for both linear and planar (more generally: bi-dimensional) arrays, theoretically lossless, with a simple structure and a limited number of control elements, yet providing a high level of flexibility and scalability and satisfactory radiation performances. The invention is based on the overlapping sub-arrays concept, and in particular on a hierarchical partition of a regular array, or lattice, of antenna elements. According to the invention, the array is firstly partitioned in a plurality of contiguous non-overlapping clusters of antenna elements (Non-Overlapping Sub-Arrays—NOSAs), and secondly partitioned in a plurality of overlapping sub-arrays (OSAs), each overlapping sub-array comprising a subset of all the non-overlapping sub-arrays. This hierarchical partitioning of the array antenna is mirrored by the BFN architecture, which comprises three layers:
    a Multi-Beam Network (MBN), which provides flexibility and can be reconfigurable and/or lossy, for associating beam ports to overlapping sub-arrays (OSAs) through respective weighting elements;
    a layer of (preferably lossless) Single Mode Networks (SMNs), corresponding to respective OSAs; and
    a layer of (preferably lossless) Multi Mode Networks (MMNs), corresponding to respective non-overlapping sub-arrays (NOSAs).

Each non-overlapping sub-array consists of several antenna elements and belongs to one or more overlapping sub-arrays. Accordingly, each MMN implements the connection between the AEs of the corresponding NOSA and the SMNs corresponding to all the OSAs to which said NOSA belongs.

An object of the present invention is then a beam-forming network for an emitting array antenna, having $N_B \geq 1$ beam ports, each corresponding to an antenna beam, and $N_E > 1$ antenna ports, each corresponding to an antenna element, the network comprising:
    a multi-beam network having at least $N_B$ input ports connected to respective beam ports of the beam-forming network and at least $N_{OSA} > 1$ output ports, for associating to each said output port a linear combination of input signals from respective input ports;

a set of at least $N_{OSA}$ lossless single-mode networks, each having an input port connected to a respective output port of said multi-beam network and at least $N_{OSA}^{NOSA}>1$ output ports, for associating to each said output port a signal obtained by weighting an input signal from said input port; and a set of at least $N_{NOSA}$ lossless multi-mode networks, each having at least $N_{OSA}^{NOSA} N_{NOSA}^{OSA}$ input ports, each one connected to an output port of a respective single-mode network, and at least $N_E^{NOSA}>N_{NOSA}^{OSA}$ output ports connected to respective antenna ports of the beam-forming network, for associating to each said output port a linear combination of input signals from respective input ports.

Another object of the invention is a beam-forming network for a receiving array antenna, having $N_B \geq 1$ beam ports, each corresponding to an antenna beam, and $N_E \geq 1$ antenna ports, each corresponding to an antenna element, the network comprising:

a set of at least $N_{NOSA}>1$ lossless multi-mode networks, each having at least $N_E^{NOSA}>1$ input ports connected to respective antenna ports of the beam-forming network, and at least $N_{NOSA}^{OSA}>1$ $N_{OSA}^{NOSA}>1$ output ports, for associating to each said output port a linear combination of input signals from respective input ports;

a set of at least $N_{OSA}$ lossless single-mode networks, each having at least $N_{NOSA}^{OSA} N_{OSA}^{NOSA}$ input ports connected to respective output ports of respective multi-mode networks and an output port, for associating to said output port a signal obtained by weighting an input signal from said input ports; and a multi-beam network having at least $N_{OSA}$ input ports connected to the output ports of respective single-mode networks and at least $N_B$ output ports connected to respective beam ports of the beam-forming network, for associating to each said output port a linear combination of input signals from respective input ports.

Yet another object of the invention is an array antenna comprising $N_E$ antenna elements and a beam-forming network as described above, whose antenna ports are connected to said antenna elements. In particular, the antenna elements may form a lattice partitioned into identical non-overlapping sub-arrays which, in turn, form an array of sub-arrays which is partitioned into identical overlapping sub-arrays, each of said overlapping sub-arrays being constituted by a plurality of non-overlapping sub-arrays; in this case, all the antenna elements belonging to a same non-overlapping sub-array will be connected to a same multi-mode network; and all the multi-mode network connected to non-overlapping sub-arrays belonging to a same overlapping sub-array will be connected to a same single-mode network.

Particular embodiments of the inventive beam-forming network and array antenna constitute the subject-matter of the dependent claims.

BRIEF DESCRIPTION OF THE DRAWINGS

Additional features and advantages of the present invention will become apparent from the subsequent description, taken in conjunction with the accompanying drawings, which show:

FIG. 8, Geometry (FIG. 8A) and coordinates vectors (FIG. 8B) of the Antenna Elements constituting an Elementary Cell and a Non-Overlapping Sub-Array;

FIG. 9, Geometry (FIG. 9A) and beam-space coordinates vectors (FIG. 9B) of the Beams constituting an Elementary Cell of the Beams Lattice generated by a MD-DFT (Multi-Dimensional Discrete-Fourier Transform) based on the Array Lattice and Sub-Array-Lattice of FIG. 5;

FIG. 11, Geometry (FIG. 11A) and coordinates vectors (FIG. 11B) of the Elementary Cells constituting an Array of Sub-Arrays ARSAEC defined on the lattice of FIG. 5;

FIG. 37, Geometry (FIG. 37A) and coordinates vectors (FIG. 37B) of the Antenna Elements constituting an Elementary Cell and a Non-Overlapping Sub-Array according to the third design example;

FIG. 38, Geometry (FIG. 38A) and beam-space coordinates vectors (FIG. 38B) of the Beams constituting an Elementary Cell of the Beams Lattice generated by a MD-DFT based on the Array Lattice and Sub-Array-Lattice of FIG. 34A;

DETAILED DESCRIPTION

Figure 1A:
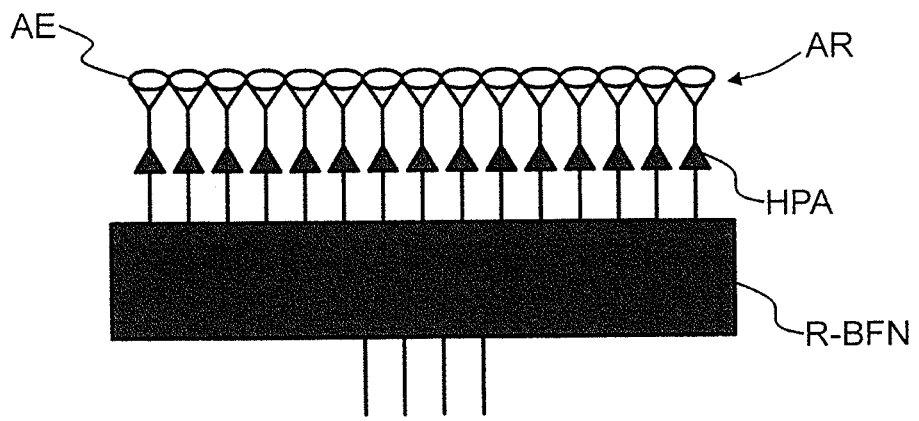
FIG. 1A, an Array Antenna according to the prior art, with an active array configuration where the number of amplifiers equal the number of antenna elements.
Figure 1B:
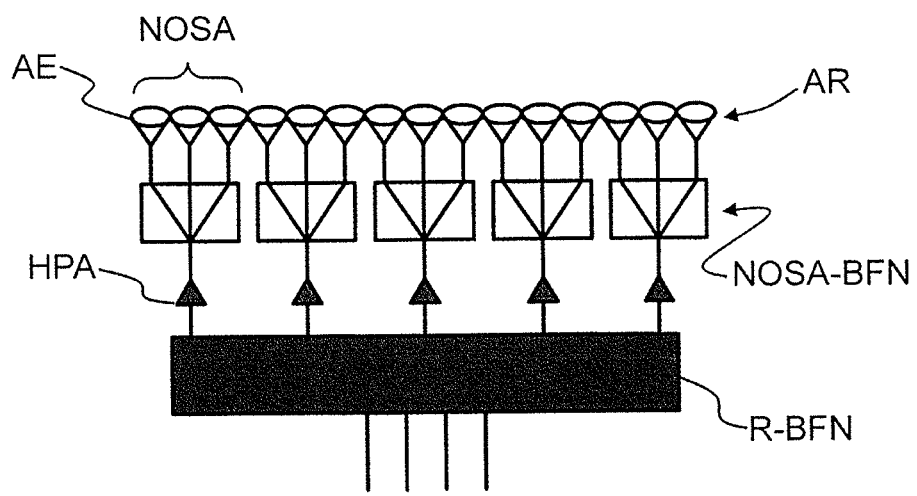
FIG. 1B, an Array Antenna according to the prior art with an active array decomposed in a number of Non-Overlapping Sub-Arrays and the number of amplifiers is equal to the number of Non-Overlapping Sub-Arrays.
Figure 2A:
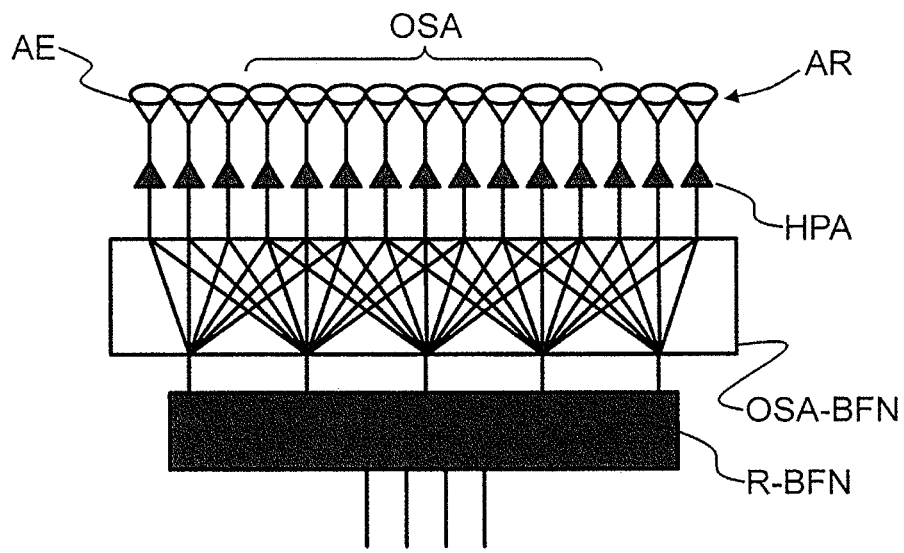
FIG. 2A, an Array Antenna according to the prior art with an active array decomposed in a number of Overlapping Sub-Arrays, in an active array configuration where the number of amplifiers equal the number of antenna elements.
Figure 2B:
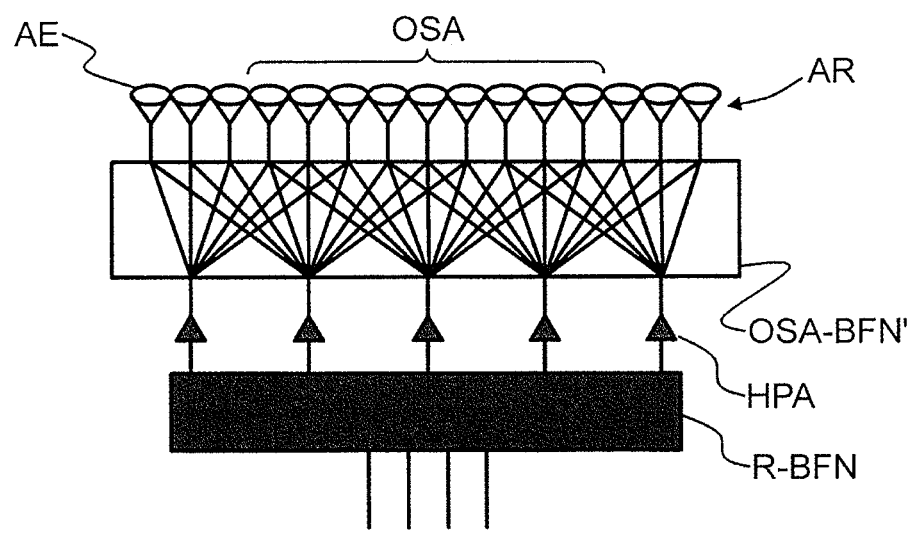
FIG. 2B, an Array Antenna according to the prior art with an active array decomposed in a number of Overlapping Sub-Arrays, in an active array configuration where the number of amplifiers is equal to the number of the Overlapping Sub-Arrays.

The following notation for the mathematical variables and constants will be used: matrices will be represented in bold capital letters and vectors in bold lower-case, italics will be used for real variables, vectors and matrices, and regular non-italics for integer variables, vectors and matrices. The matrix transpose operator will be indicated as $(\ldots)^T$, inverse as $(\ldots)^{-1}$, and inverse transpose as $(\ldots)^{-T}$.

Let a planar array AR be constituted of a set of $N_E$ radiating antenna elements AEs occupying a finite set A of positions on a regular lattice, $$A = \{r_n : n = 0 \ldots (N_E - 1)\} \quad (1)$$

The planar array AR is decomposed in a number $N_{SA}$ (where $N_{SA} < N_E$) of sub-arrays each composed of groups of antenna elements, all the sub-arrays being exactly identical (each composed of $N_E^{SA}$ antenna elements) and translationally arranged on a regular Array of Sub-Arrays (ASA) Lattice.

A Reference Sub-Array RSA is identified by $N_E^{SA}$ antenna elements occupying the finite set RSA of positions, $$RSA = \{r_n^{RSA} : n = 0 \ldots (N_E^{SA} - 1)\} \subseteq A \quad (2)$$

For simplicity of notation the positions of the sub-arrays, which constitute an Array of Sub-Arrays (ASA), are supposed to coincide with a subset of the positions of the planar array, $$ASA = \{r_p^{RSA} : p = 0 \ldots (N_{SA} - 1)\} \subseteq A \quad (3)$$

This assumption is by no mean limitative as all the sub-arrays are assumed to be identical and the Array of Sub-Arrays lattice (SAL) referred to the Sub-Arrays' phase centres can easily obtained by mean of a trivial translation. Assuming identical radiating elements with equal orientation in space and element radiation pattern $EP(\theta, \phi) = EP(u)$, where, $$u = \begin{bmatrix} u \\ v \end{bmatrix} = \begin{bmatrix} \sin\vartheta\cos\varphi \\ \sin\vartheta\sin\varphi \end{bmatrix} \quad (4)$$

and identical sub-arrays, characterized by the same number of radiating elements ($N_E^{SA}$) and the same set of excitations, the Total Array Pattern TAP(u) may be calculated considering the sub-arrays as individual radiating elements, with a Reference Sub-array Radiation Pattern RSAP(u) which accounts for the Element Pattern EP(u) of the antenna elements, the spatial periodicity RSA and excitation $w_n^{RSA}$ of the elements of the reference sub-array, and calculating the Array of Sub-Arrays Factor ASAF(u) which results from the spatial periodicity ASA and excitation $w_p^{ASA}$ of the sub-arrays.

TAP(u) is given by:

$$TAP(u) = RSAP(u)ASAF(u) = \quad (5)$$
$$= EP(u)RSAF(u)ASAF(u)$$

where, $$RSAF(u) = \sum_{r_n \in RSA} w_n^{RSA} \exp(jk_0 u \cdot r_n) \quad (6)$$

$$ASAF(u) = \sum_{r_p \in ASA} w_p^{ASA} \exp(jk_0 u \cdot r_p) \quad (7)$$

Figure 52A:
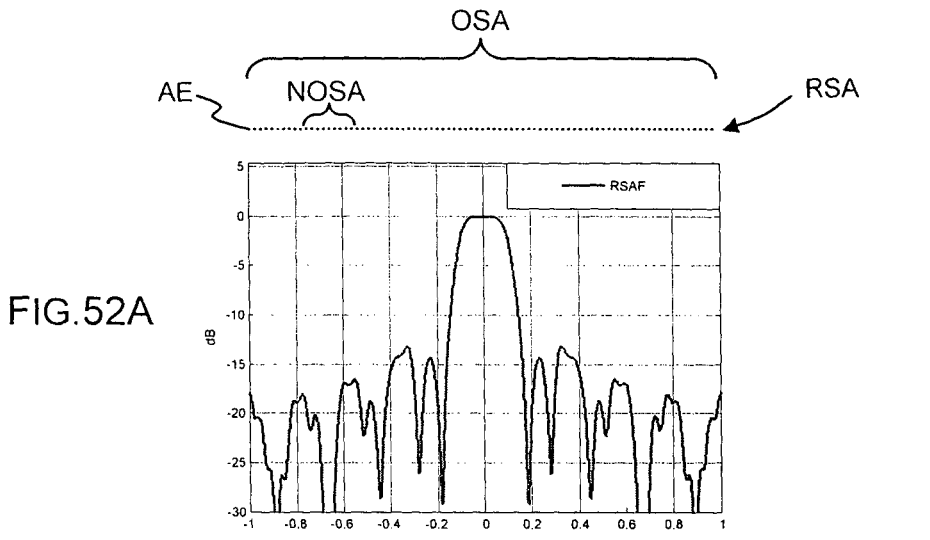
FIGS. 52A, 52B and 52C, plots illustrating the concepts of Reference Sub-Array Factor (RSAF), Array of Sub-Arrays Factor (ASAF) and Total Array Pattern (TAP).
Figure 52B:
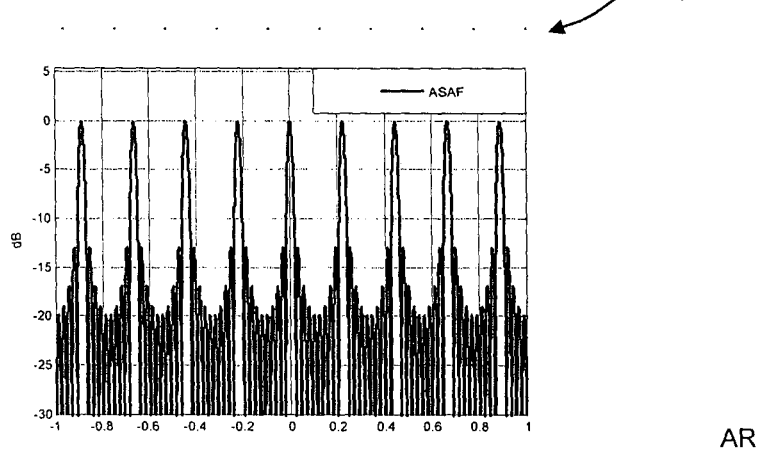
Figure 52C:
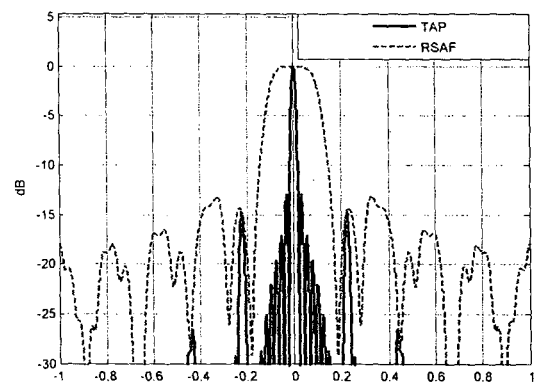

As illustrated on FIGS. 52A and B respectively, the RSAF shows a relatively broad central peak with sidelobes, while the ASAF is a periodical series of narrow peaks with closely-spaced sidelobes. The TAP, given by equation 5 and illustrated by FIG. 52C, has a narrow central peak and lower sidelobes.

In a BFN according to the invention (see FIG. 3) the ASAF is determined by a—possibly reconfigurable—Multi-Beam Network (MBN) while the RSAF is determined by a—preferably lossless—network which, as it will be discussed further is factored into a layer of Single-Mode Networks (SMNs) and a layer of Multi-Mode-Networks (MMNs).

The extension and generalization of the Overlapped Sub-Array techniques to bi-dimensional (as well as volumetric) geometries can be obtained by using a mathematical theory known as "Geometry of Numbers", the relevant results of which will be summarized here below.

Let a planar array AR (see e.g. FIG. 4A) be constituted of a set of $N_E$ radiating antenna elements AEs occupying a finite set A of positions $A = \{r_n : n = 0 \ldots (N_E - 1)\}$ of an infinite Array Lattice, $\Lambda(D)$, whose elements are defined in matrix form as $r = Dn$.

In the simple bi-dimensional case of a planar array, r and n are column vectors with real and integer entries, respectively:

$$r = \begin{bmatrix} r_x \\ r_y \end{bmatrix}; r_x, r_y \in R \text{ and } n = \begin{bmatrix} n_x \\ n_y \end{bmatrix}; n_x, n_y \in Z$$

R and Z being the sets of real and relative numbers, respectively; while D is composed of two non-linearly-dependent real column vectors which constitute the lattice base and define the inter-element spacing, $$D = [d_1, d_2]$$

$$d_1 = \begin{bmatrix} d_{1x} \\ d_{1y} \end{bmatrix}$$

$$d_2 = \begin{bmatrix} d_{2x} \\ d_{2y} \end{bmatrix}$$

$$d_{1x}, d_{1y}, d_{2x}, d_{2y} \in R$$

and $r_n = Dn_n$ expresses the position of a radiating element of the array.

Figure 4A:
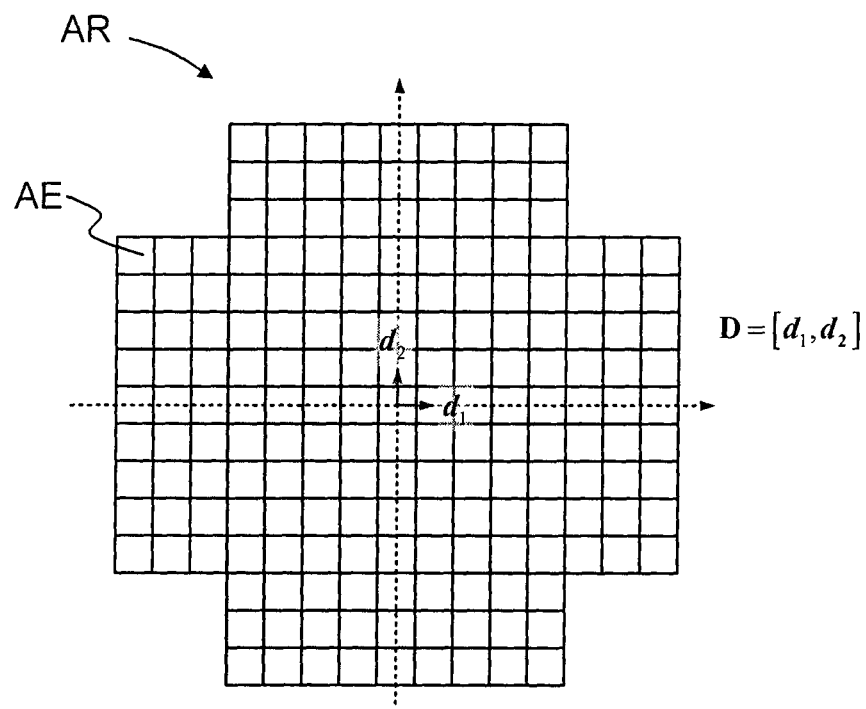
FIG. 4A, an Array Antenna with Antenna Elements disposed on a rectangular lattice, used for a first exemplary embodiment of the invention.
Figure 4B:
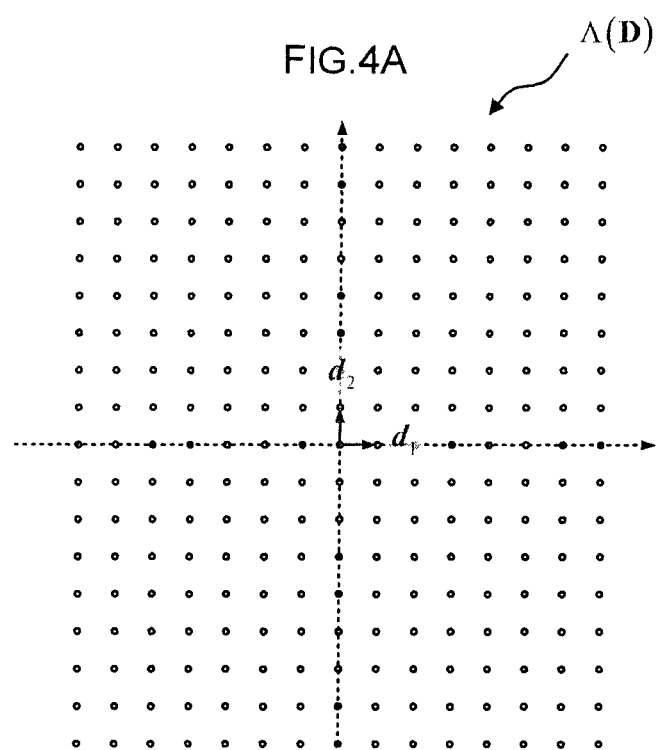
FIG. 4B, the Array Lattice of the Array Antenna of FIG. 4A.

A lattice defined by a base vectors matrix D will be indicated as $\Lambda(D)$ (see e.g. FIG. 4B).

The integer vectors $n_n = D^{-1} r_n$, with $r_n \in A$ form the set N, $$N = D^{-1} A \subset \Lambda(I) \quad (8)$$

Figure 5A:
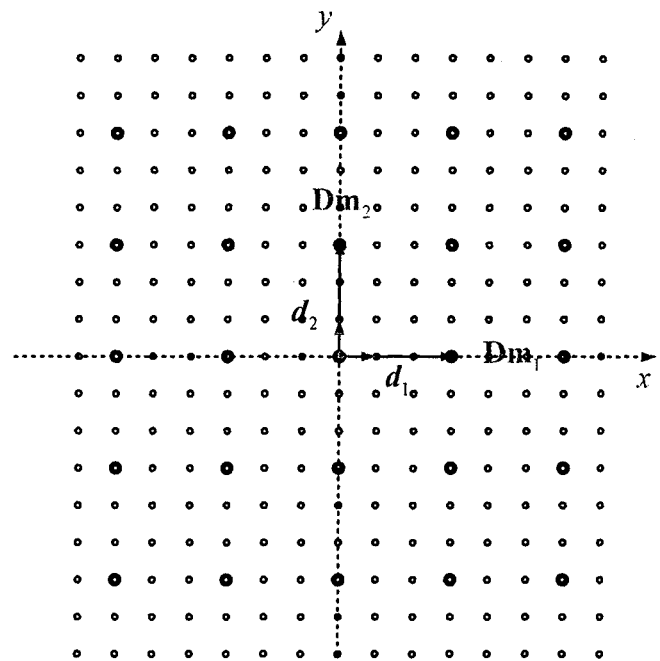
FIG. 5 the relationship between an Array Lattice (FIG. 5A) and a Sub-Array Lattice (FIG. 5B) defined on it.
Figure 5B:
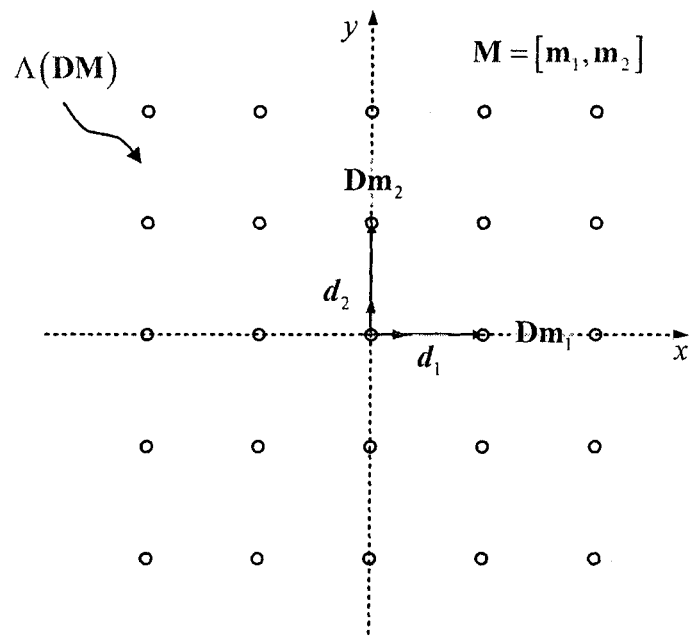

A sub-lattice of $\Lambda(D)$ can be defined by mean of a non-singular integer matrix M and is given by $\Lambda(DM)$. The number $M = |\det M|$ is called the index of $\Lambda(D)$ in $\Lambda(DM)$—see e.g. FIGS. 5A and 5B.

Given a non singular matrix M, it is possible to introduce in $\Lambda(D)$ the vector "modulo DM" operation. Two vectors x and y on the lattice $\Lambda(D)$ are said to be congruent modulo DM if their difference (x−y) belongs to $\Lambda(DM)$ (see the paper by Angeletti [22]). The modulo DM operation is an equivalence relation (i.e. it satisfies reflexive, symmetric and transitive properties) and can be used to induce on $\Lambda(D)$ a set of equivalence classes (also known as "congruency classes" or "cosets") in number equal to |det M|. Each equivalence class is a shifted version of $\Lambda(DM)$.

Figure 6A:
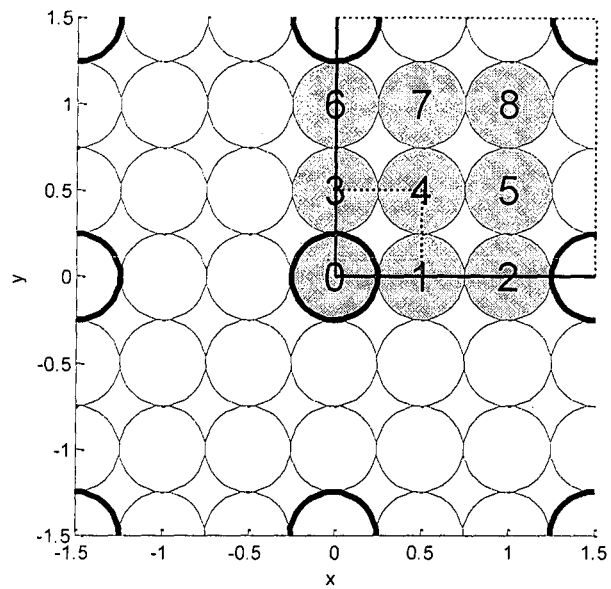
FIG. 6A, an Elementary Cell induced by the Sub-Array Lattice of FIG. 5B on the Array Lattice of FIG. 5A.
Figure 6B:
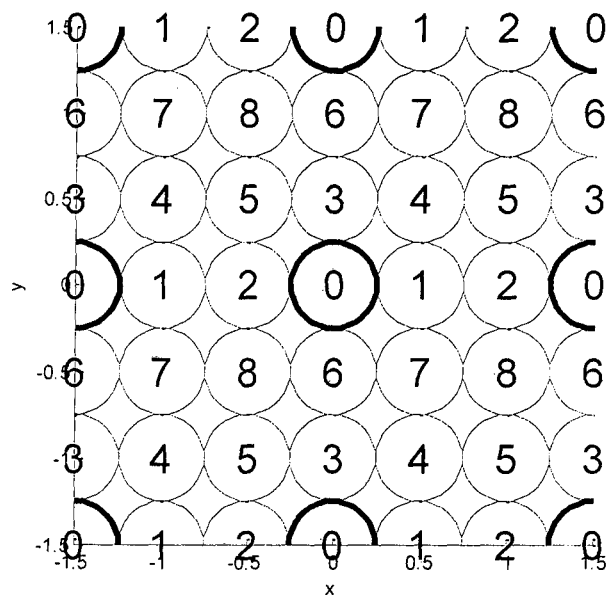
FIG. 6B, a tiling of the Array Lattice of FIG. 5A by means of the Elementary Cell of FIG. 6A.

On FIG. 6B, elements designated by a same number (0, 8) belong to a same equivalence class.

Any two equivalence classes defined with the modulo DM operation are either equal or disjoint; consequently the set of all equivalence classes of $\Lambda(D)$, defined with the modulo DM operation, forms a partition of $\Lambda(D)$: every element of $\Lambda(D)$ belongs to one and only one equivalence class.

A set of "Equivalence Class Representatives", ECR($\Lambda(D)$/mod DM), also known as "Elementary Cell" C(D/DM), is a finite subset of |det M| elements of $\Lambda(D)$ which contains exactly one element from each equivalence class (e.g. refer to FIG. 6A). The equivalence class representative is, in general, not unique.

Tacking |det M| elements of the $\Lambda(D)$ lattice, each from a different equivalence class modulo DM, it is possible to obtain an elementary cell C(D/DM) which has the interesting property of constituting a building block that repeated with the periodicity defined by the matrix DM covers the full infinite lattice $\Lambda(D)$. FIG. 6A shows an exemplary 9-element elementary cell.

Being the selection of C(D/DM) not unique, its construction leaves a high degree of freedom in selecting the elementary cell.

These mathematical properties can be used in a constructive mode to decompose the array A defined on the Array Lattice (AL) $\Lambda(D)$ in sub-arrays defined on the Array of Sub-Arrays Lattice (ASAL) $\Lambda(DM)$, $$A \subset \Lambda(D) \equiv AL \tag{9}$$

$$ASA \subset \Lambda(DM) \equiv ASAL \tag{10}$$

Let us first consider the periodicity properties of the array factor of an array defined on the lattice $\Lambda(D)$. Assuming identical radiating elements with equal orientation in space and element radiation pattern EP(u), the scalar array radiation pattern $f(\theta,\phi)=f(u)$ can be written as:

$$f(u) = \sum_{r_n \in A} w_n EP(u) \exp(jk_0 u \cdot r_n)$$
$$= EP(u) \sum_{r_n \in A} w_n \exp(jk_0 u \cdot r_n)$$

which is the product of the element radiation pattern EP(u) times the array factor $AF(\theta,\phi)=AF(u)$, $$AF(u) = \sum_{r_n \in A} w_n \exp(jk_0 u \cdot r_n) \tag{11}$$

$$f(u) = EP(u)AF(u) \tag{12}$$

Considering that the positions of the radiating elements of the array belong to the lattice $\Lambda(D)$, with $r_n = Dn_n$, it results that the array factor is periodic with respect to the grating lobes lattice $\Lambda(\lambda D^{-T})$. This can be easily proven substituting $u_k = \lambda (D^{-T} k_k)$ in the expression of the array factor translated in $u-u_k$.

$$AF(u - u_k) = \sum_{r_n \in A} w_n \exp(jk_0 (u - u_k) \cdot r_n) = \tag{13}$$
$$= \sum_{r_n \in A} w_n \exp(jk_0 (u - \lambda(D^{-T} k_k)) \cdot (Dn_n)) =$$
$$= \sum_{r_n \in A} w_n \exp(jk_0 u \cdot r_n) \exp(-j2\pi k_k^T n_n) =$$

$$= \sum_{r_n \in A} w_n \exp(jk_0 u \cdot r_n) =$$
$$= AF(u)$$

where we have exploited the definition of the scalar product, $$(D^{-T} k_k) \cdot (Dn_n) = k_k^T D^{-1} Dn_n = k_k^T n_n \tag{14}$$

as well as the fact that having $k_k$ and $n_n$ integer entries, $\exp(-j2\pi k_k^T n_n)$ results to be always equal to unit.

The result leads to an interesting interpretation:

the periodicity matrix D relevant to the Array Lattice AL normalized to the wavelength $\lambda$, $$\Lambda\left(\frac{1}{\lambda}D\right),$$

defines the reciprocal lattice $\Lambda(\lambda D^{-T})$ corresponding to the positions of the grating lobes generated by the array lattice AL;

similarly, the periodicity matrix DM relevant to the Array of Sub-Arrays Lattice ASAL, normalized to the wavelength $\lambda$, $$\Lambda\left(\frac{1}{\lambda}DM\right),$$

defines the reciprocal lattice $\Lambda(\lambda(DM)^{-T})$ corresponding to the positions of the grating lobes generated by the array of sub-arrays lattice ASAL.

Figure 7A:
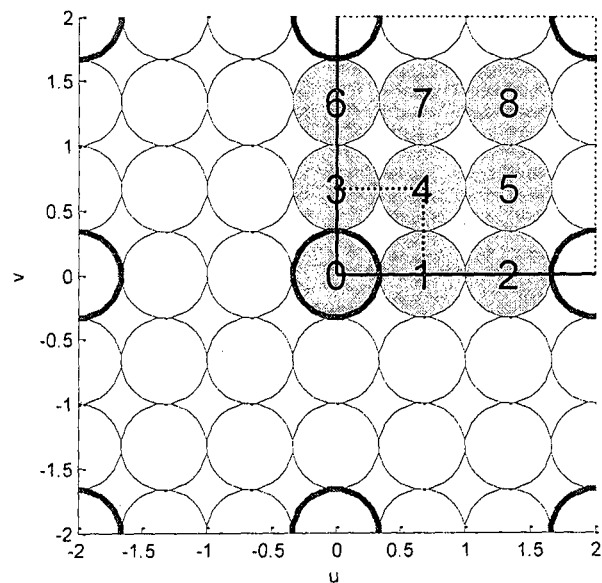
FIG. 7A, an Elementary Cell of the Beams Lattice generated by a MD-DFT based on the Array Lattice and Sub-Array-Lattice of FIG. 5A.
Figure 7B:
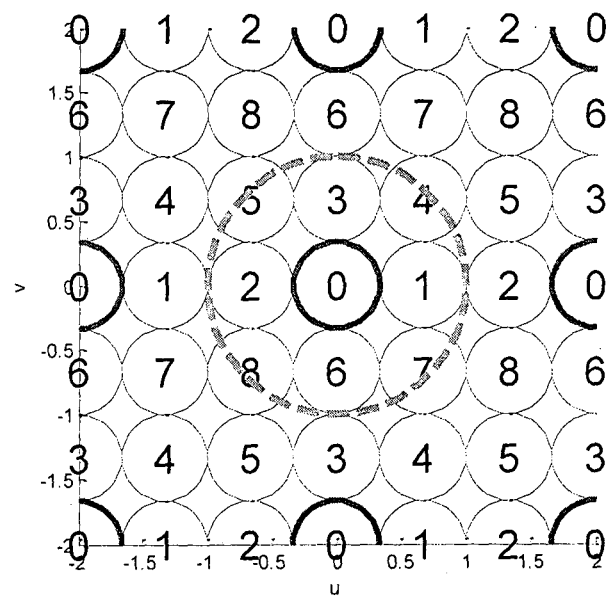
FIG. 7B, Grating lobes of the Beams Lattice of FIG. 7A.

FIGS. 7A and 7B show the lattice of grating lobes of the sub-array of FIG. 6A. The sub-lattice of grating lobes relevant to the Array Lattice of FIG. 6A are shown in bold, and numbers 0-8 identify equivalence classes of grating lobes, defined in the same way as the equivalence classes of the antenna elements. In particular, FIG. 7A shows an elementary cell of the grating lobes relevant to the sub-array of FIG. 6A. On FIG. 7B, the circle defined by $u^2+v^2=1$ separates the "visible" part of the grating lobe lattice (inner part) from the "reactive" part of said lattice, which is not radiated.

According to the sub-array approach, the number of active control elements is equal to the number of sub-arrays $N_{SA}$, but the reduction in the number of control elements (from $N_E$ to $N_{SA}$) implies having a larger periodicity due to the sub-array lattice which leads to the appearance of undesired Grating Lobes (GL) in the ASAF which can be reduced by appropriate design of the SAP.

In order to avoid the presence of grating lobes in the Total Array Pattern, the ideal Sub-Array Pattern (supposing identical Sub-Arrays) should have a flat response in the desired Field of View (FOV) and zero outside. In addition, the Field of View FOV should correspond to a sub-set of the Voronoi region of the lattice $\Lambda(\lambda(DM)^{-T})$ defined by the grating lobes of the Sub-Array Lattice.

This extension covers and generalizes the linear array case where the ideal Sub-Array Pattern should exhibit a Rectangular shape whose width depends on the sub-array spacing $d_x M$. In practice the ideal pattern is approximated at best with a real one as flat as possible between $$u_0 - \frac{1}{2}\frac{\lambda}{D} \text{ and } u_0 + \frac{1}{2}\frac{\lambda}{D}$$

and exhibiting side fronts as steep as possible.

An optimal array design jointly exploits the element pattern, the array elements lattice $\Lambda(D)$ and the Sub-Array design (including the definition of the Array of Sub-Arrays Lattice $\Lambda(DM)$) with the twofold objective of reducing the number of control elements and suppressing the grating lobes of the Array of Sub-Arrays Factor in a desired Grating-Lobes Free Zone (GLFZ) outside of the Field of View (FOV).

Figure 51:
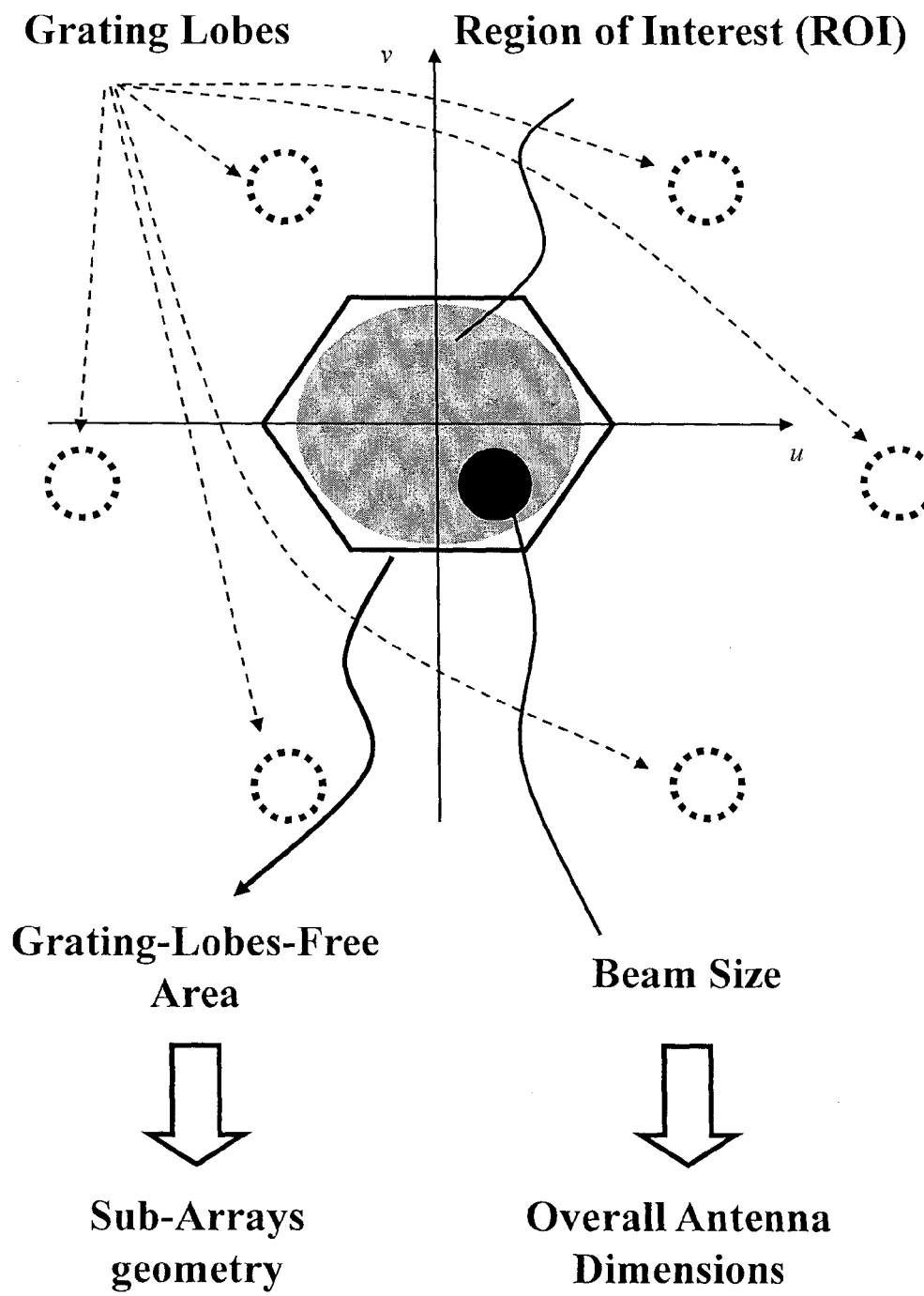
FIG. 51, a scheme illustrating the radiation requirement of an antenna according to the invention.

This is illustrated by FIG. 51, which also reminds that, while the grating lobe structure is dictated by the sub-array geometry, the minimum beam size depends on the overall antenna dimensions.

The periodicity matrix DM of the Array of Sub-Arrays Lattice $\Lambda(DM)$ allows to partition the array elements in equivalence classes by mean of the vectorial modulo DM operation and to define a Non Overlapping Sub-Array (NOSA) corresponding to an Elementary Cell C(D/DM). The Non Overlapping Sub-Array is composed of $N_E^{NOSA} \leq M = |\det M|$ elements of $\Lambda(D)$ and contains at most one element from each equivalence class.

The whole array AR can be constructed by replicating the Elementary Cell EC=C(D/DM) on the Array of Sub-Arrays Lattice $\Lambda(DM)$. The elements of an array constructed this way are automatically partitioned into a number of equivalence classes corresponding to the Elementary Cell.

The radiating antenna elements AE of the Non-Overlapping Sub-Array occupy a set of positions NOSA on the Array Lattice $\Lambda(D)$ which correspond to the Elementary Cell EC=C(D/DM) or to a subset of it:

$$\text{NOSA} = \{r_m^{NOSA} : m=0 \ldots (N_E^{NOSA}-1)\} \subseteq \equiv C(D/DM) \subset \Lambda(D) \tag{15}$$

For simplicity of notation we assume that NOSA=EC. This hypothesis does not limit the generality of the description and of the synthesis, as the condition $N_E^{NOSA} = M = N_E^{EC}$ will be shown to be necessary to fulfil a lossless condition of the beamforming network associated to the Non-Overlapping Sub-Array.

Integer notations can be obtained introducing the integer vectors $m = D^{-1} r_m$ with $m \in M$ $$M = C(I/M) = D^{-1} C(D/DM) \tag{16}$$

The Elementary Cells (ECs) needed to cover the array form the set of positions indicated in the following as Array of Elementary Cells (AEC) which corresponds to a subset of the Array of Sub-Arrays Lattice $\Lambda(DM)$, and include the set of positions of Array of Sub-Arrays (ASA)

$$\text{ASA} \subseteq \text{AEC} \subseteq \Lambda(DM) \tag{17}$$

$$\text{AEC} = \{r_l^{AEC} : l=0 \ldots (N_{EC}-1)\} \subseteq \Lambda(DM) \tag{18}$$

An equivalent integer notation can be obtained also for these sets introducing the integer vectors $l = (DM)^{-1} r_l^{AEC}$ with $l \in L$, and $p = (DM)^{-1} r_p^{ASA}$ with $p \in P$.

$$L = (DM)^{-1} \text{AEC} \tag{19}$$

$$P = (DM)^{-1} \text{ASA} \tag{20}$$

The index l allows numbering each Elementary Cell constituting the array. As a consequence, the position of a generic element of the array is completely defined by a pair of indexes:
the first, l, identifies a unique Elementary Cell.
the second, m, identifies the antenna equivalence class and the position of the element within an Elementary Cell.

$$\begin{aligned} r_{l,m} &\in A \\ r_{l,m} &= D(Ml + m) \quad m \in M \\ & \quad l \in L \end{aligned} \tag{21}$$

or equivalently, $$\begin{aligned} n_{l,m} &\in N \\ n_{l,m} &= Ml + m \quad m \in M \\ & \quad l \in L \end{aligned} \tag{22}$$

A Reference Sub-Array (RSA) is composed of $N_E^{SA}$ antenna elements disposed on $N_{EC}^{SA}$ Elementary Cells.

$$\text{RSA} = \{r_n^{RSA} : n=0 \ldots (N_E^{SA}-1)\} \subseteq A \tag{23}$$

The equivalent integer vector set $n = D^{-1} r_n^{RSA}$ with $n \in \tilde{N}$ is, $$\tilde{N} = D^{-1} \text{RSA} \subseteq N \tag{24}$$

The set of $N_{EC}^{SA}$ integer vectors identifying the Elementary Cells forming the Reference Sub-Array (RSA) will be indicated as Q, with its integer vectors $q \in Q \subset L$ $$\text{ARSAEC} = \{r_q^{ARSAEC} : q=0 \ldots (N_{EC}^{SA}-1)\} \subset \text{AEC} \subset \Lambda(DM) \tag{25}$$

The index q allows numbering each Elementary Cell (EC) constituting the Reference Sub-Array (RSA). Similarly to previous discussions, the position of a generic element of the Reference Sub-Array (RSA) is completely defined by a pair of indexes:
the first, q, identifies a unique Elementary Cell within the Reference Sub-Array (RSA)
the second, m, identifies the antenna equivalence class and the position of the element within an Elementary Cell.

$$\begin{aligned} r_{q,m} &\in \text{RSA} \\ r_{q,m} &= D(Mq + m) \quad m \in M \\ & \quad q \in Q \end{aligned} \tag{26}$$

or equivalently, $$\begin{aligned} n_{q,m} &\in \tilde{N} \\ n_{q,m} &= Mq + m \quad m \in M \\ & \quad q \in Q \end{aligned} \tag{27}$$

These notations allow a Cartesian indexing of the elements of the array A as well as of the Reference Sub-Array RSA.

The Reference Sub-Array excitations can now be written as $$\begin{aligned} n &\in \tilde{N} \\ w_n^{RSA} &= w_{Mq+m}^{RSA} \quad m \in M \\ & \quad q \in Q \end{aligned} \tag{28}$$

and the Reference Sub-Array Factor, $$RSAF(u) = \sum_{n \in \tilde{N}} w_n^{RSA} \exp(jk_0 u \cdot Dn) = \qquad (29)$$

$$= \sum_{q \in Q} \sum_{m \in M} w_{Mq+m}^{RSA} \exp(jk_0 u \cdot D(Mq+m))$$

The excitations of the overall array obtained feeding a single sub array with index p will be indicated as $w_{n|p}^{SA}$.

It is worth noting that the excitations of the Reference Sub-Array correspond to the reference coordinate centre of the Array of Sub-Array $r_0^{ASA}=0$ and p=0.

Considering that $Q \subset L$ and that the Sub-Array excitations are not defined outside Q (i.e. on L\Q, where the backslash indicates the relative complement of Q in L, also known as the set-theoretic difference, the set of elements in L, but not in Q), we can obtain the equivalent excitations of the Reference Sub-Array referred to the overall array by mean of zero padding, $$w_{n|0}^{SA} = \delta_{l \in Q} w_{Ml+m}^{RSA} = \begin{cases} w_{Ml+m}^{RSA} & l \in Q; m \in M \\ 0 & l \in L \backslash Q; m \in M \end{cases} \qquad (30)$$

A Sub-Array translated to $r_p^{ASA}$ is defined on the Array of Elementary Cells, $$Q_p = Q + p = \qquad (31)$$

$$= \{(q+p): q \in Q\} =$$

$$= (DM)^{-1}\{(r_q + r_p^{ASA}): q = 0 \ldots (N_{EC}^{SA} - 1)\}$$

The excitations of a Sub-Array translated in $r_p^{ASA}$ is, with $p=(DM)^{-1}r_p^{ASA}$, $$w_{n|p}^{SA} = \delta_{(l-p) \in Q} w_{M(l-p)+m}^{RSA} = \begin{cases} w_{M(l-p)+m}^{RSA} & (l-p) \in Q; m \in M \\ 0 & (l-p) \in L \backslash Q; m \in M \end{cases} \qquad (32)$$

$$w_{n|p}^{SA} = w_{n-Mp|0}^{SA} \qquad (33)$$

To fulfil the lossless condition, the Sub-Array excitations must satisfy a mutual orthonormality equation $$\sum_{n \in N} w_{n|p_1}^{SA} (w_{n|p_2}^{SA})^* = \delta_{p_1, p_2} = \delta_{p_1, p_2} \qquad (34)$$

The $p_1$-th and $p_2$-th Sub-Arrays overlap on a number of Elementary Cells whose indexes correspond to the subset of the Array of Elementary Cells, $l \in (Q+p_1) \cap (Q+p_2)$. The orthonormality condition can be reformulated as, $$\sum_{n \in N} w_{n|p_1}^{SA} (w_{n|p_2}^{SA})^* = \sum_{l \in Q} \sum_{m \in M} \delta_{(l-p_1) \in Q} w_{M(l-p_1)+m}^{RSA} \delta_{(l-p_2) \in Q} \qquad (35)$$

$$(w_{M(l-p_2)+m}^{RSA})^* =$$

$$= \sum_{l \in (Q+p_1) \cap (Q+p_2)} \sum_{m \in M} w_{M(l-p_1)+m}^{RSA} (w_{M(l-p_2)+m}^{RSA})^* =$$

$$= \sum_{l \in Q \cap (Q+\Delta p)} \sum_{m \in M} w_{Ml+m}^{RSA} (w_{M(l+\Delta p)+m}^{RSA})^*$$

where it is introduced the change of variables, $\Delta p = p_2 - p_1$, $l' = l - p_1$.

Considering the translational property of the Sub-Array excitations, the complex scalar product of the different excitations assumes the form of a complex autocorrelation. The orthonormality of the Sub-Arrays, and thus their lossless realisability, corresponds to imposing that the complex spatial autocorrelation of Sub-Array excitations is periodically nullified with a period equal to the Array of Sub-Array Lattice periodicity.

$$\sum_{n \in N} w_{n|p}^{SA} (w_{n|(p+\Delta p)}^{SA})^* = \sum_{l \in Q \cap (Q+\Delta p)} \sum_{m \in M} w_{Ml+m}^{RSA} (w_{M(l+\Delta p)+m}^{RSA})^* = \delta_{\Delta p} \qquad (36)$$

Considering this decomposition we can split the excitations in blocks corresponding to different elementary cells, $$w_{Mq+m}^{RSA} = b_q c_{m|q} \quad m \in M; q \in Q \qquad (37)$$

with $c_{m|q}$ satisfying the normalization condition, $$\sum_{m \in M} c_{m|q} c_{m|q}^* = 1 \ \forall q \in Q \qquad (38)$$

The lossless condition becomes, $$\sum_{n \in N} w_{n|p}^{SA} (w_{n|(p+\Delta p)}^{SA})^* = \sum_{l \in Q \cap (Q+\Delta p)} \sum_{m \in M} w_{Ml+m}^{RSA} (w_{M(l+\Delta p)+m}^{RSA})^* = \qquad (39)$$

$$= \sum_{l \in Q \cap (Q+\Delta p)} \sum_{m \in M} b_l c_{m|l} b_{l+\Delta p}^* c_{m|l+\Delta p}^* =$$

$$= \sum_{l \in Q \cap (Q+\Delta p)} b_l b_{l+\Delta p}^* \sum_{m \in M} c_{m|l} c_{m|l+\Delta p}^*$$

Let us now assume that, by construction, the Sub-Array excitations on each Elementary Cell satisfy a mutual orthonormality condition $$\sum_{m \in M} c_{m|q_1} c_{m|q_2}^* = \delta_{q_1 q_2} \ \forall \ q_1, q_2 \in Q \qquad (40)$$

The lossless condition is satisfied, $$\sum_{l \in Q \cap (Q+\Delta p)} b_l b_{l+\Delta p}^* \sum_{m \in M} c_{m|l} c_{m|l+\Delta p}^* = \sum_{l \in Q \cap (Q+\Delta p)} b_l b_{l+\Delta p}^* \delta_{\Delta p} = \qquad (41)$$

$$= \delta_{\Delta p} \sum_{l \in Q} b_l b_l^* = \delta_{\Delta p}$$

with the additional normalization condition on $b_q$, $$\sum_{q \in Q} b_q b_q^* = 1 \tag{42}$$

To satisfy the mutual orthonormality condition of the Sub-Array excitations on each Elementary Cell, the number of Elementary Cells composing a Sub-Array $N_{EC}^{SA}$ must not exceed the number of elements per Elementary Cell $N_E^{EC}$ (this condition derives from the fact that the number of equations $N_{EC}^{SA}$ must not exceed the number of independent variables $N_E^{EC}$).

$$N_{EC}^{SA} \leq N_E^{EC} = M \tag{43}$$

Figure 3:
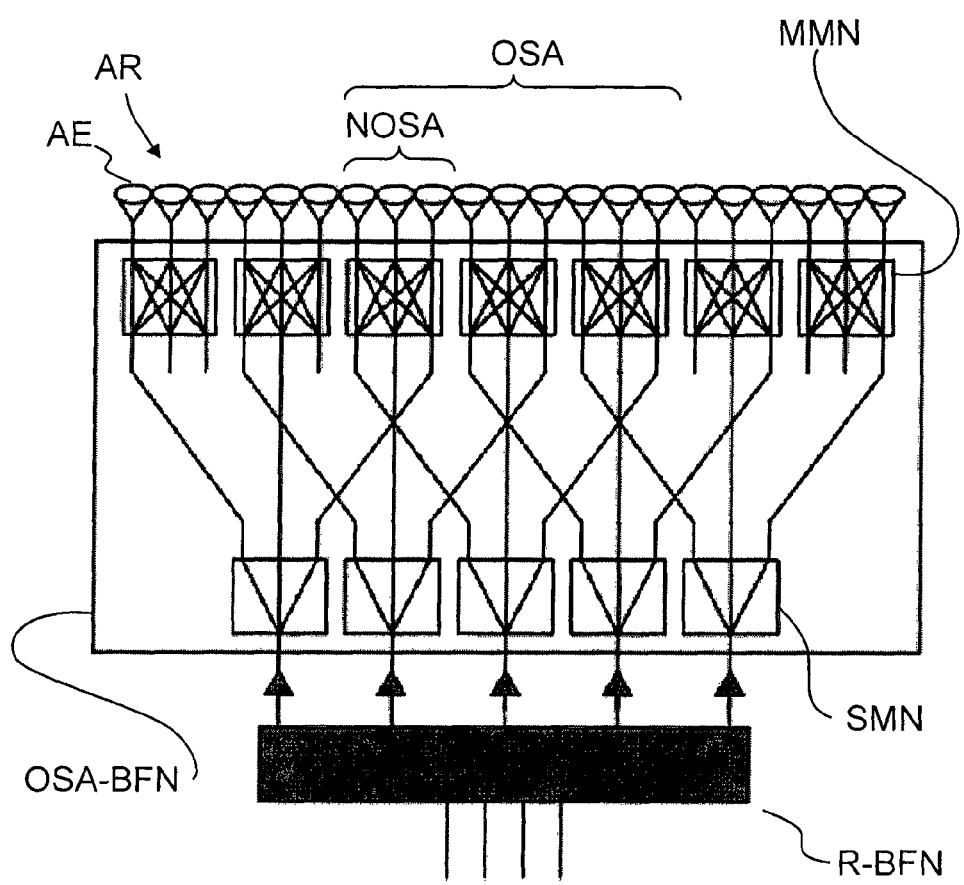
FIG. 3, the general structure of a Beam Forming Network according to the present invention.

The coefficient $c_{m|k}$ can be interpreted as the transfer matrix of a lossless Multi Mode Networks (MMN)—see FIG. 3. A MMN matrix is associated to each Elementary Cell (EC) which constitutes a Non-Overlapping Sub-Array (NOSA). The MMN matrix must have a number of input ports at least equal to (or larger than) the number of Elementary Cell forming a Sub-Arrays $N_{EC}^{SA}$, and the number of output ports at least equal to (or larger than) the number of antenna elements composing the Elementary Cell $N_E^{EC}$.

The transfer matrix coefficients $c_{m|k}$ contain all the information relevant to the MMN functionality, nevertheless different network topologies could provide the same transfer characteristic but with very different realization complexity.

The coefficients can be organized in column vectors $c_k$ of size $[N_E^{EC} \times 1]$ and the column vectors arranged in a matrix C of size $[N_E^{EC} \times N_E^{SA}]$. The matrix C can be thought as the transfer part of the scattering matrix of the Multi Mode Network.

In case the number of Elementary Cell forming a Sub-Arrays $N_{EC}^{SA}$ is lower than the number of elements per Elementary Cell (EC) $N_E^{EC} = M$ we can always add internal fictitious ports to obtain a square matrix C [M×M].

The orthonormality conditions on $c_{m|k}$ can be shortly translated in a Unitarity condition on the matrix C.

$$CC^H = I \tag{44}$$

Among the several realizations of lossless multiport networks, it is well known that the Butler matrix topology exhibits the most economical form (in term of components required to realize the network).

U.S. Pat. No. 3,255,450 to J. L. Butler (reference [23]) describes a fixed multiple-beam BFN based on the use of so-called "Butler matrices". As it is known from the prior art, a Butler matrix is a beam forming network circuit consisting of interconnected fixed phase shifters and hybrid couplers. The matrix produces M orthogonal sets of amplitude and phase output coefficients, each corresponding to one of the M input ports. The strategy that allows reducing the complexity of the BFN consists in factorizing the whole network in lower order networks.

A systematic design procedure for a square network with a number of input/output ports equal to a power of 2 leads to a number of hybrids and of fixed phase shifters equal, respectively, to $$\frac{N}{2}\log_2 N \text{ and } \frac{N}{2}(\log_2 N - 1),$$

while a non-factorized N×N BFN is composed by $\sim N^2$ power dividers and phase shifters. This complexity reduction is directly equivalent to that obtained, in the field of digital signal processing, by using the Fast Fourier Transform (FFT) algorithm to evaluate the Discrete Fourier Transform (DFT), and indeed the Butler matrix can be seen as an analog implementation of the FFT.

The main properties and characteristics of a Multi-Dimensional FFT algorithm (MD-FFT) will be outlined in the following. Only the aspects necessary to an understanding of the invention are explained in detail here, the mathematical basis of this type of transform being well known in the signal processing literature—see [23], [25] and [27] for an explanation of this algorithm as applied to radiofrequency phased array antennas defined on periodic lattices.

Let a planar Non-Overlapping Sub-Array (NOSA), with elements on a periodic lattice $\Lambda(D)$, be defined by the Elementary Cell C(D/DM) of the sub-lattice $\Lambda(DM)$, where D is the non-singular matrix of the inter-element spacings and M is a non-singular integer matrix.

The Non-Overlapping Sub-Array (NOSA) admits a Multi Dimensional-Discrete Fourier Transform (MD-DFT) whose results are a set of beams pointed in the u,v plane with directions defined by the reciprocal lattice $\Lambda(\lambda(DM)^{-T})$.

For simplicity, let us consider the MD-DFT induced on the lattice $\Lambda(I)$ by the lattice $\Lambda(N)$, N being a non-singular integer matrix. The MD-DFT is defined by $$X(m) = \sum_{k \in C(I/N)} x(k)\exp(-j2\pi m^T N^{-1} k) \tag{45}$$

It can be observed that X(m) is periodic on a lattice $\Lambda(M)$ with $M = N^T$.

The inverse (MD-IDFT) is defined on a finite lattice of equal dimension $|\det M| = |\det N^T| = |\det N|$ $$x(k) = \sum_{m \in C(I/M)} X(m)\exp(j2\pi m^T N^{-1} k) \tag{46}$$

X(m), with $m \in C(I/M)$, can be interpreted as a radiating element port and x(k), with $q \in C(I/N) = C(I/M^T)$, as a beam port (i.e. respectively the output and the input of a Multi Mode Network). The MD-DFT is then equivalent to a transfer matrix with the following entries $$c_{m|k} = \exp(-j2\pi m^T N^{-1} k) = W_{\det|M|}^{m^T M^{-T} k} \tag{47}$$

where $$W_N = \exp\left(-j\frac{2\pi}{N}\right).$$

The equation above can be rearranged as follows:

$$\begin{aligned} c_{m|k} &= \exp(-j2\pi m^T N^{-1} k) = \\ &= \exp(-j2\pi k^T N^{-T} m) = \\ &= \exp(-j2\pi k^T (N^{-T} D^{-1}) Dm) \end{aligned} \tag{48}$$

Each beam input port k of the BFN realizes a different NOSA array factor with steering direction $u_k$:

$$u_k = \lambda(k^T(M^{-1}D^{-1}))^T = \lambda D^{-T} M^{-T} k \quad k \in C(I/M^T) \tag{49}$$

The beam steering directions $u_k$ form the Beal Lattice (BL), $$BL = \lambda D^{-T} M^{-T} C(I/M^T) \qquad (50)$$

The |det M| equi-amplitude excitations relevant to different steering directions are mutually orthogonal:

$$c_{k_1}(c_{k_2})^* = |\det M| \delta_{k_1, k_2} \qquad (51)$$

Together these properties guarantee that the transfer matrix defined by a MD-DFT can be used as a Multi Mode Network. Unitarity of the DFT (with normalization to $|\det M|^{1/2}$) guarantees lossless and reciprocity.

Similarly to the 1 D-DFT, the MD-DFT offers the possibility of a series of effective implementations known as Multi Dimensional-Fast Fourier Transforms (MD-FFTs).

The 1D Cooley-Tukey algorithm can be extended with the method described by R. Mersereau and T. Speake as described in, "A unified treatment of Cooley-Tukey algorithms for the evaluation of the multidimensional DFT", IEEE Transactions on Acoustics, Speech, and Signal Processing, Vol. 29, No 9, pp 1011-1018, October 1981. Their multidimensional extension assumes that the periodicity matrix $N = M^T$ can be decomposed in the product of two integer matrices P,Q:N=PQ.

As well, a multidimensional version of the prime factor algorithm was first proposed by A. Guessoum and R. Mersereau in their above-referenced paper, "Fast algorithms for the multidimensional discrete Fourier transform", and later extended by R. Bernardini, G. Cortelazzo and G. Mian in "A new technique for twiddle factor elimination in multidimensional FFT's" IEEE Transactions on Signal Processing, Vol. 42, No. 8, pp. 2176-2178, August 1994, to the more general cases.

It follows from the theoretical developments above that the design procedure of a BFN according to the invention comprises the following steps:

D1) a periodicity matrix D, relevant to the Array Lattice (AL) $\Lambda(D)$, is selected in such a way that the Voronoi region (or more generally an elementary cell) of the normalized reciprocal lattice $\Lambda(\lambda D^{-T})$ includes the Grating-Lobes Free Zone (GLFZ) of concern.

D2) a periodicity matrix DM, relevant to the Sub-Array Lattice (SAL) $\Lambda(DM)$, is selected in such a way that the Voronoi region (or more generally an elementary cell) of the normalized reciprocal lattice $\Lambda(\lambda(DM)^{-T})$ includes the Field of View (FOV) of interest.

D3) The Array Lattice $\Lambda(D)$ is partitioned in M=|det M| Equivalence Classes with respect to the vector modulo DM operation.

D4) A Non Overlapping Sub-Array NOSA configuration is defined selecting at most one element of the Array Lattice $\Lambda(D)$ per Equivalence Class and including $N_E^{NOSA} \leq N_E^{EC} = M$ elements (where reads as Number of Elements forming a Non-Overlapping Sub Array), and preferably $N_E^{NOSA} = N_E^{EC} = M$.

D5) An Overlapping Sub-Array OSA configuration is defined selecting a number of Non Overlapping Sub-Arrays $N_{NOSA}^{OSA}$ (where $N_{NOSA}^{OSA}$ reads as the number of Non-Overlapping Sub-Arrays forming an Overlapping Sub-Array).

D6) A lossless Multi Mode Network (MMN) and a lossless Single Mode Networks (SMN) are defined such that:

The number $N_{OP}^{MMN}$ of output ports (MMN-OPs) and the number $N_{IP}^{MMN}$ of input ports (MMN-IPs) of the lossless Multi Mode Network (MMN) satisfy the relations $N_E^{NOSA} \leq N_{OP}^{MMN} \leq M$ and $N_{NOSA}^{OSA} \leq N_{IP}^{MMN} \leq M$; preferably $N_{OP}^{MMN} = N_E^{NOSA} = M$, and $N_{IP}^{MMN} = N_{NOSA}^{OSA} \leq M$.

The lossless Single Mode Networks (SMNs) have a number $N_{OP}^{SMN}$ of output ports (SMN-OPs) and input ports (SMN-IPs) for associating each overlapping sub-arrays input port (OSA-IP) to a plurality of non-overlapping sub-arrays input ports (NOSA-IPs) through weighting transfer matrix coefficient $b_k$;

Each Single Mode Networks (SMN) feeds $N_{NOSA}^{OSA} \leq M$ Non Overlapping Sub-Arrays (NOSAs) constituting an Overlapping Sub-Arrays (OSAs). To maintain the orthogonality and the lossless condition under translation of the Overlapped Sub-Array, the output ports of a lossless Single Mode Networks (SMN-OPs) must be connected to different homologue input ports of the lossless Multi Mode Networks (MMN-IPs). To better clarify this point this means that if a Single Mode Network (SMN) is interconnected to an ordered input port of one of the lossless Multi Mode Networks (MMNs), the interconnections of the remaining lossless Multi Mode Networks (MMNs) to the same Single Mode Network (SMN) will not reuse a homologue ordered input port. This can be mathematically formulated indicating that the interconnection relationship between the k-th used port of the q-th MMN composing the Reference Overlapped Sub-Array must be in the form of a permutation;

$$k = \Pi(q) \qquad (52)$$

where $\Pi(q)$ is the permutation array that indicates which column $\Pi(q)$ of the MMN transfer matrix $c_{m|k}$ is picked for the q-th Non-Overlapping Sub-Array of the Reference Overlapping Sub-Array (RSA).

The coefficients $b_q$ and $c_{m|k}$ of the transfer matrices of the lossless Single Mode Network (SMN) and of the lossless Multi Mode Network (MMN), respectively, are determined such as to satisfy the lossless condition:

$$\sum_{m \in M} c_{m|k} c_{m|k}^* = 1 \ \forall \ k \in \{k_k : k = 0, \ldots, (N_{IP}^{MMN} - 1)\} \qquad (53)$$

together with the target to optimize the Sub-Array Pattern SAP(u) such to have a flat response in the desired Field of View (FOV) and zero outside, where:

$$SAP(u) = EP(u) RSAF(u) \qquad (54)$$

$$RSAF(u) = \sum_{q \in Q} \left( b_q \exp(jk_0 u \cdot DMq) \left( \sum_{m \in M} c_{m|q} \exp(jk_0 u \cdot Dm) \right) \right) \qquad (55)$$

D7) A Multi-Beam Network (MBN) is defined for associating each beam port to each Overlapping Sub-Array input port (OSA-IP) through respective weighting units;

The number $N_{IP}^{MBN}$ of input ports (MBN-IP) is equal or larger than the number of independent beams $N_B$ to be generated $N_{IP}^{MBN} \geq N_B$, preferably $N_{IP}^{MBN} = N_B$;

The number $N_{OP}^{MBN}$ of output ports (MMN-OP) is equal or larger than the number of Overlapped Sub-Arrays $N_{OSA}$ composing the antenna, $N_{OP}^{MBN} \geq N_{OSA}$, preferably $N_{OP}^{MBN} = N_{OSA}$;

The coefficients $a_{p|i}$ of the transfer matrix of the Multi-Beam Network (MBN) for the i-th beam are determined such to optimise the Total Array Pattern $TAP_i(u)$ for the i-th beam, where:

$$TAP_i(u) = SAP(u) ASAF_i(u) \qquad (56)$$

$$ASAF_i(u) = \sum_{p \in P} a_{p|i} \exp(jk_0 u \cdot DMp) \quad (57)$$

The overall architecture of the BFN, determined by steps D6 and D7, is illustrated on FIG. 3. It can be seen that the inventive BFN has one (single-beam case) or more (multi-beam case) beam ports BP for injecting respective beam signal(s), and a plurality of antenna ports AP feeding respective antenna elements organized in a regular one- or two-dimensional lattice (one-dimensional case represented on the figure) which is hierarchically partitioned in a plurality of Non-Overlapping Sub-Arrays (NOSAs) and in a plurality of Overlapping Sub-Arrays (OSAs). The BFN has three stages and includes:

A Multi-Beam Network (MBN)—which connects each BP to several OSA input ports (OSA-IPs) through respective weighting units;

A plurality of lossless Single Mode Networks (SMNs)—which connect each OSA-IP to a plurality of NOSA-IPs through respective weighting units; and A plurality of lossless Multi Mode Networks (MMNs)—each associated to a NOSA and having a number of input ports at least equal to (or larger than) the number of NOSA-IPs and the number of output ports at least equal to (or larger than) the number of AEs composing the NOSAs.

The BFN architecture is the same for a one- or bi-dimensional array, only the arrangement of antenna elements changes.

FIG. 3 refers specifically to an emitting antenna. In the case of a receiving antenna, the architecture of the BFN remains the same, except that input ports are turned into output ports and vice versa, and that HPAs are suppressed or replaced by low-noise amplifiers connected either to the beam (output) ports or to the output ports of the antenna elements.

In a particular embodiment of the present invention the transfer matrix of the Multi-Mode Network is selected to be a Multi-Dimensional DFT (MD-DFT). Similarly to the 1D-DFT, the MD-DFT allows effective implementations known as Multi Dimensional Fast Fourier Transforms (MD-FFTs) (refer to Guessoum and Mersereau [25] and to U.S. Pat. No. 5,812,088 to Coromina et alii [27] and to European Patent No. 2,296,225 to Angeletti for an explanation of this algorithm as applied to radiofrequency phased array antennas). Accordingly to this embodiment, the design step D6 described above can be further elaborated as follows:

D6.1) A lossless Multi Mode Network (MMN) is defined such that:

The network has a number $N_{OP}^{MMN}$ of output ports (MMN-OP) equal to the number of elements of an Elementary Cell $N_{OP}^{MMN}=M$;

The network has a number $N_{IP}^{MMN}$ of input ports (MMN-IP) satisfying the relation $N_{NOSA}^{OSA} \leq N_{IP}^{MMN} \leq M$; preferably $N_{IP}^{MMN}=N_{NOSA}^{OSA} \leq M$.

The coefficients $c_{m|k}$ of the transfer matrix of the lossless Multi Mode Network (MMN) are defined accordingly to a Multi-Dimensional DFT (MD-DFT):

$$c_{m|k} = W_{det|M|}^{m^T M^{-T} k} \quad (58)$$

where $$W_N = \exp\left(-j\frac{2\pi}{N}\right),$$

or can be re-conduced to this form through a multiplication for an arbitrary phase factor (i.e. $c_{m|k}=\exp(-j\phi_m)W_{det|M|}^{m^T M^{-T} k}$). This choice automatically guarantees the lossless condition:

$$\sum_{m \in M} c_{m|k} c_{m|k}^* = 1 \;\; \forall \; k \in \{k_k : k = 0, \ldots, (N_{IP}^{MMN}-1)\} \quad (59)$$

D6.2) A lossless Single Mode Networks (SMN) is defined such that it has a number $N_{OP}^{SMN}$ of output ports (SMN-OP) and an input port (SMN-IP) for associating each overlapping sub-arrays input port (OSA-IP) to a plurality of non-overlapping sub-arrays input ports (NOSA-IP) through weighting transfer matrix coefficient $b_k$;

Each Single Mode Networks (SMN) feeds $N_{NOSA}^{OSA} \leq M$ Non-Overlapping Sub-Arrays (NOSA) constituting a Given the transfer matrices of the lossless Multi Mode Network (MMN) $c_{m|k}$ the coefficients $b_q$ of the transfer matrix of the lossless Single Mode Network (SMN) and the interconnection $k=\Pi(q)$ between the k-th used port of the q-th MMN composing the Reference Overlapped Sub-Array are determined with the target of optimizing the Sub-Array Pattern SAP(u) such to have a flat response in the desired Field of View (FOV) and zero outside.

The proposed architecture achieves the same theoretical performance as the prior art (see in particular Borgiotti [4]) in terms of reduction of the number of Weight Elements (WEs) with respect to a "full" BFN with $N_B \times N_E$ WE. This reduction ranges from 20% to 80%, depending on the mission requirements.

The present architecture, however, outperforms state-of-the-art architectures in terms reduction of the number of High Power Amplifiers (HPAs) as the amplifiers can be placed at the inputs of the Overlapped Sub-Arrays (SAs) given that the SMN and MMN can be lossless.

The proposed architecture also outperforms array antennas based on Non-Overlapped Sub-Array with similar number of Sub-Arrays (and in turn similar complexity in number of Weight Elements WEs and High Power Amplifiers HPAs) in terms of scan loss performances within the field of view.

The lossless condition, which imposes additional constraints on the available degree of freedoms in the synthesis of the excitations of the Antenna Elements of an Overlapped Sub-Array, doesn't penalize the scan loss performances within the field of view.

In particular, to prove this last two points, three design example have been performed and are reported in the following design examples.

E3) Design Example 1

In this design example the Non-Overlapping Sub-Array is composed of 3×3 AEs on a rectangular lattice, the Multi-Mode Network is based on a 9×9 MD-DFT, and the Overlapped Sub-Array is composed of 9 NOSA The details of the synthesis according to the present invention are reported in FIGS. 4 to 18. The scanning performances of the Overlapped Sub-Array are reported in FIGS. 19 to 21 and therein compared with the scanning performances of a Non-Overlapped Sub-Array of similar geometry.

FIG. 4A is a general view of the Array Antenna AR which is cross-shaped and comprises 189 Antenna Elements disposed on a rectangular lattice Λ(D) having base vector matrix D=[$d_1,d_2$]. Said lattice is illustrated on FIG. 4B.

FIGS. 5A to 7B (already discussed above) illustrates the main theoretical concepts at the basis of the invention: Sub-Array Lattice, Elementary Cell, tiling, Beams Lattice, Grating lobes.

FIG. 8A illustrates an Elementary Cell EC of the Array Antenna AR of FIG. 4A, comprising 9 Antenna Elements disposed on a 3×3 square. FIG. 8B represents the corresponding coordinate vectors. This Elementary Cell also constitutes a "Non-Overlapping" Sub-Array NOSA.

FIG. 9A illustrates an Elementary Cell of the Beams Lattice defined by the bi-dimensional Fourier Transform of the Sub-Array Lattice of FIG. 5.

FIGS. 10-18 illustrates the implementation of the invention.

Figure 10:
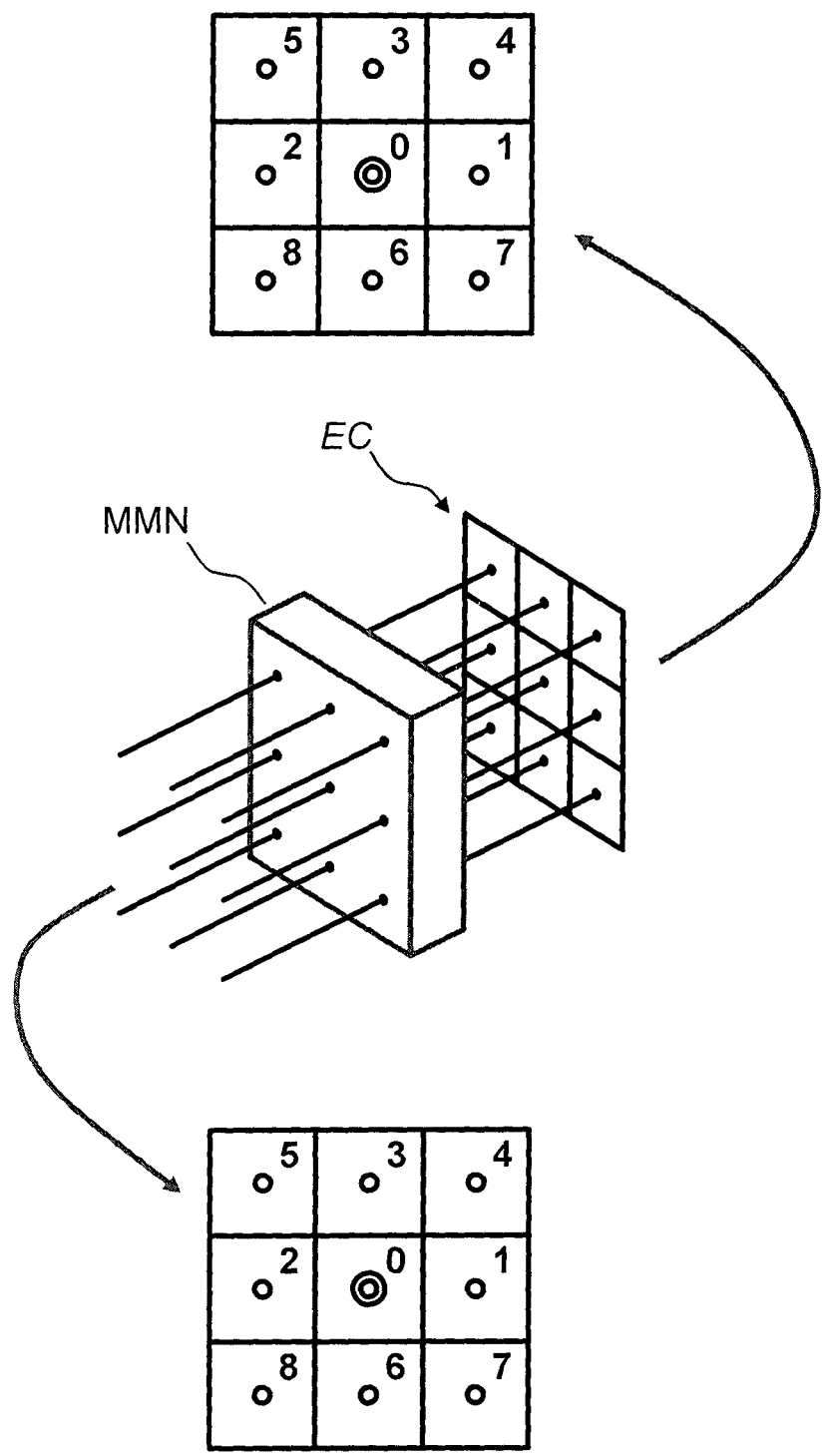
FIG. 10, interconnection of a Multi-Mode Network to the Antenna Elements constituting an Elementary Cell according to FIG. 7A.
Figures 12A, 12B:
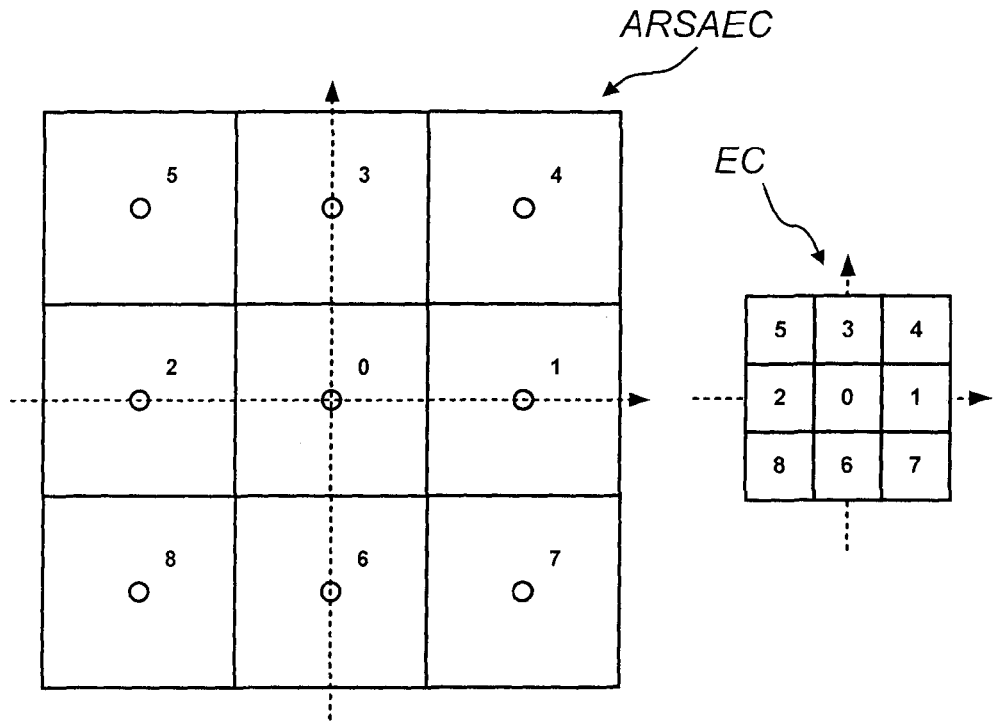
FIG. 12A, a numbering of the Elementary Cells constituting the Array of Sub-Arrays ARSAEC of FIG. 11 (left), and of the Antenna Elements constituting an Elementary Cell (Right)
FIG. 12B, numbering of the Antenna Elements (AEs) constituting said Array of Sub-Arrays.

FIG. 10 shows a Multi-Mode Network MMN having 9 input ports and 9 output ports which are connected to the 9 Antenna Elements constituting the Elementary Cell EC of FIG. 7A. On the input side, each input port of the MMN is connected to a respective Single Mode Network (SMN—not represented) while, on the output side, the signal received by each Antenna Element is a linear combination of the input signals of the MMN.

FIG. 11A represents an Array of Sub-Arrays ARSAEC, each Sub-Array being an Elementary Cell of the type illustrated on FIG. 7A, connected to a respective MMN as illustrated on FIG. 10. FIG. 11B represents the coordinate vectors of the Array of Sub-Arrays. FIG. 10A reminds that each of said Sub-Arrays is constituted by 9 Antenna Elements. As shown on FIG. 12B, each Antenna Element can be identified by a pair of number, the first one identifying the (Non-Overlapping) Sub-Array to which it belongs, and the second one indicating the position of the element within said Sub-Array. E.g. element (5,3) is the third element of the fifth Sub-Array.

Figure 13A:
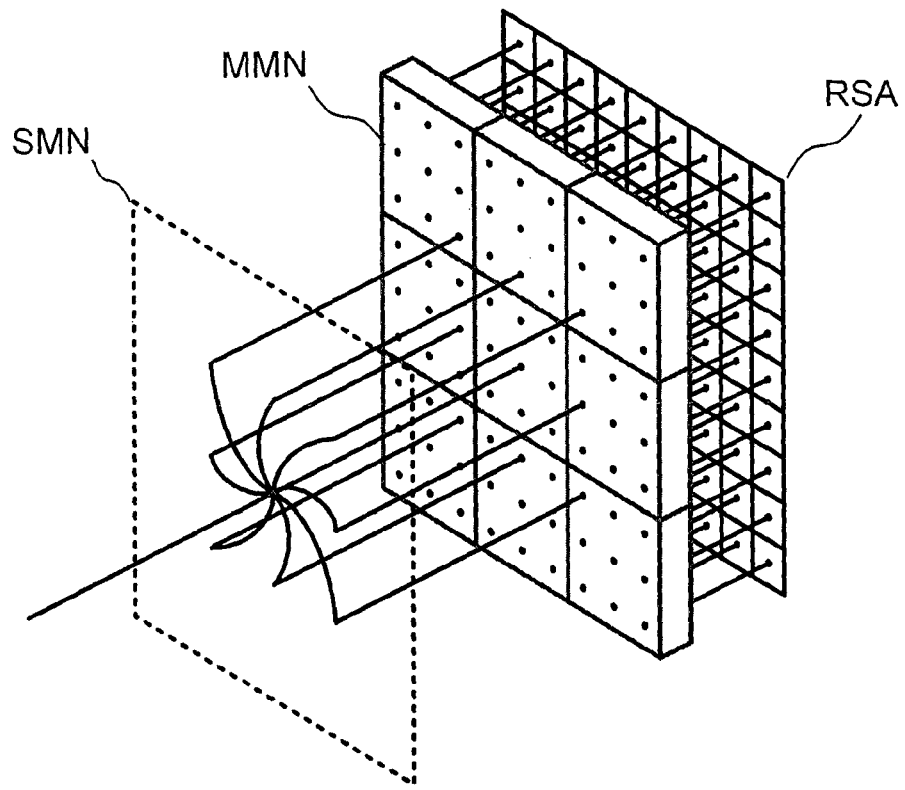
FIGS. 13A and 13B, two views of a functional diagram of an Overlapping Sub-Array with the interconnections of a Single-Mode Network to Multi-Mode Networks and to the Antenna Elements.
Figure 13B:
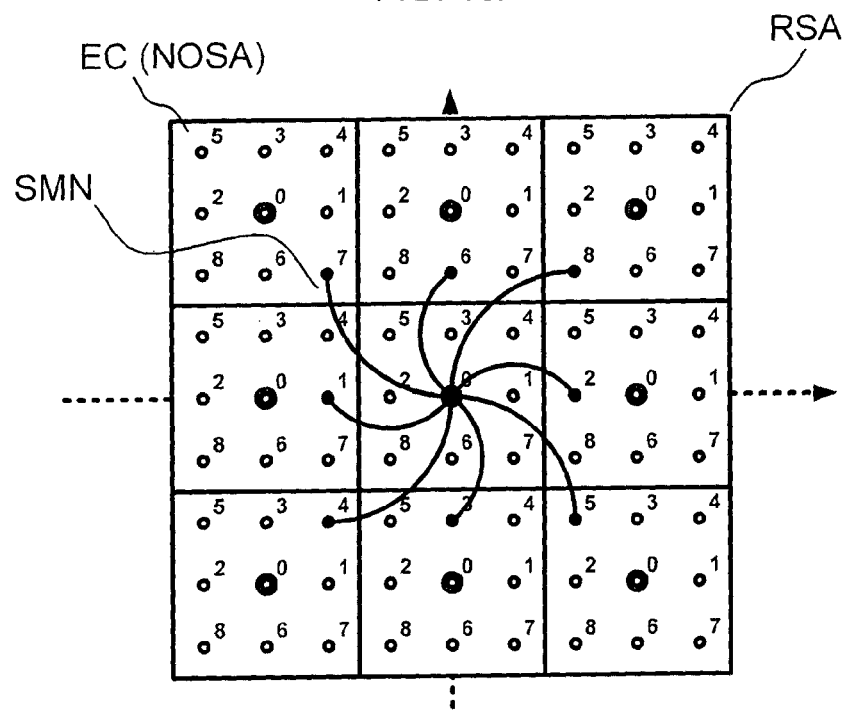
Figure 14:
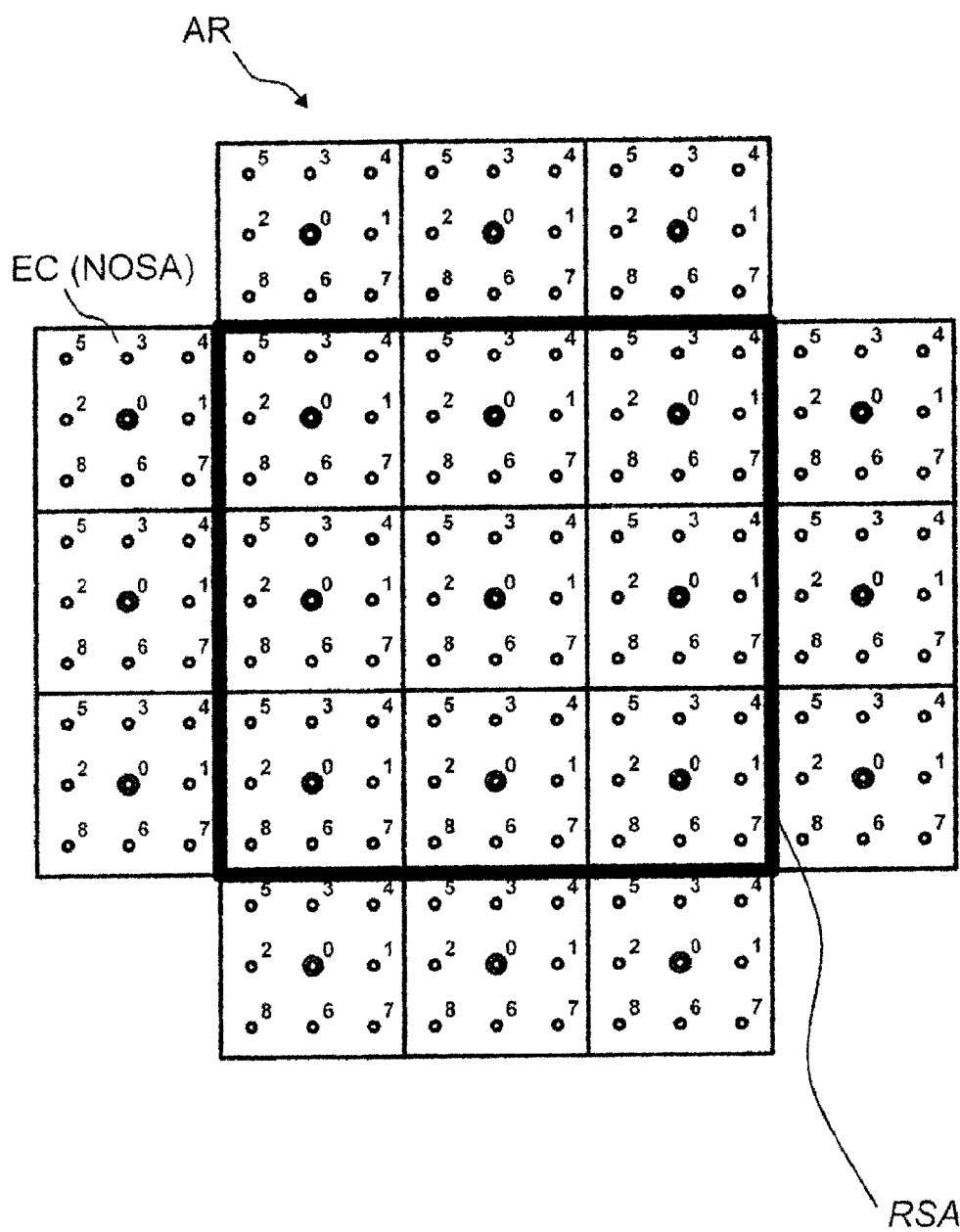
FIG. 14, a layout of an overall Array and highlight of a Reference Sub-Array corresponding to the Overlapping Sub-Array of FIG. 13A.

FIGS. 13A and 13B represent a Single-Mode Network SMN distributing a signal to nine MMN, each feeding nine respective Antenna Elements forming a Non-Overlapping Sub-Array NOSA (or, equivalently, an Elementary Cell EC). The SSM feeds a different port of each MMN: port 0 of MMN n° 0, port 2 of MMN n° 1 etc. The set of nine EC—i.e. of 81 Antenna Elements—fed through a same SMN constitutes the Reference Sub-Array RSA, or more generally an Overlapping Sub-Array OSA. FIG. 14 shows the RSA within the whole Array Antenna AR.

Figure 15:
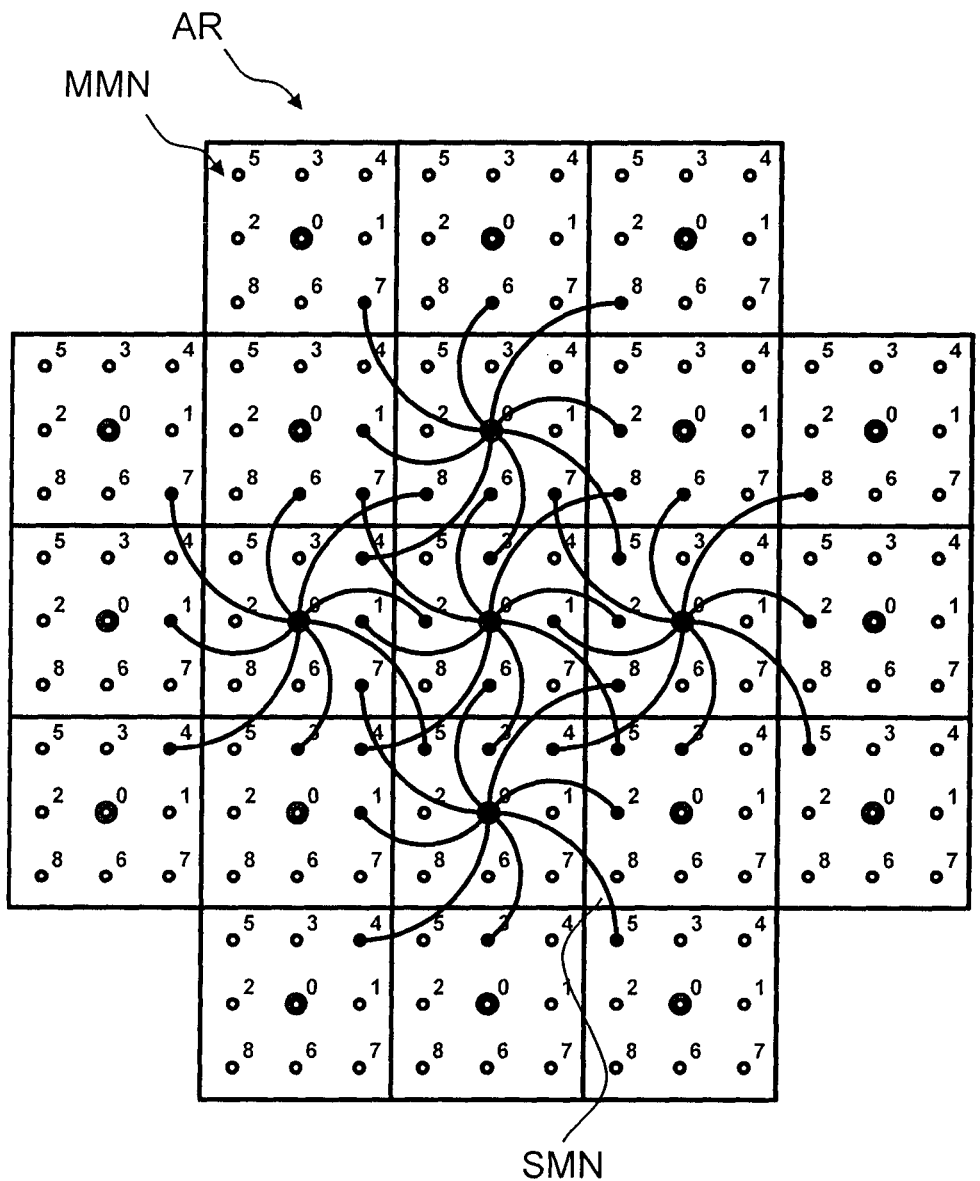
FIG. 15, an interconnection diagram of the Single-Mode Networks required for each of the Overlapping Sub-Arrays of FIG. 13A.

The Array Antenna AR comprises 5 Overlapping Sub-Arrays: a first one corresponding to the RSA represented in bold on FIG. 14 and four other obtained by translating the RSA of one unit cell. Otherwise stated, the Overlapping Sub-Array n° 0 is cantered on EC n° 0, the Overlapping Sub-Array n° 1 is cantered on EC n° 1, the Overlapping Sub-Array n° 2 is cantered on EC n° 2, the Overlapping Sub-Array n° 3 is cantered on EC n° 3 and the Overlapping Sub-Array n° 4 is cantered on EC n° 4 (for the numbering of EC, see FIG. 12A). FIG. 15 shows that each Overlapping Sub-Array is fed by a respective SMN; the five SMN form what is called a "set" or "layer" of Single Mode Networks, SSMN.

Figure 16:
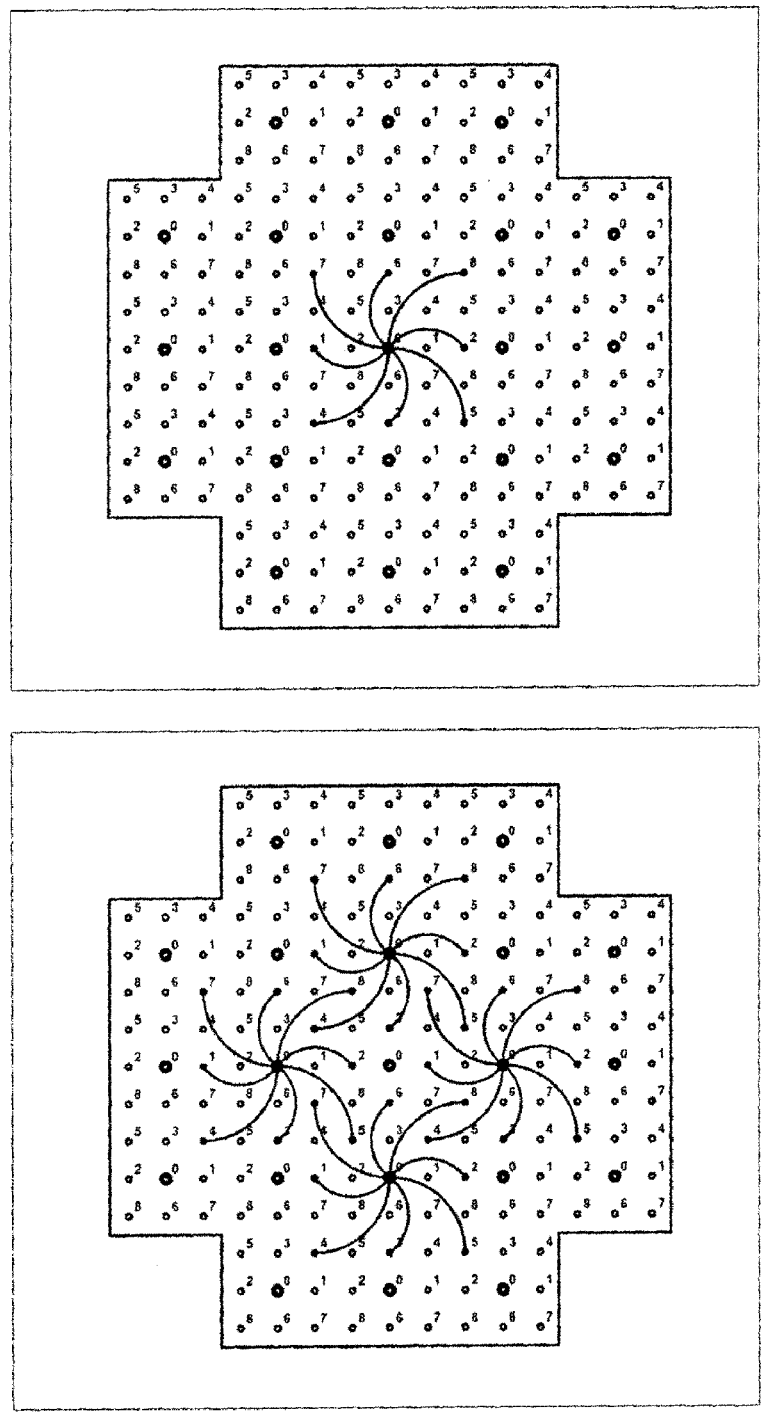
FIG. 16, a possible decomposition of the Single-Mode Networks of FIG. 15 in sets of non-crossing Single-Mode Networks.
Figure 17A:
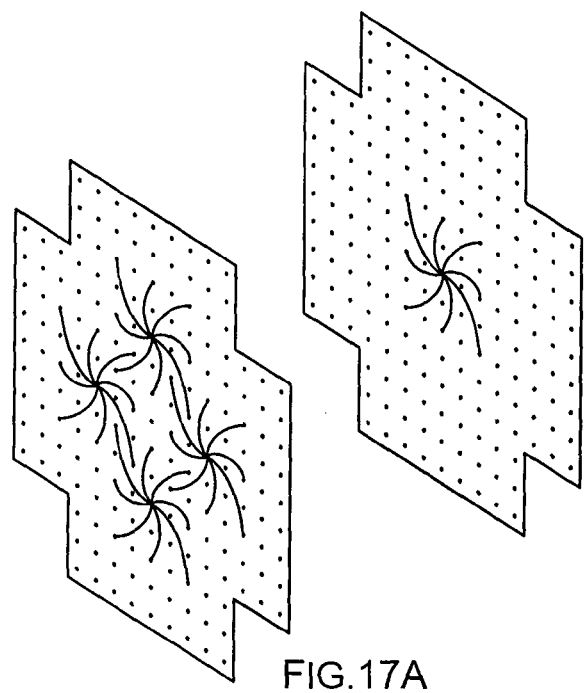
FIGS. 17A and 17B, a multilayer assembly of the set of non-crossing Single-Mode Networks according to FIG. 16.
Figure 17B:
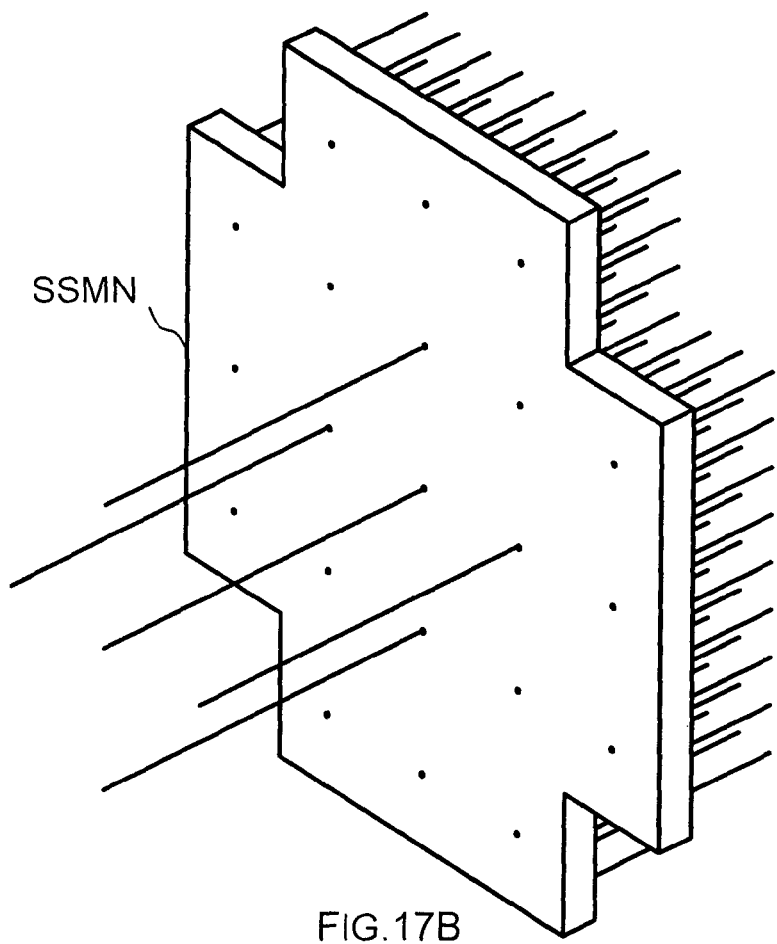

As it can be seen on FIG. 15, the output connections of the SMNs cross with each other. Therefore, it is useful from an implementation point of view to decompose the SSMN into two subsets without crossing, forming a multilayer assembly; this is illustrated by FIGS. 16 and 17A. FIG. 17B represents the SSMN as a single element with five input port (one for each Overlapping Sub-Array) and 45 output ports. Actually, on FIG. 15 the number of output ports of the SSMN is set to 189, i.e. equal to the number of input ports of the set of MMNs, which in turn is equal to the number of AE; of these, however, only 45 are "real" output ports, the 144 remaining ones being "dummy" ports.

Figure 18:
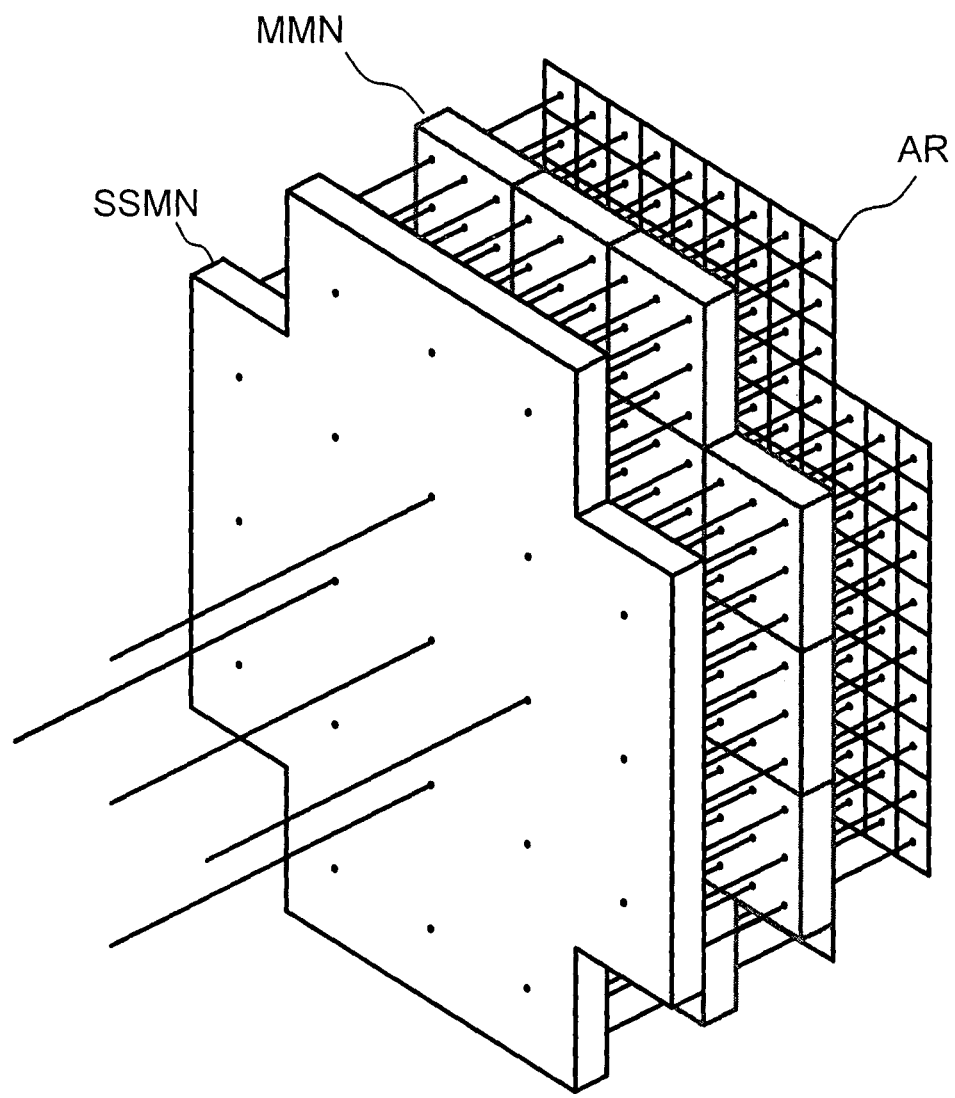
FIG. 18, an overall layout of an Array Antenna and a Lossless Beamforming Network according to said first exemplary embodiment of the invention.

Finally, FIG. 18 shows the SSMN connected to an arrangement of MMNs (cf. FIG. 15) feeding the 189 Antenna Elements of the Array Antenna AR.

The technical result of the exemplary embodiment is illustrated on FIGS. 19-21B.

Figure 19A:
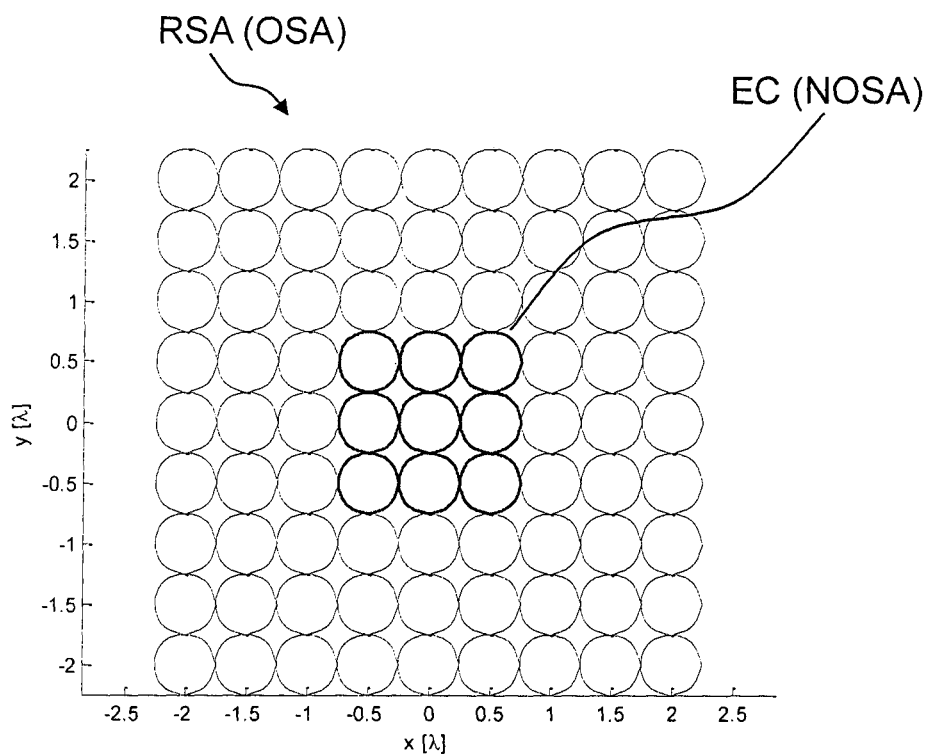
FIG. 19, simulated array geometry (FIG. 19A) and Sub-Array Radiation Pattern (performance (main axis single cut) for a Non-Overlapping Sub-Array and an Overlapping Sub-Array according to said first exemplary embodiment of the invention (FIG. 19B)
Figure 19B:
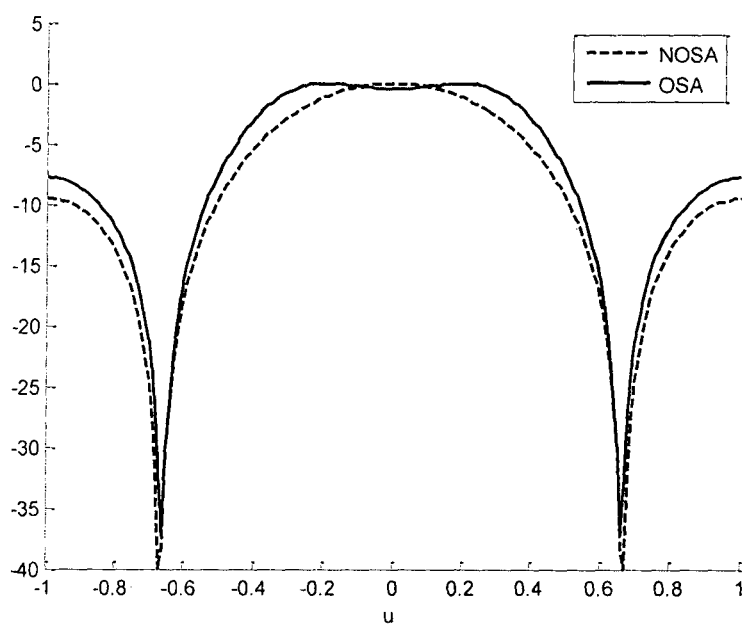
Figure 20A:
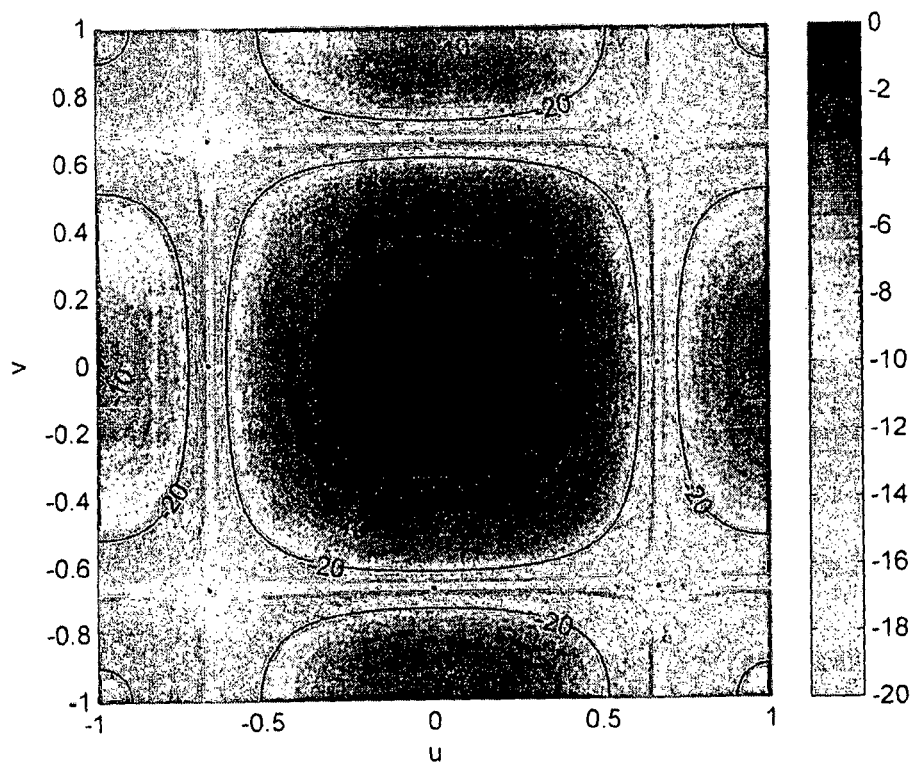
FIG. 20, Sub-Array Radiation Pattern performance greyscale plots for a Non-Overlapping Sub-Array (FIG. 20A) and an Overlapping Sub-Array according to said first exemplary embodiment of the invention (FIG. 20B)
Figure 20B:
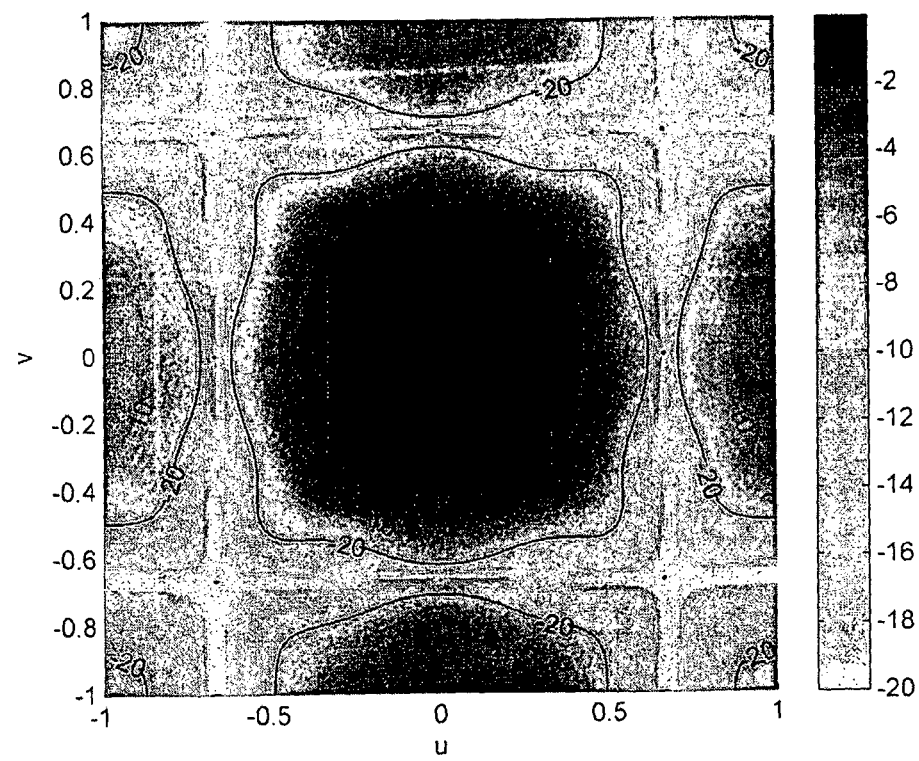
Figure 21A:
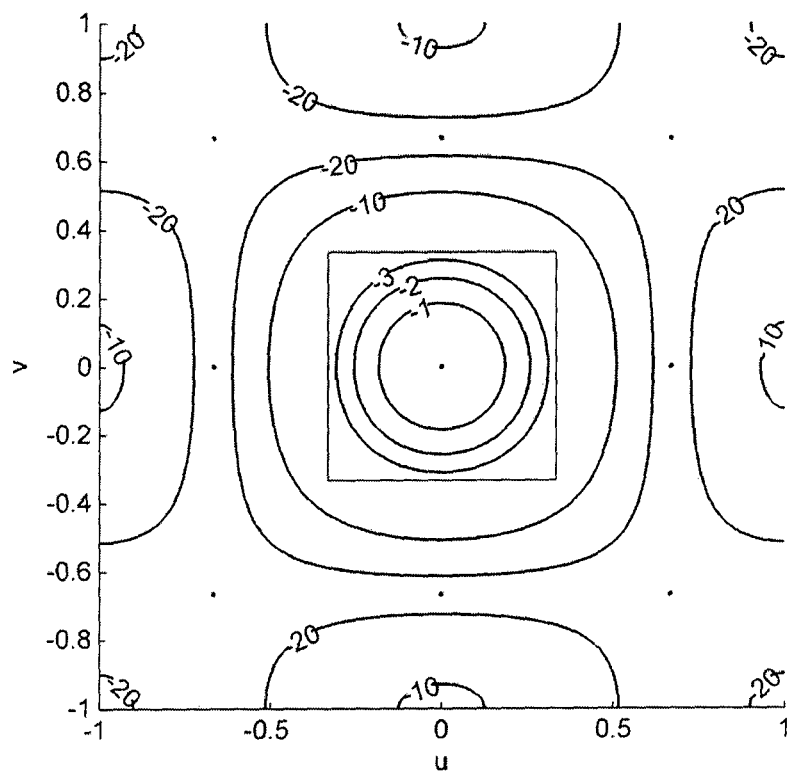
FIG. 21, a Sub-Array Radiation Pattern performance contour plot for a Non-Overlapping Sub-Array (FIG. 21A) and an Overlapping Sub-Array according to said first exemplary embodiment of the invention (FIG. 21B)
Figure 21B:
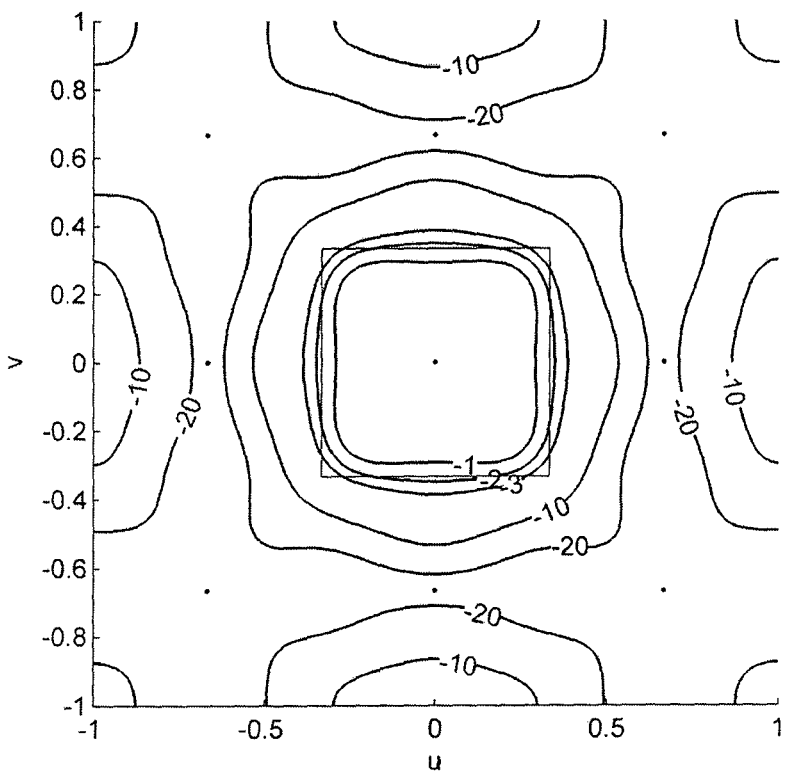
Figures 22A, 22B:
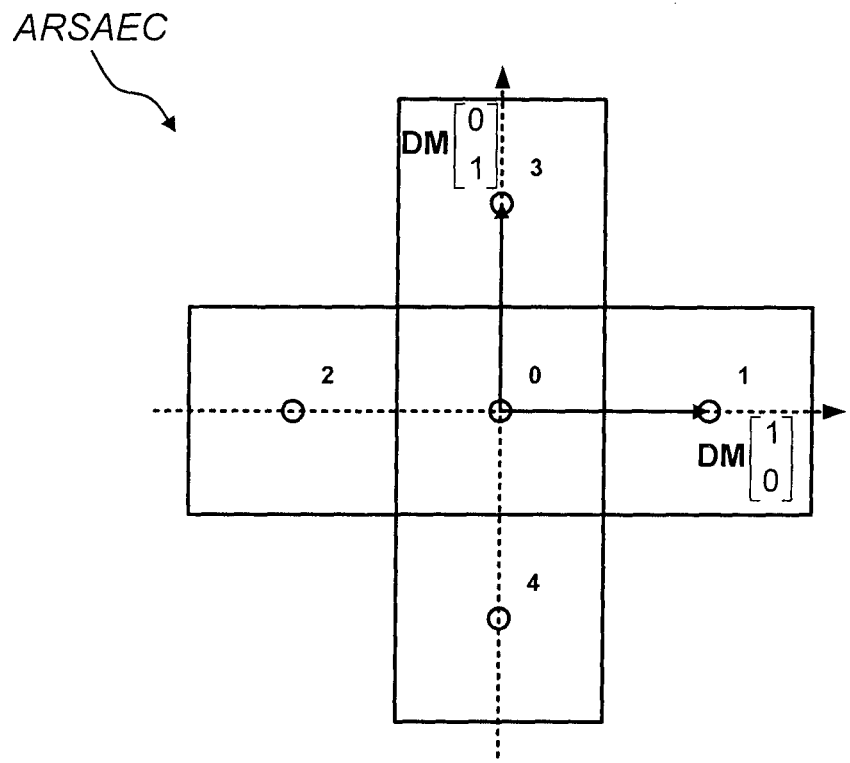
FIG. 22, Geometry (FIG. 22A) and coordinates vectors (FIG. 22B) of an Elementary Cells (ECs) constituting an Array of Sub-Arrays of a second exemplary embodiment of the invention.
Figure 23A:
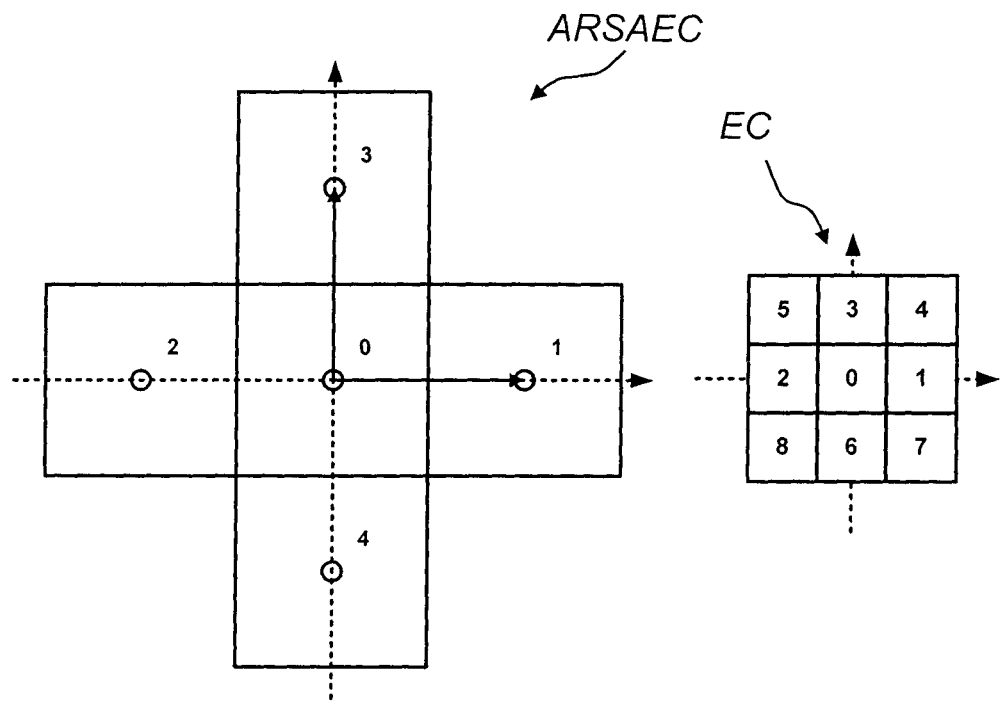
FIG. 23A, a numbering of the Elementary Cells constituting the Array of Sub-Arrays according to FIG. 22 (left), and of the Antenna Elements (AEs) constituting an Elementary Cell according to FIG. 8 (Right)
Figure 23B:
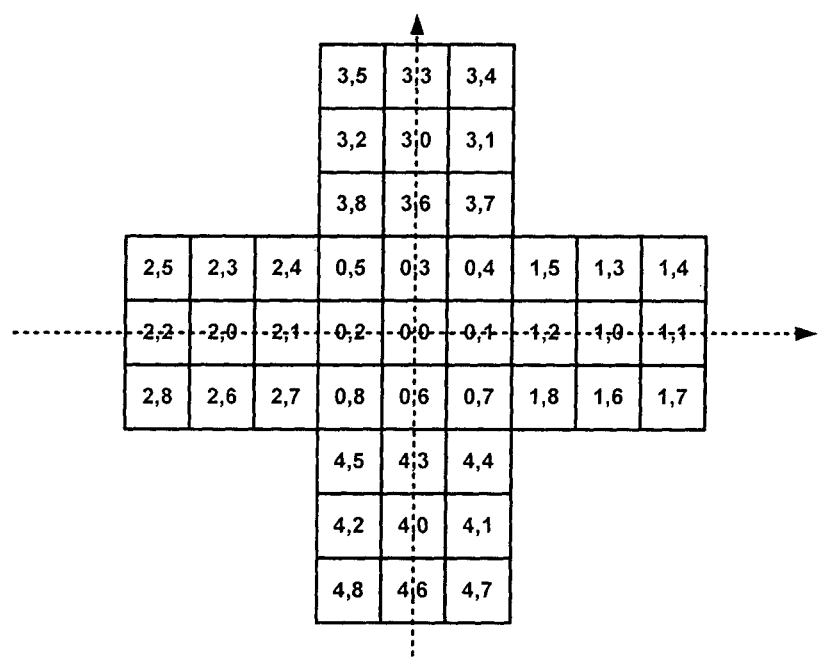
FIG. 23B, a numbering of the Antenna Elements (AEs) constituting the Array of Sub-Arrays according to FIG. 23.
Figure 24A:
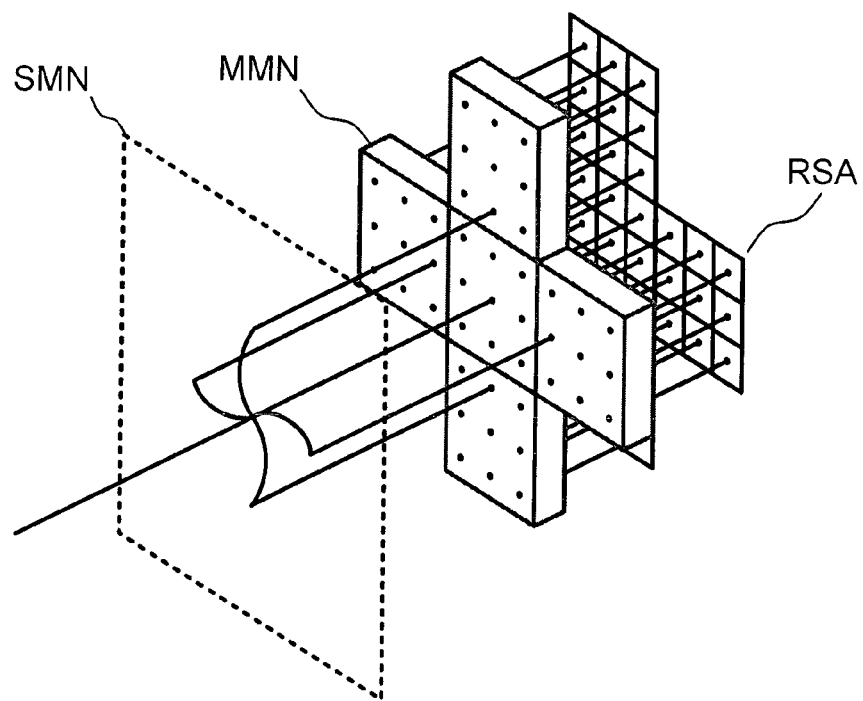
FIGS. 24A and 24B, a functional diagram of an Overlapping Sub-Array with interconnections the Single-Mode Network to the Multi-Mode Networks (MMNs) and to the Antenna Elements, according to said second exemplary embodiment of the invention.
Figure 24B:
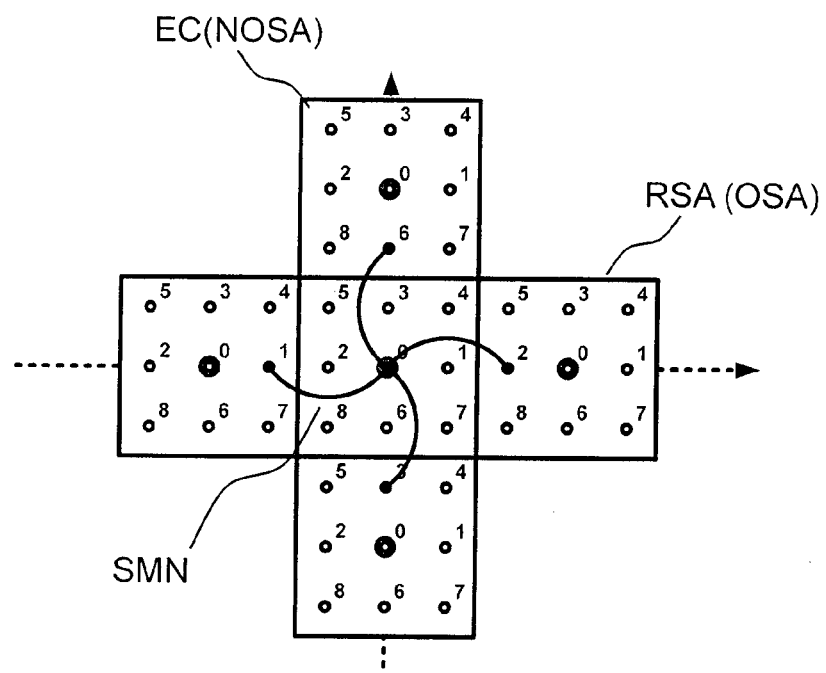
Figure 25:
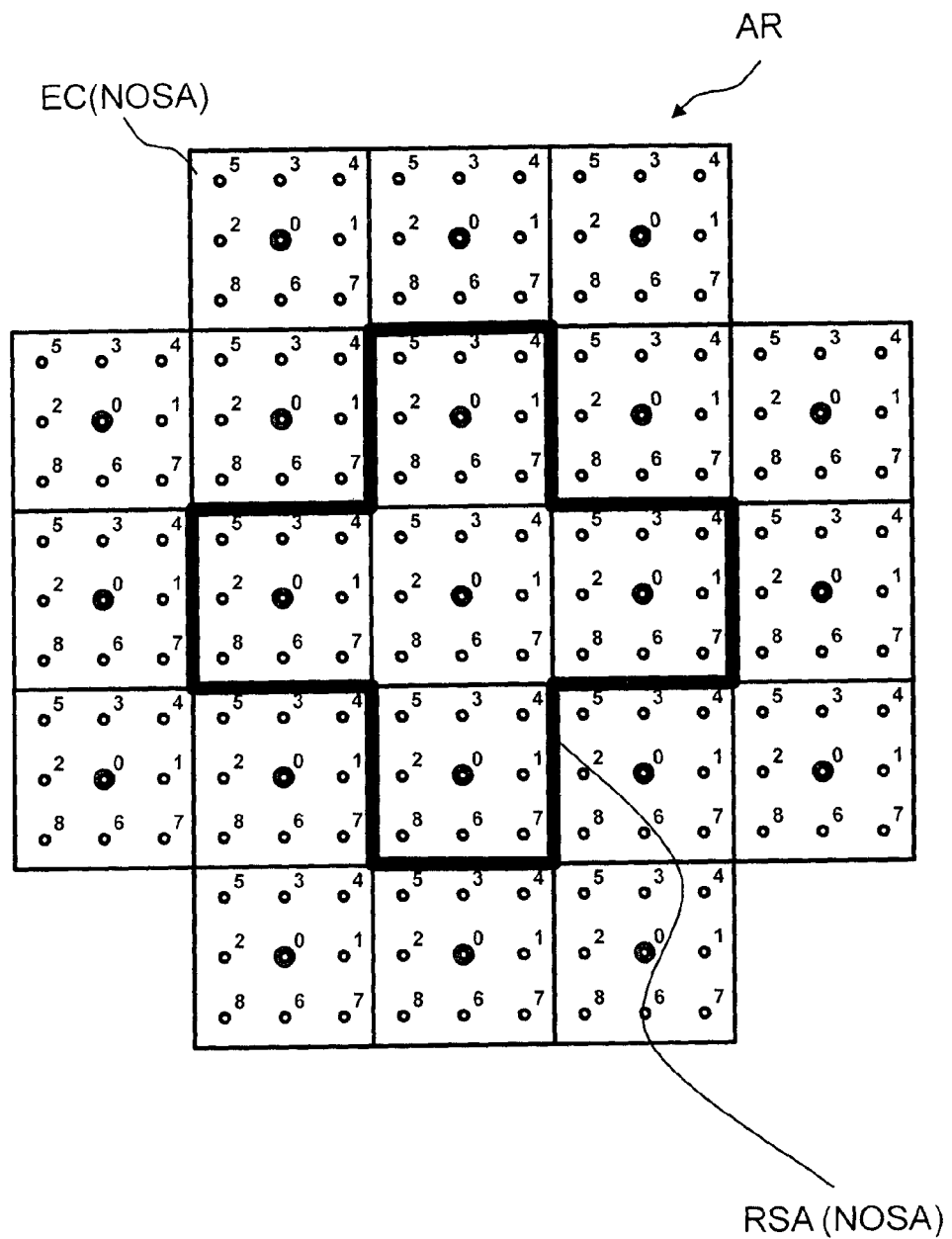
FIG. 25, a layout of an overall Array and highlight of the Reference Sub-Array corresponding to the Overlapping Sub-Array of FIG. 24A.
Figure 26:
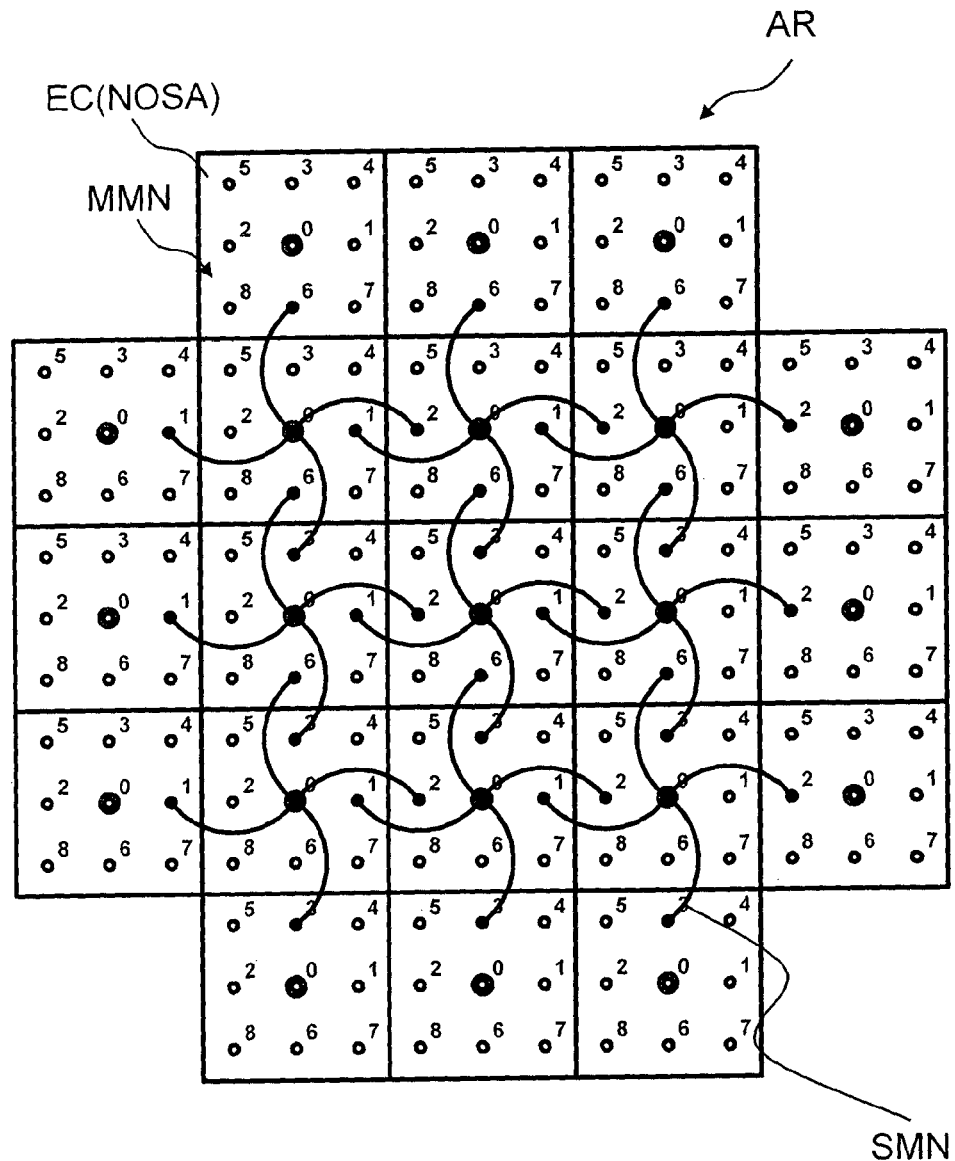
FIG. 26, an interconnection diagram of a Single-Mode Networks required for each Overlapping Sub-Array according to said second exemplary embodiment of the invention.
Figure 27:
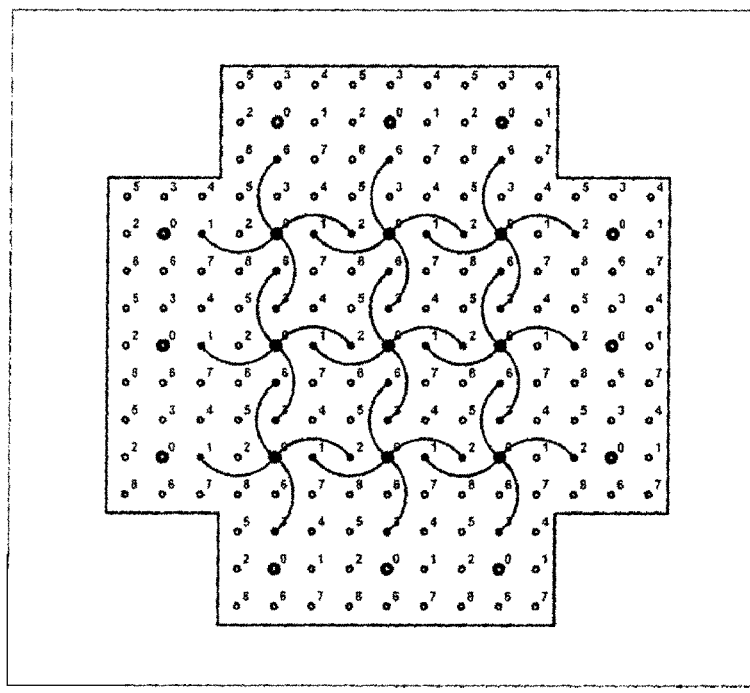
FIG. 27, a set of Single-Mode Networks according to FIG. 26 implemented as a single layer of non-crossing Single-Mode Networks.
Figure 28A:
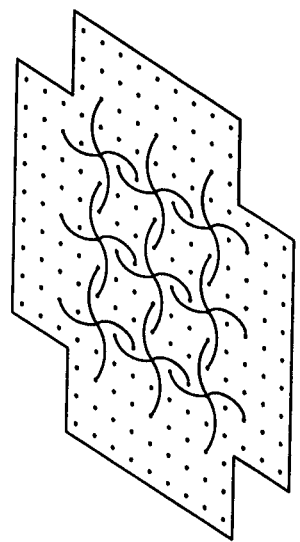
FIGS. 28A and 28B, an assembly of the set of non-crossing Single-Mode Networks of FIG. 27.
Figure 28B:
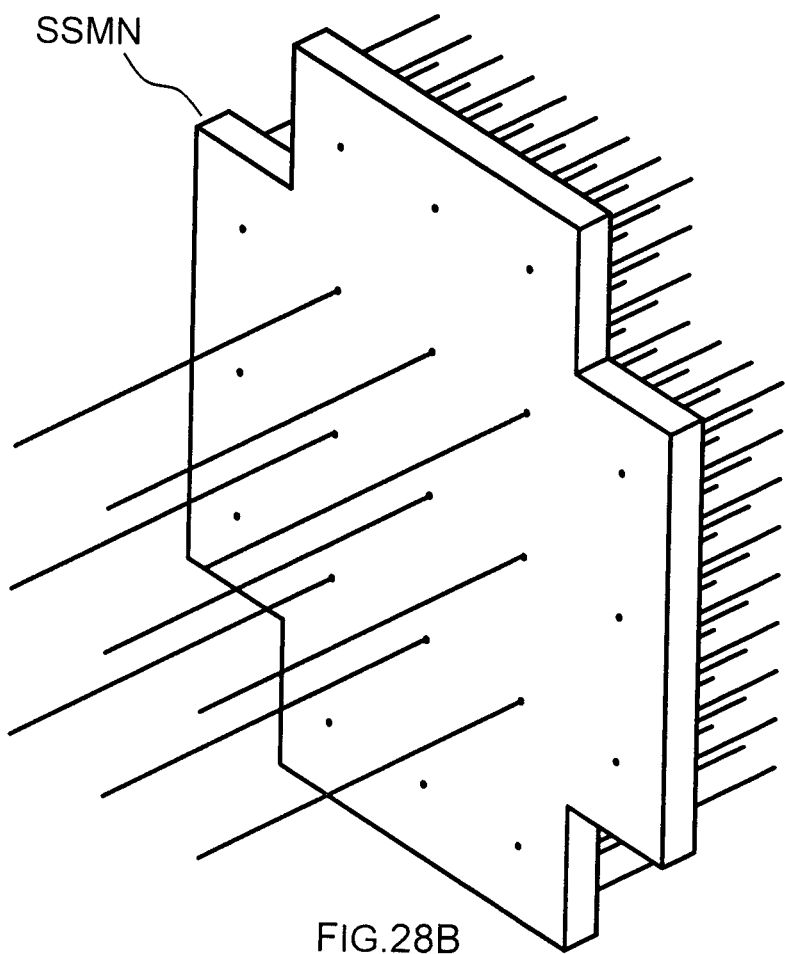
Figure 29:
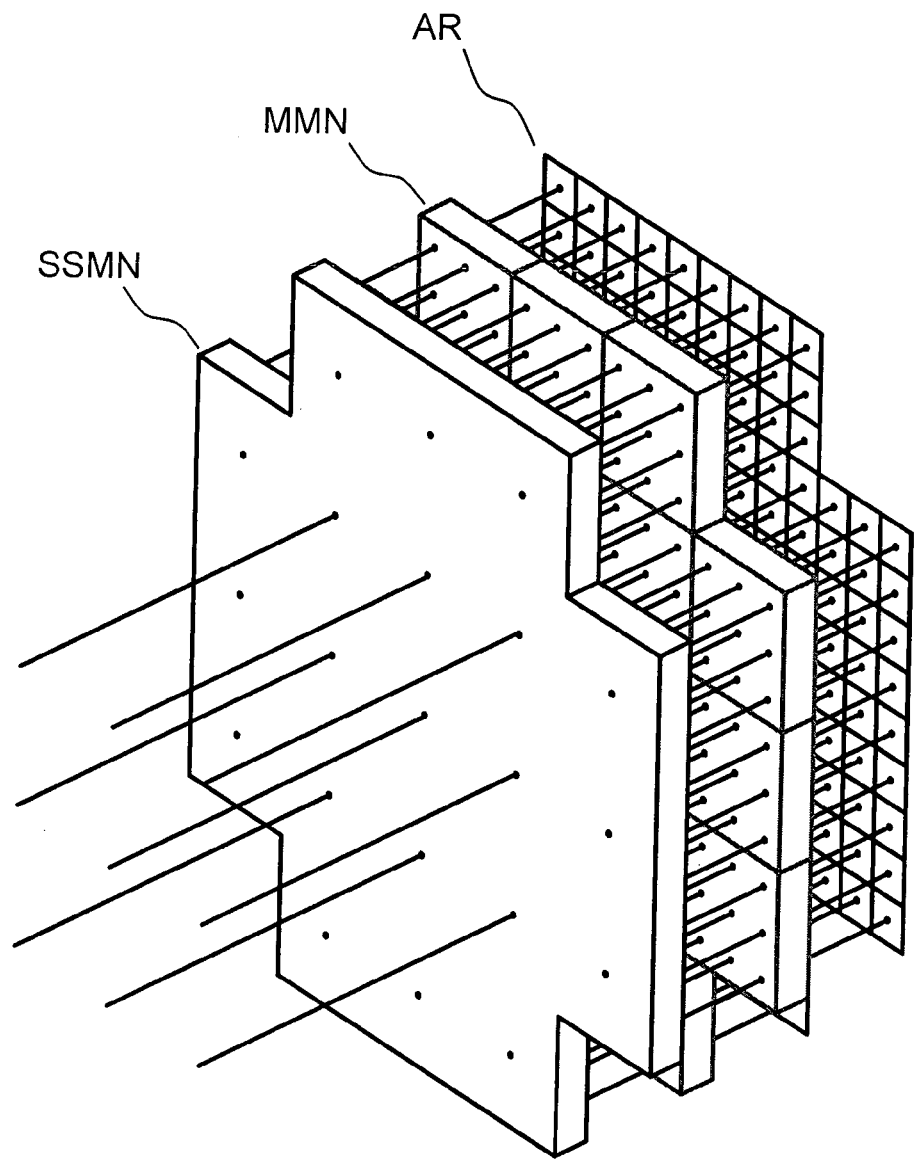
FIG. 29, an overall layout of the Array Antenna and Lossless Beamforming network according to FIGS. 22 to 28.

FIG. 19A recalls the relationship between the Reference Sub-Array RSA (and more generally an Overlapping Sub-Array OSA) and an Elementary Cell EC (i.e. a Non-Overlapping Sub-Array). FIG. 19B illustrates the Radiation Pattern of the NOSA (dotted line) and of the OSA (continuous line), cut along a single main axis. FIGS. 20A and 20B represent the NOSA and OSA radiation patterns, respectively, in greyscale. FIGS. 21A and 21B represent the same radiation patterns as contour plots, wherein numbers on the contour lines correspond to decibels.

It is worth noting that the scan losses are reduced of about 4 db in the Field of View.

E2) Design Example 2

In this design example the Non-Overlapping Sub-Array is composed of 3×3 AEs on a rectangular lattice (same as E1), the Multi-Mode Network is based on a 9×9 MD-DFT (same as E1), and the Overlapped Sub-Array is composed of 5 NOSA.

Array lattice, Elementary Cell and MD-DFT are the same of the Design Example 1 and the reader can refer to FIGS. 4 to 10 for relevant details.

Figure 30A:
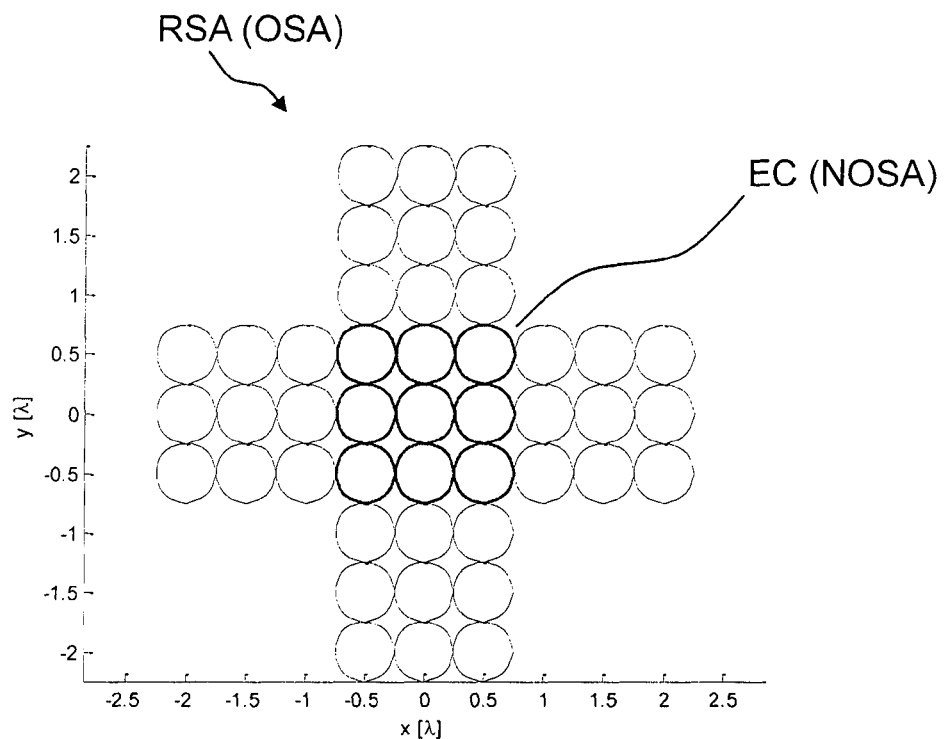
FIG. 30, simulated array geometry (FIG. 30A) and Sub-Array Radiation Pattern performance for a Non-Overlapping Sub-Array and an Overlapping Sub-Array according to said second exemplary embodiment of the invention (FIG. 30B)
Figure 30B:
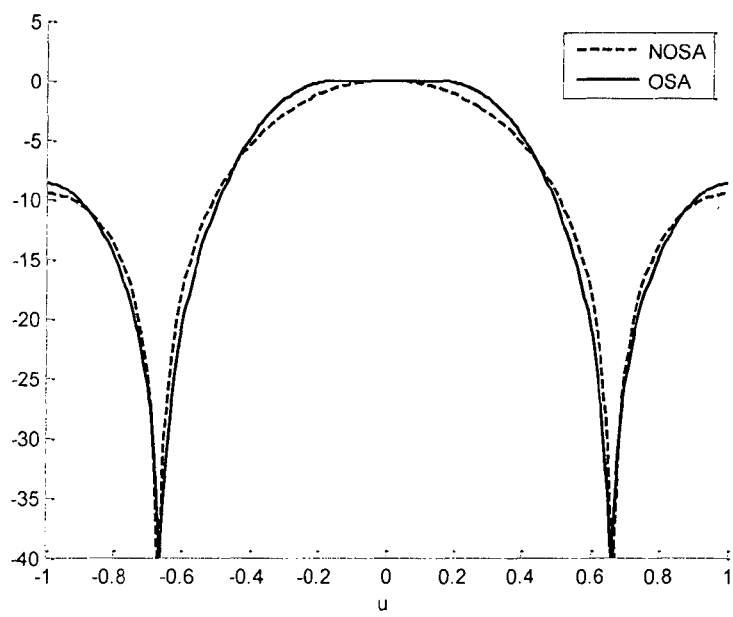
Figure 31A:
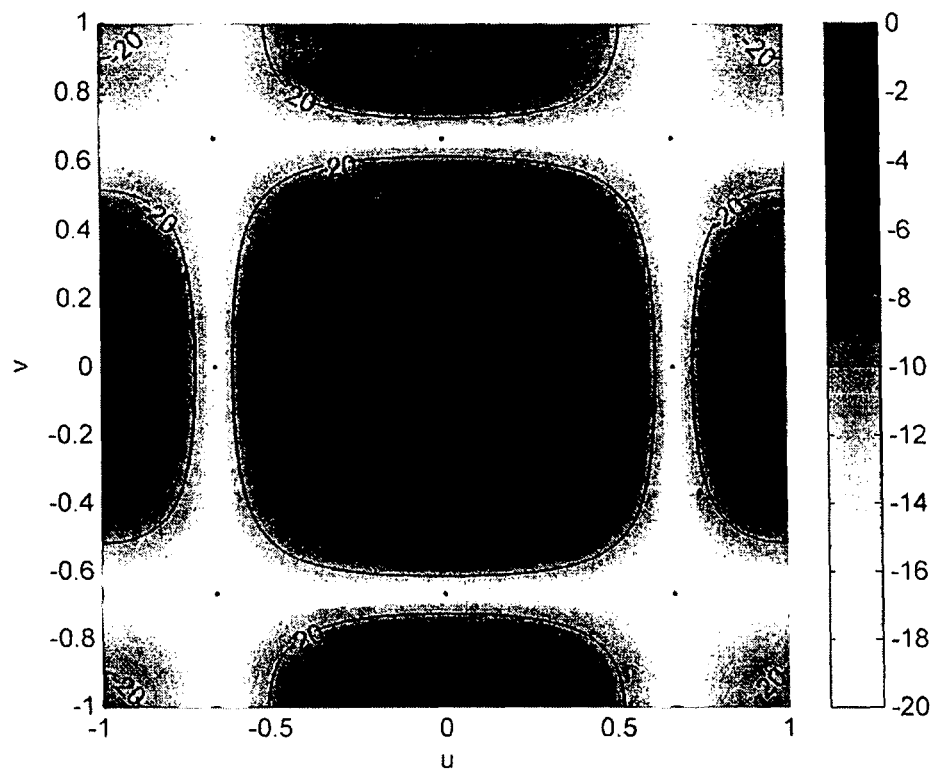
FIG. 31, a Sub-Array Radiation Pattern performance greyscale map for a Non-Overlapping Sub-Array (FIG. 31A) and an Overlapping Sub-Array (FIG. 31B) according to said second exemplary embodiment of the invention.
Figure 31B:
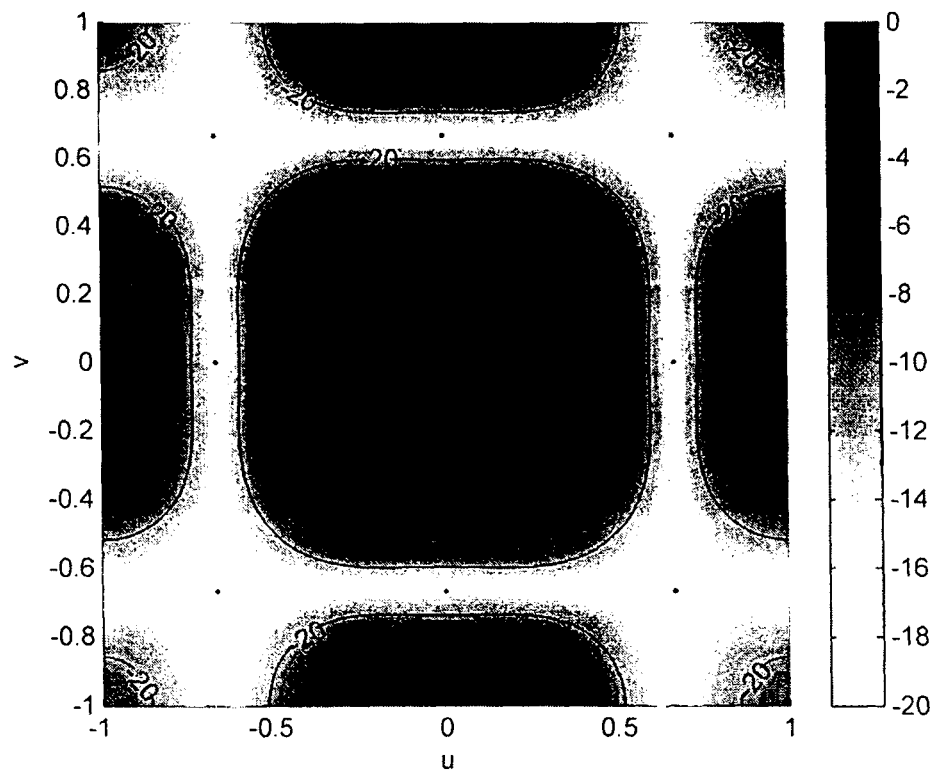
Figure 32A:
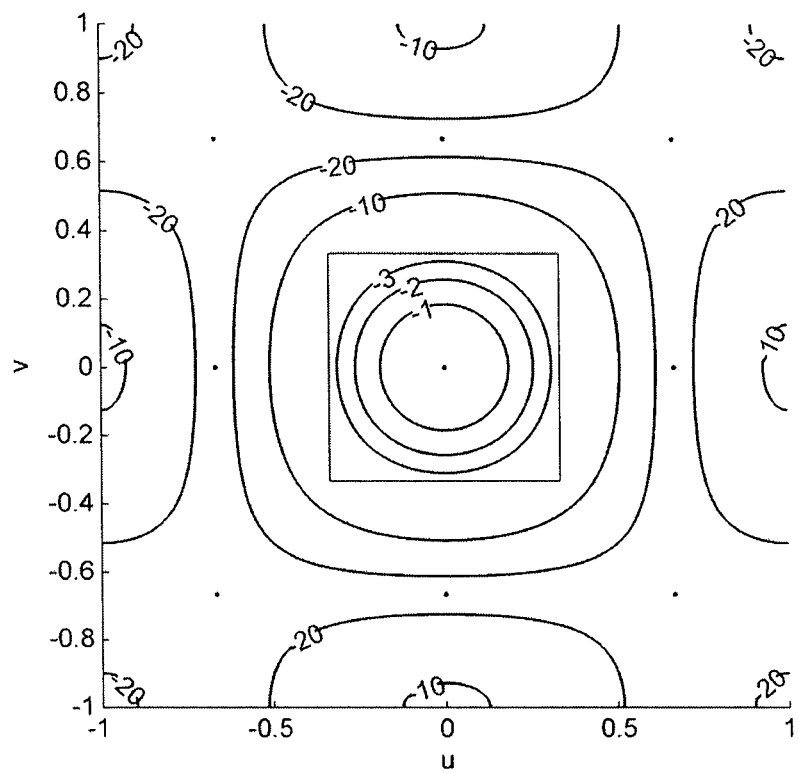
FIG. 32, a Sub-Array Radiation Pattern performance contour plot for a Non-Overlapping Sub-Array (FIG. 32A) and an Overlapping Sub-Array according (FIG. 32B) to said second exemplary embodiment of the invention.
Figure 32B:
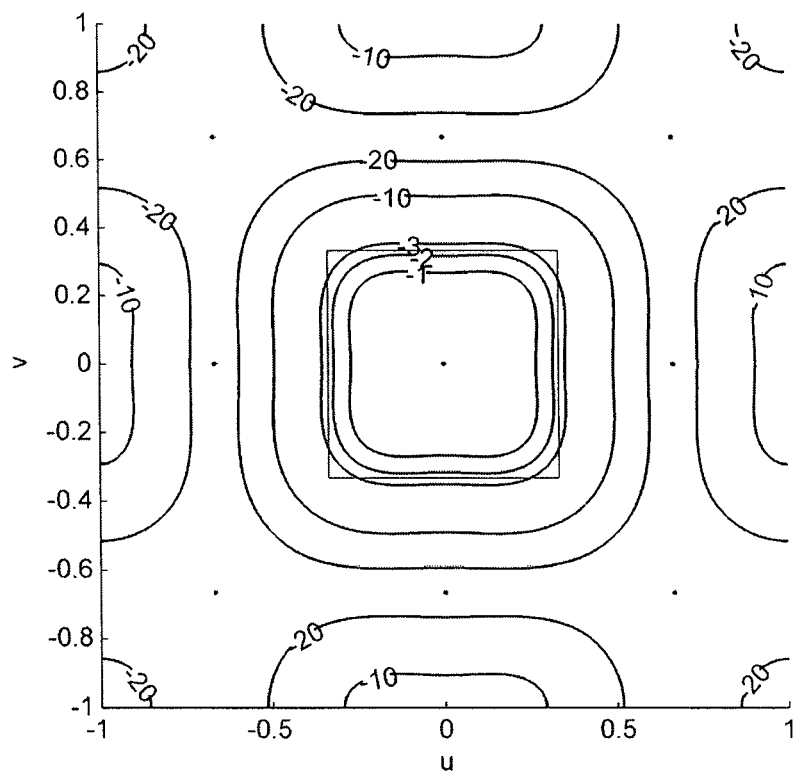
Figure 33A:
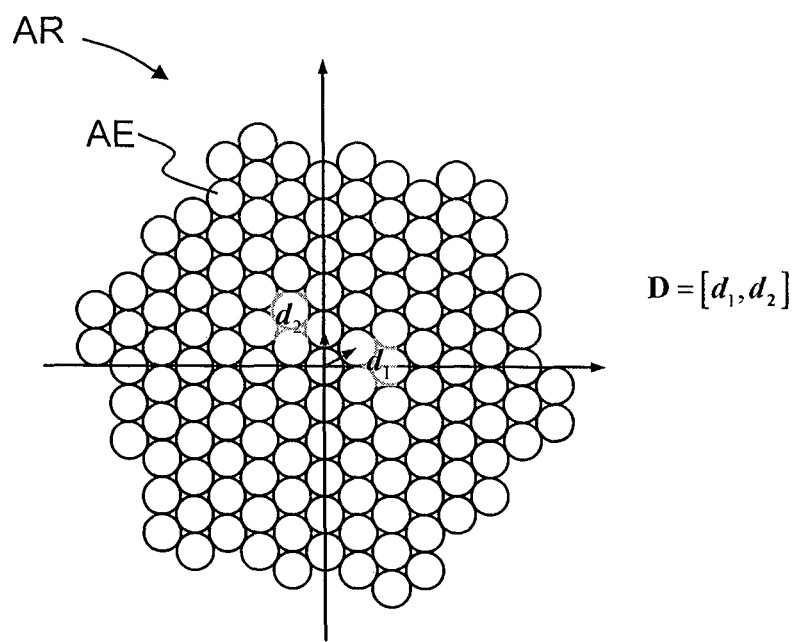
FIG. 33A, an Array Antenna (AR) with Antenna Elements (AE) disposed on a hexagonal lattice according to a third exemplary embodiment of the invention.
Figure 33B:
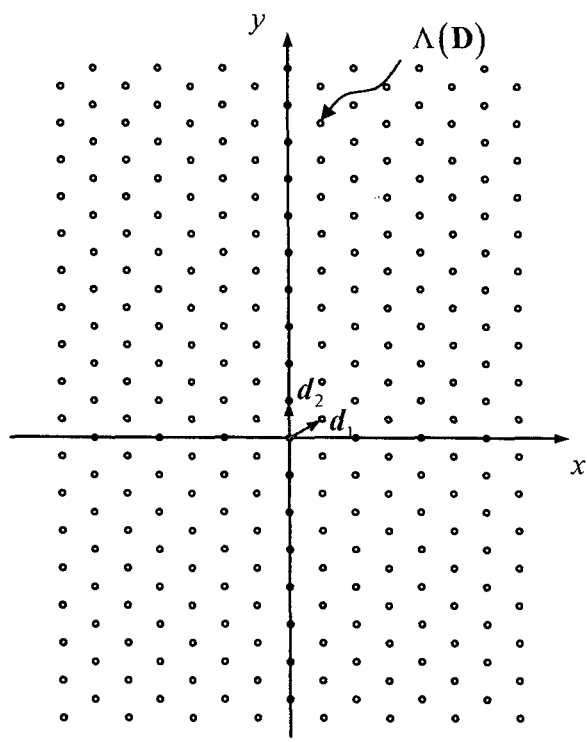
FIG. 33B, the Array Lattice of the Array Antenna of FIG. 33A.
Figure 34A:
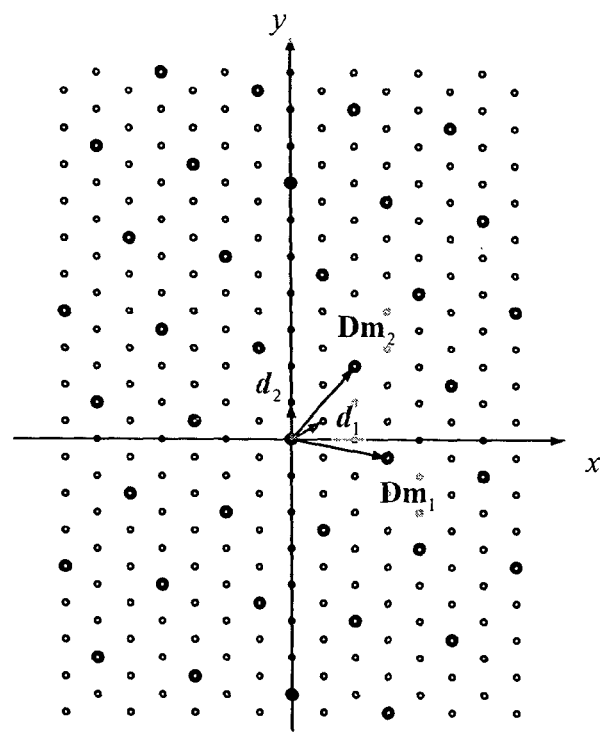
FIG. 34 the relationship between the Sub-Array Lattice (FIG. 34B) and the Array Lattice (FIG. 34A) of FIG. 33B.
Figure 34B:
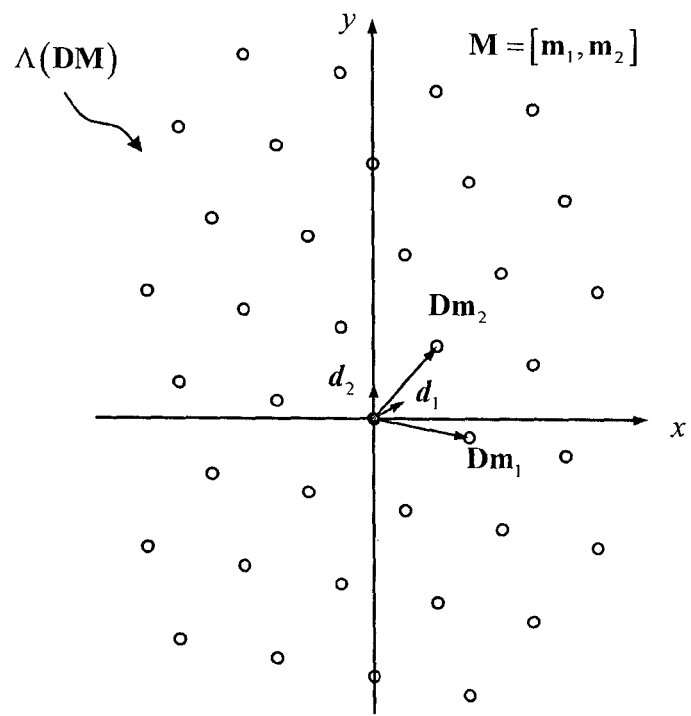
Figure 35A:
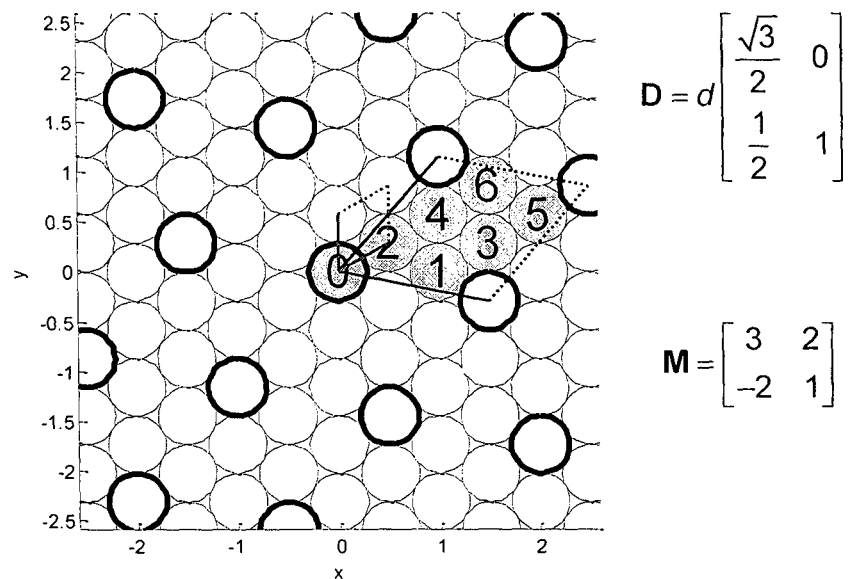
FIG. 35A, an Elementary Cell induced by the Sub-Array Lattice of FIG. 34B on the Array Lattice of FIG. 34A.
Figure 35B:
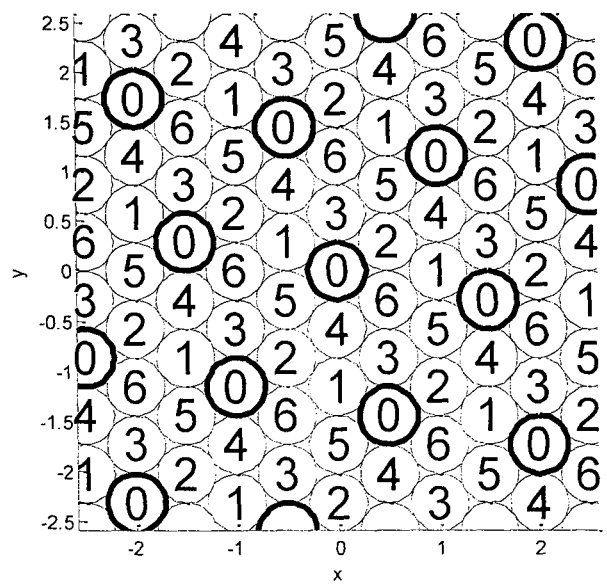
FIG. 35B, a tiling of the Array Lattice of FIG. 34A by means of the Elementary Cell of FIG. 35A.
Figure 36A:
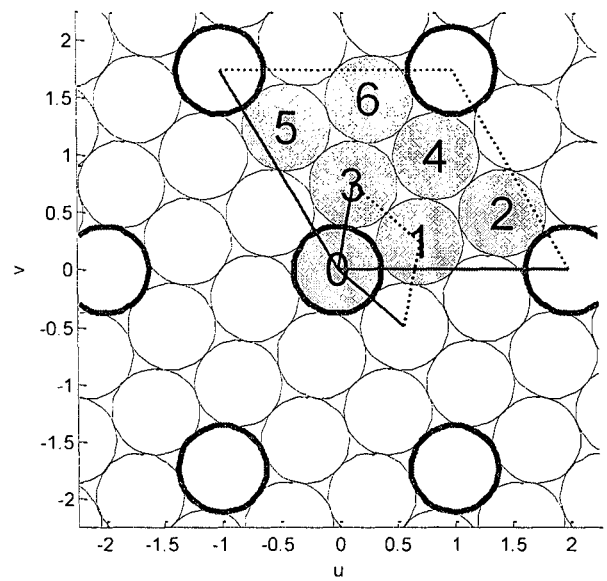
FIG. 36A, an Elementary Cell of the Beams Lattice generated by a MD-DFT based on the Array Lattice and Sub-Array-Lattice of FIG. 34A.
Figure 36B:
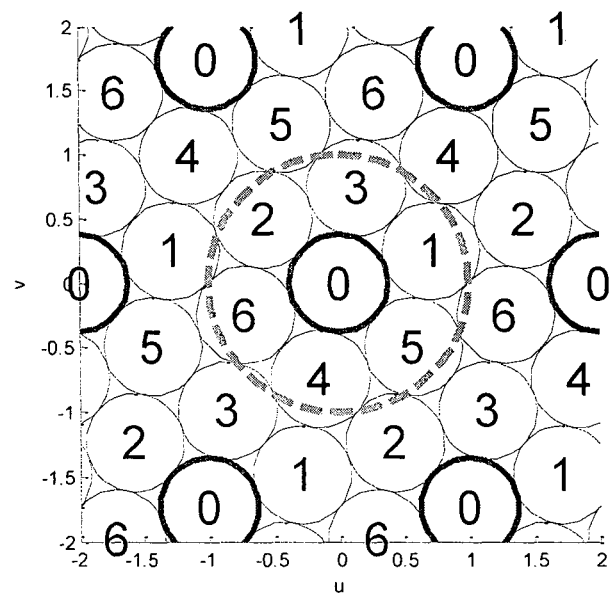
FIG. 36B, Grating lobes the Beams Lattice of FIG. 36A.
Figure 39:
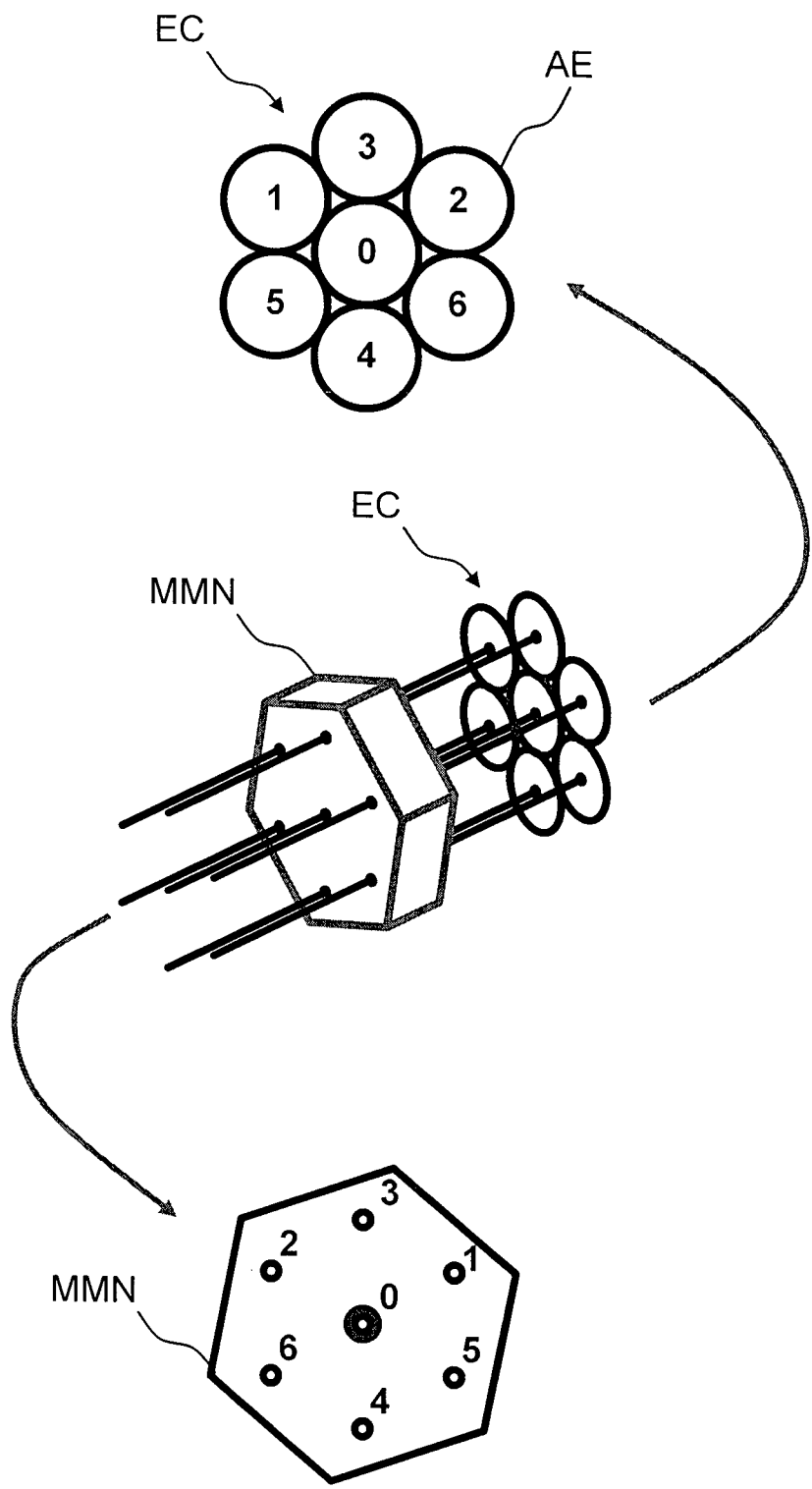
FIG. 39, interconnection of the Multi-Mode Network to the Antenna Elements constituting an Elementary Cell according to said third exemplary embodiment of the invention.
Figures 40A, 40B:
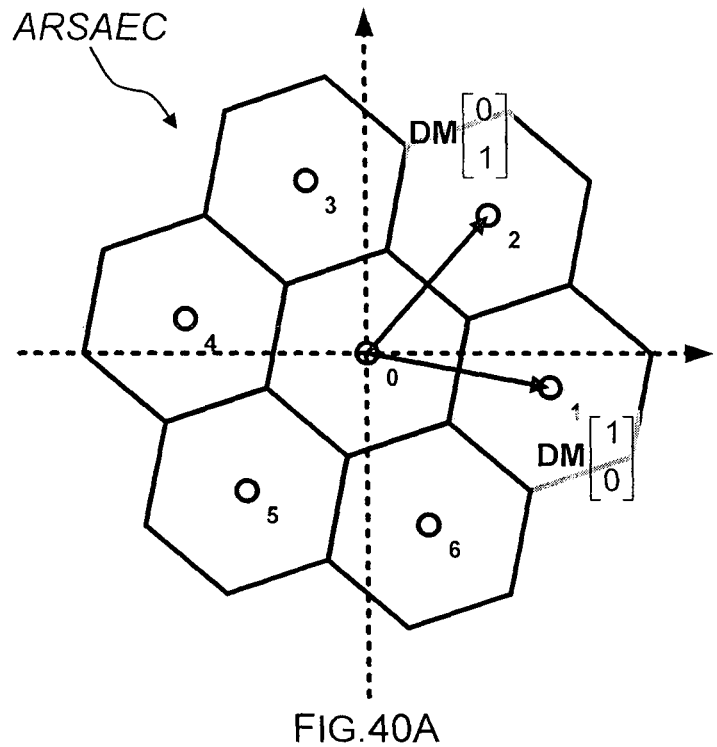
FIG. 40, Geometry (FIG. 40A) and coordinates vectors (FIG. 40B) of the Elementary Cells constituting the Array of Sub-Arrays according to said third exemplary embodiment of the invention.
Figure 41A:
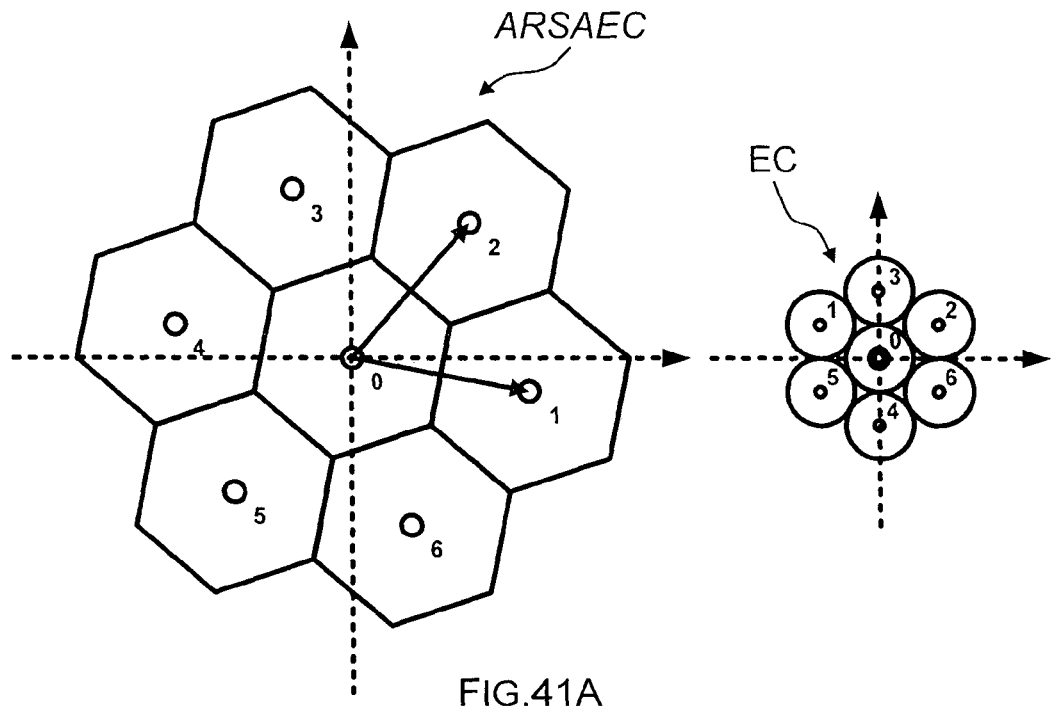
FIG. 41A, a numbering of the Elementary Cells constituting the Array of Sub-Arrays according to FIG. 40 (left), and of the Antenna Elements (AEs) constituting an Elementary Cell (EC) according to FIG. 37 (right)
Figure 41B:
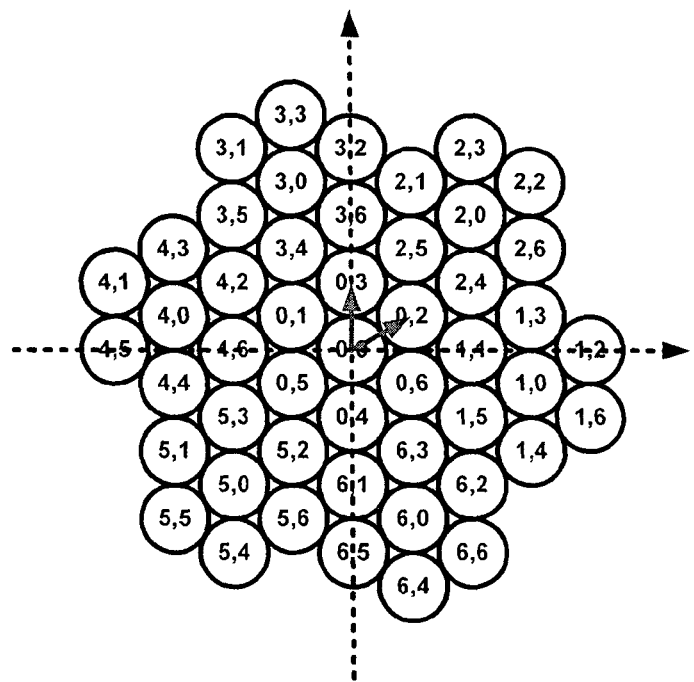
FIG. 41B, a numbering of the Antenna Elements constituting the Array of Sub-Arrays according to FIG. 41A.
Figure 42A:
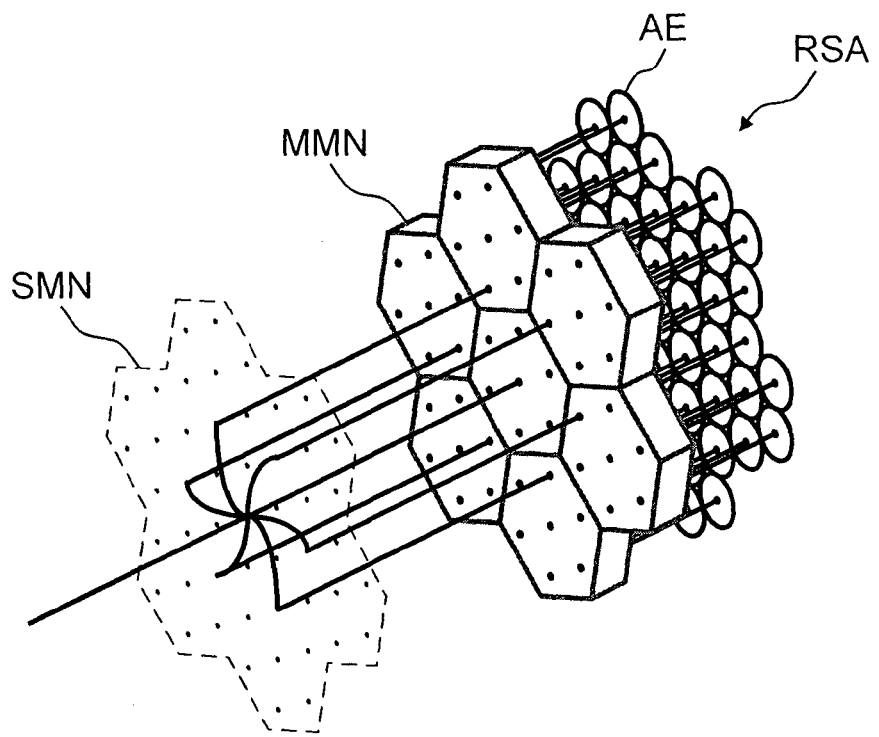
FIGS. 42A and 42B, a functional diagram of an Overlapping Sub-Array with interconnections of a Single-Mode Network to a Multi-Mode Networks (MMNs) and to Antenna Elements, according to said third exemplary embodiment of the invention.
Figure 42B:
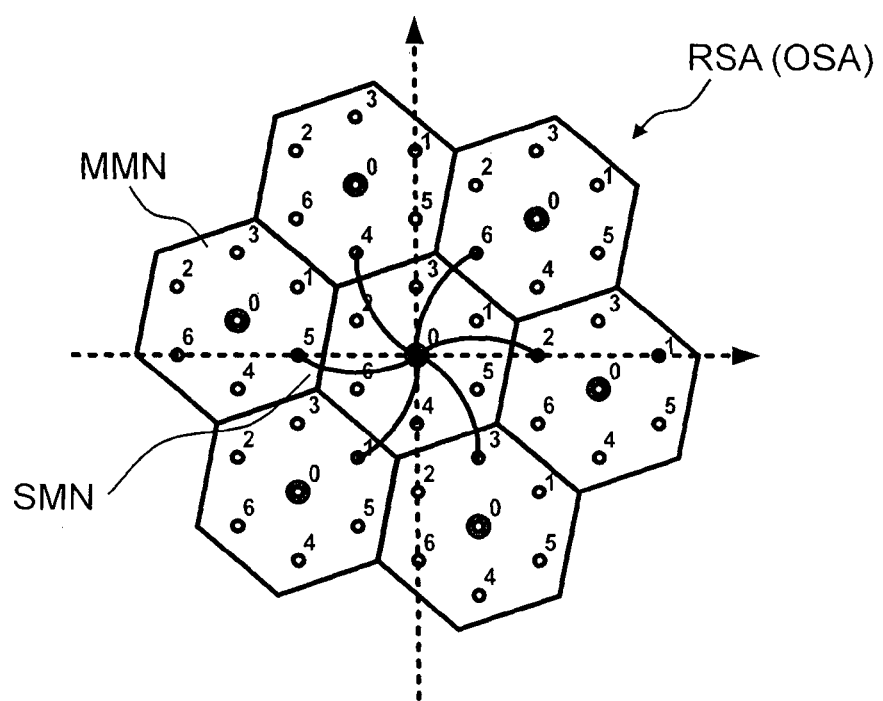
Figure 43:
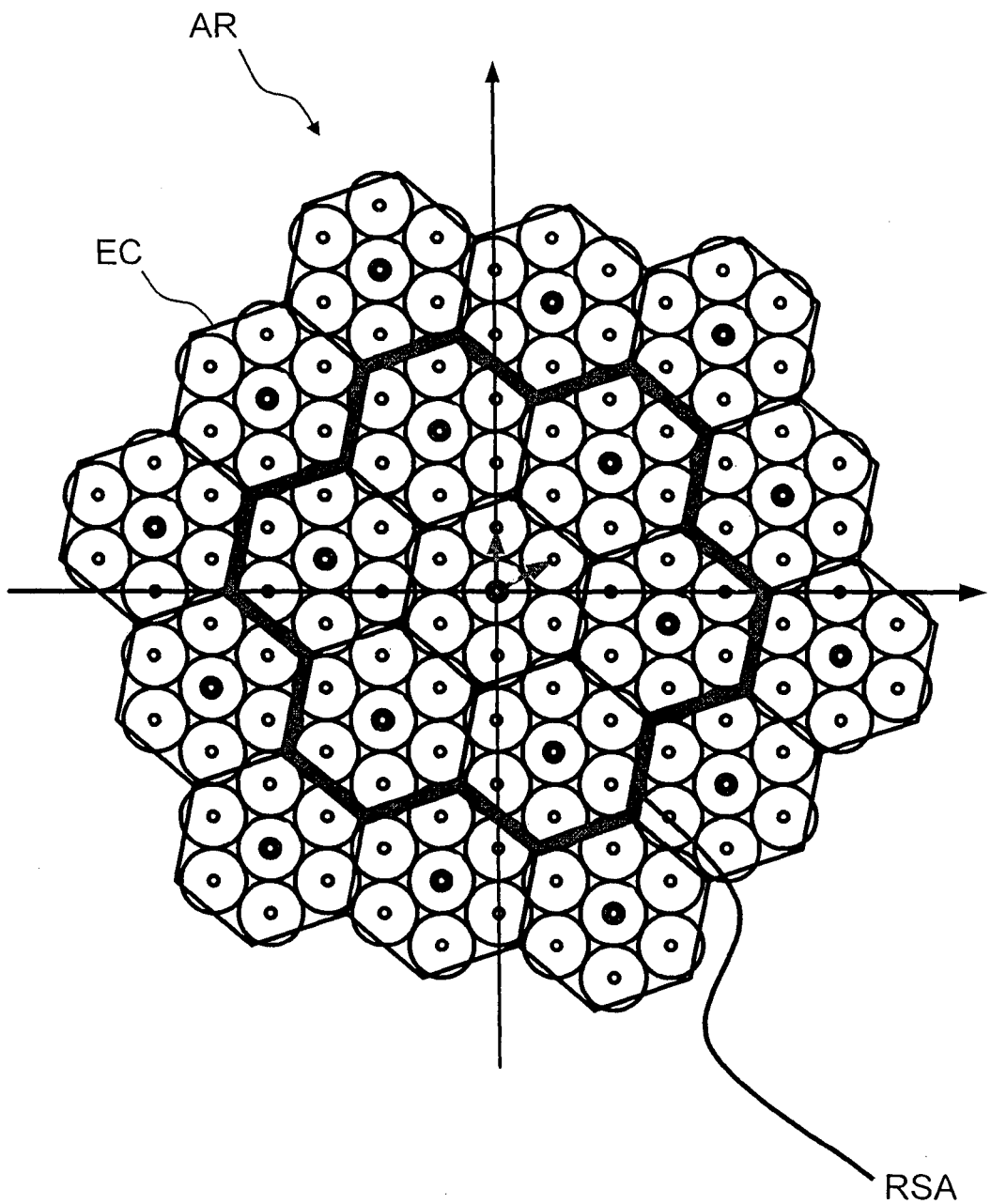
FIG. 43, a layout of overall Array and highlight of the Reference Sub-Array corresponding to the Overlapping Sub-Array of FIG. 42A.
Figure 44:
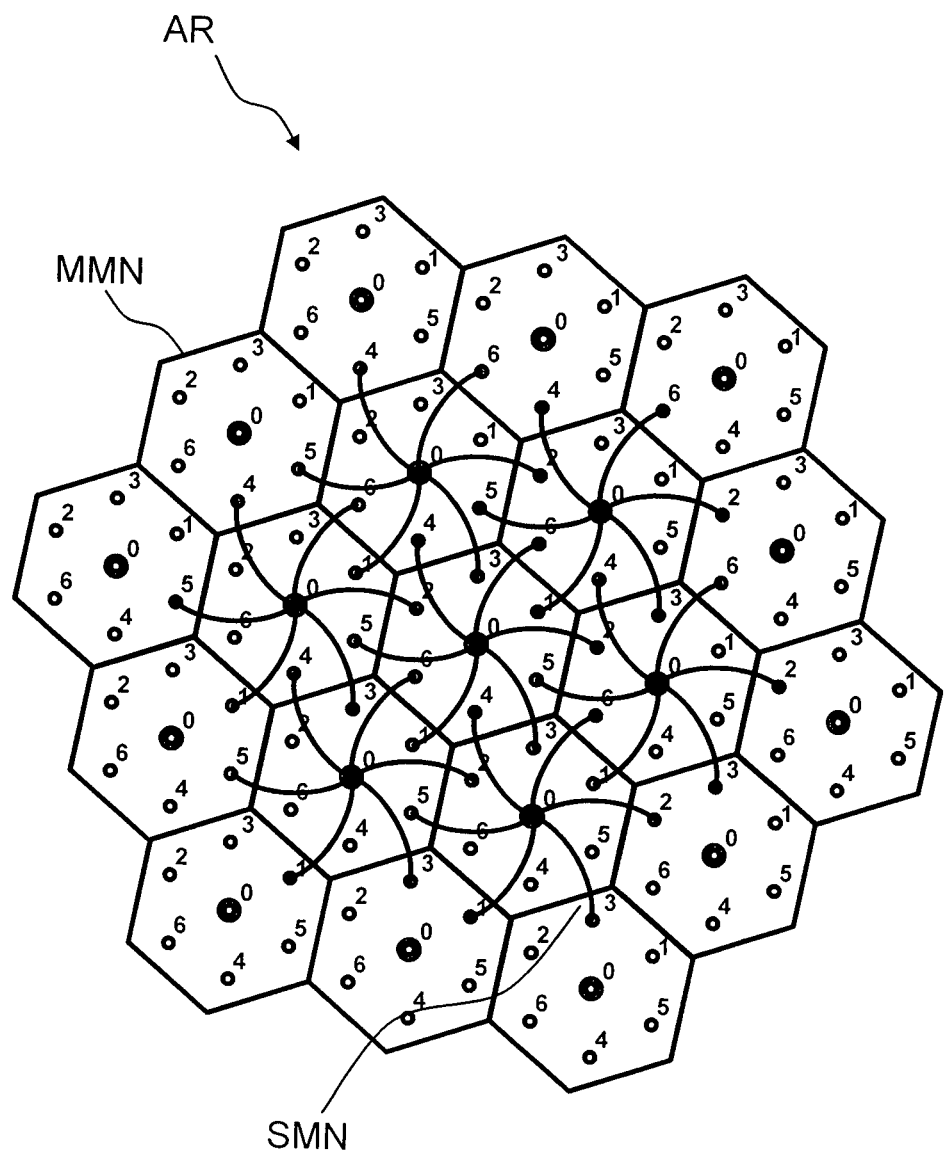
FIG. 44, an interconnection diagram of a Single-Mode Networks required for each Overlapping Sub-Array according to said third exemplary embodiment of the invention.
Figure 45:
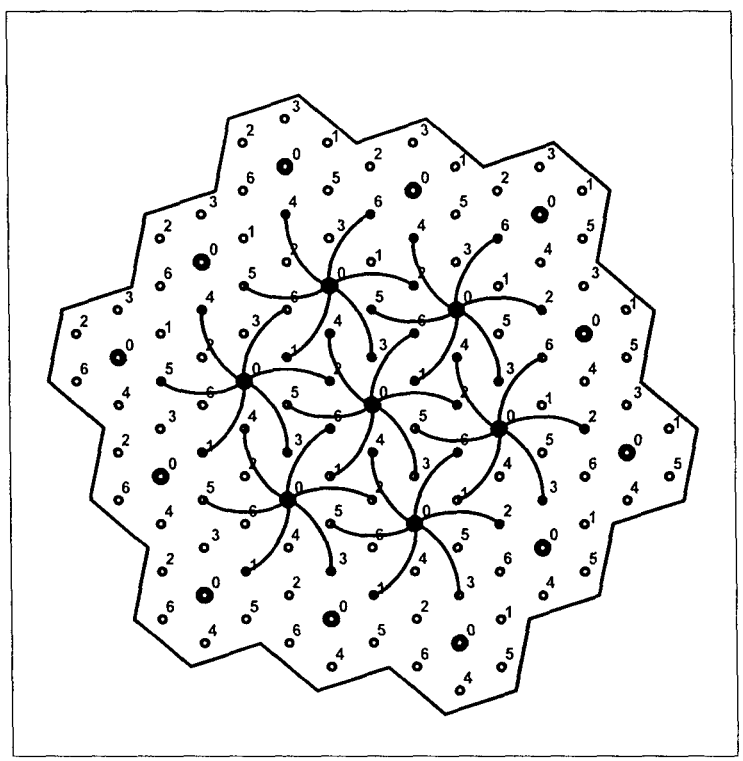
FIG. 45, a set of Single-Mode Networks according to FIG. 44 implemented as a single layer of non-crossing Single-Mode Networks.
Figure 46A:
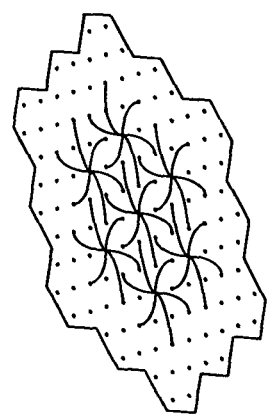
FIGS. 46A and 46B, an assembly of the set of non-crossing Single-Mode Networks of FIG. 45.
Figure 46B:
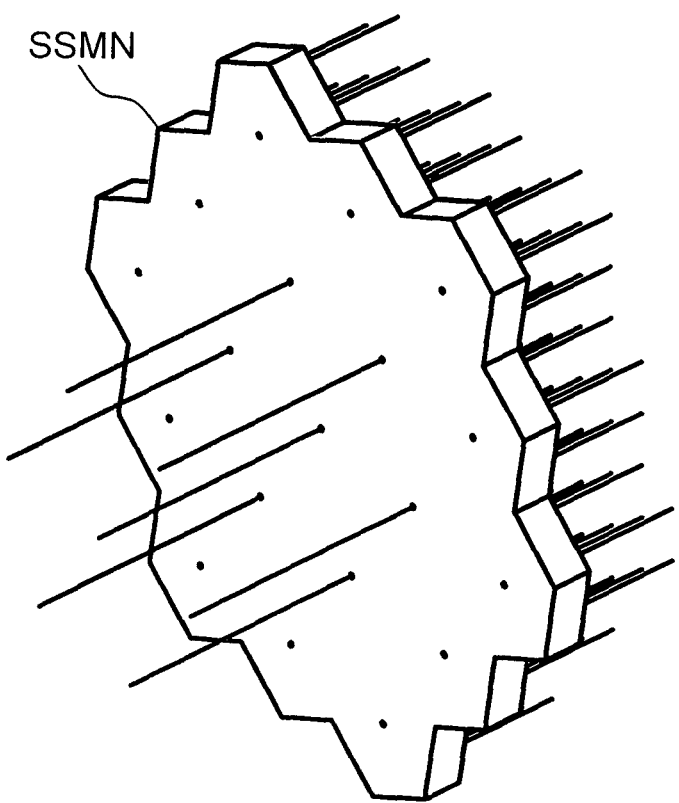
Figure 47:
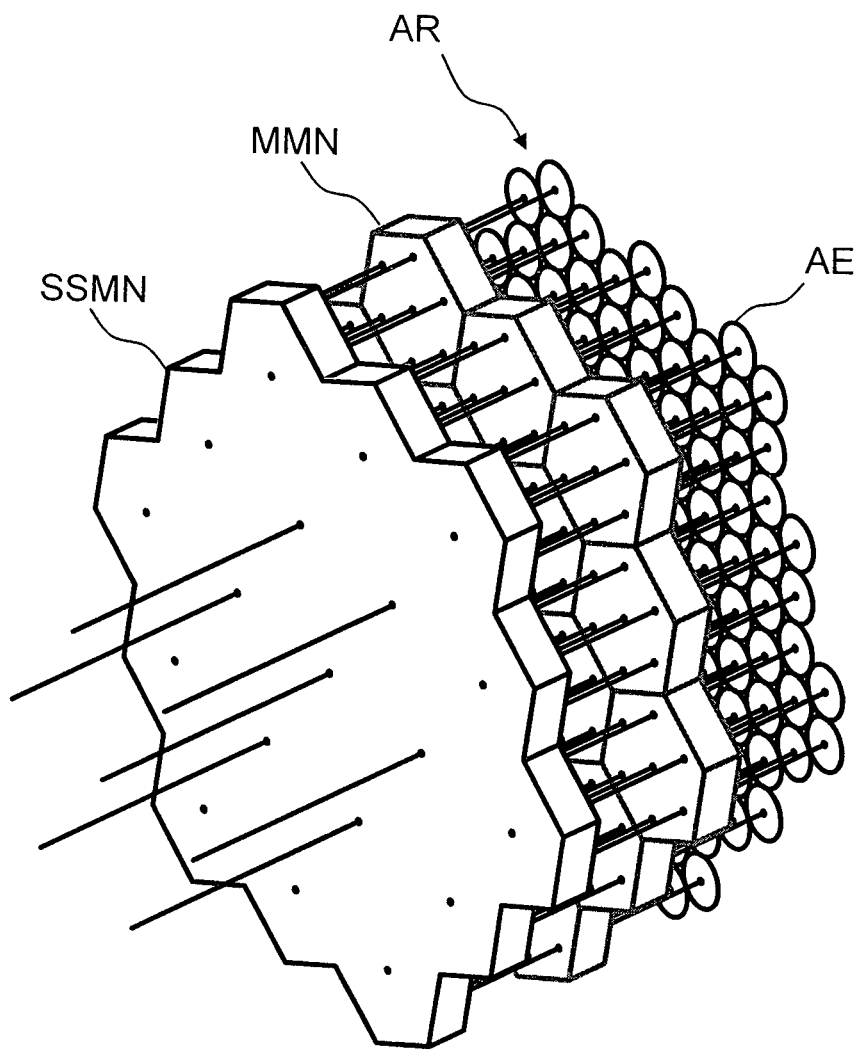
FIG. 47, an overall layout of the Array Antenna and a Lossless Beamforming Network according to said third exemplary embodiment of the invention.

The details of the synthesis according to the present invention are reported in FIGS. 22 to 29. The scanning performances of the Overlapped Sub-Array are reported in FIGS. 30 to 32 and therein compared with the scanning performances of a Non-Overlapped Sub-Array of similar geometry.

FIGS. 22A-32B correspond to FIGS. 11A-21B mutatis mutandis, therefore it is not necessary to discuss them in detail.

It is worth noting that the scan losses are reduced of about 2 dB in the Field of View.

E3) Design Example 3

In this design example the Non-Overlapping Sub-Array is composed of 7 AEs on a hexagonal lattice, the Multi-Mode Network is based on a 7×7 MD-DFT, and the Overlapped Sub-Array is composed of 7 NOSA.

Figure 48A:
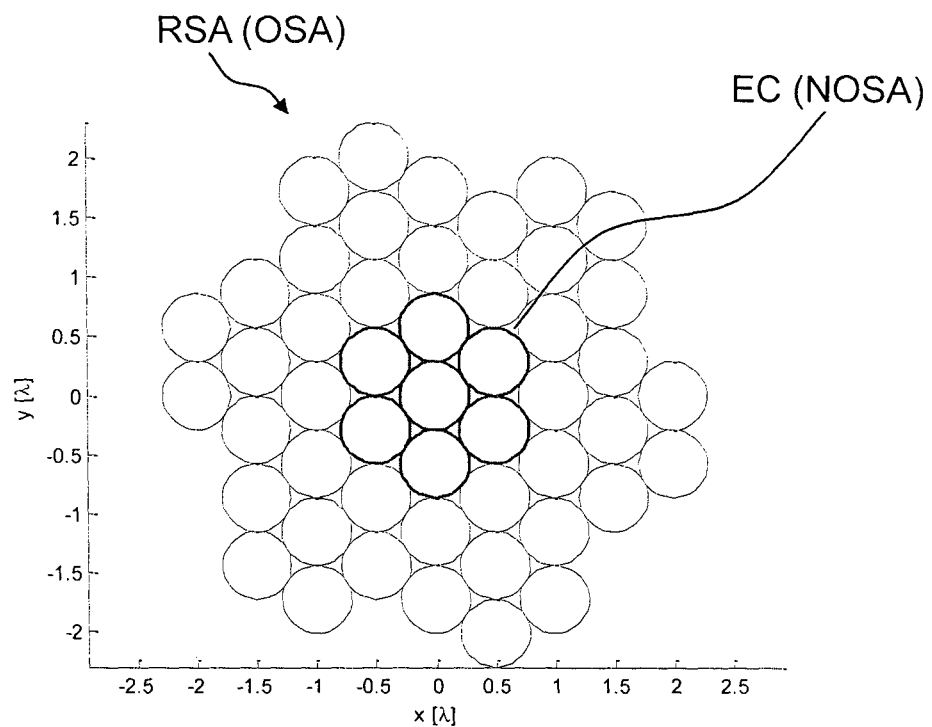
FIG. 48, simulated array geometry (FIG. 48A) and Sub-Array Radiation Pattern performance for a Non-Overlapping Sub-Array and an Overlapping Sub-Array (FIG. 48B) according to said third exemplary embodiment of the invention.
Figure 48B:
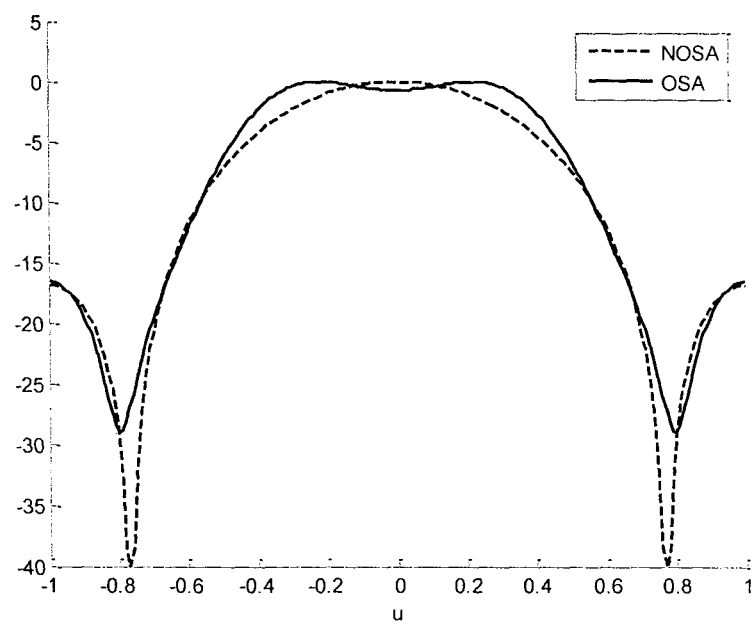
Figure 49A:
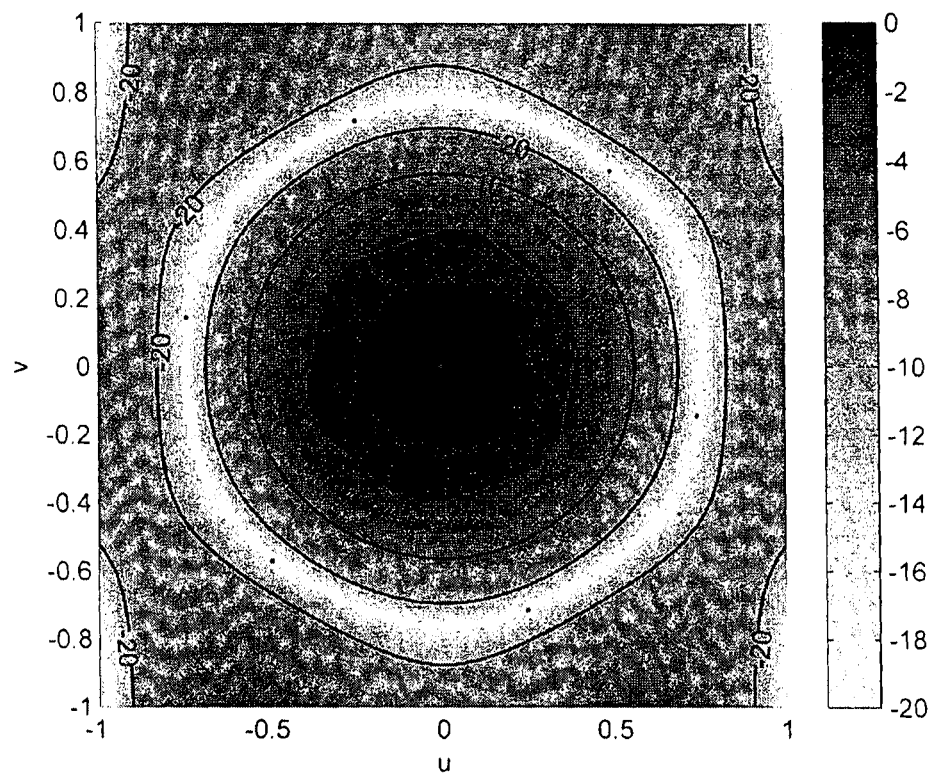
FIG. 49, a Sub-Array Radiation Pattern performance greyscale map for a Non-Overlapping Sub-Array (FIG. 49A) and an Overlapping Sub-Array (FIG. 49B) according to said third exemplary embodiment of the invention.
Figure 49B:
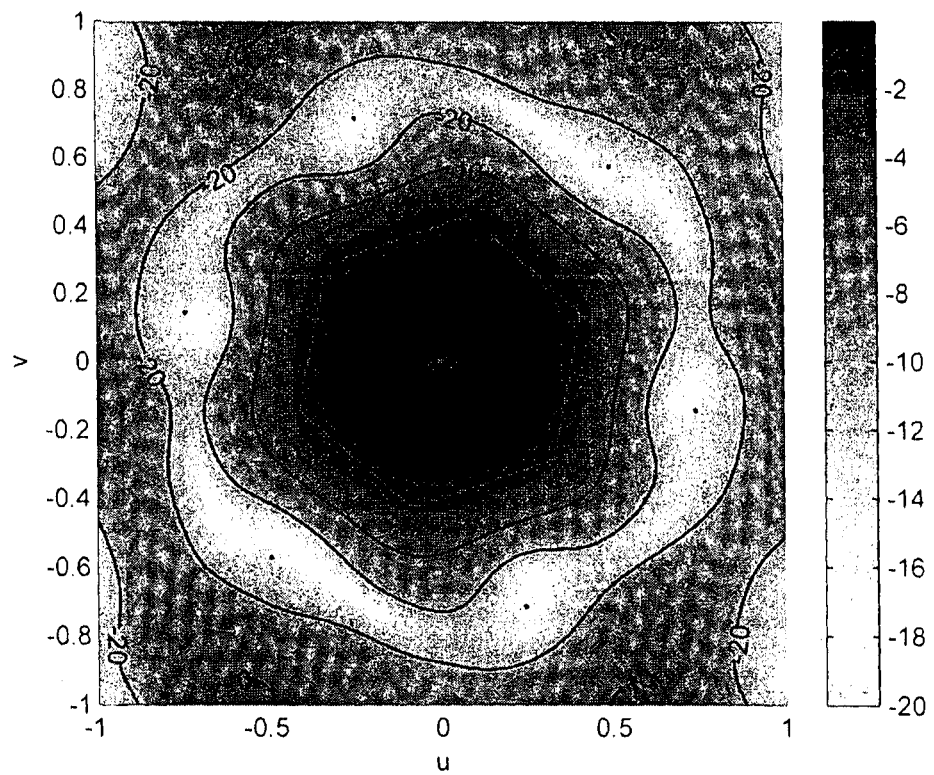
Figure 50A:
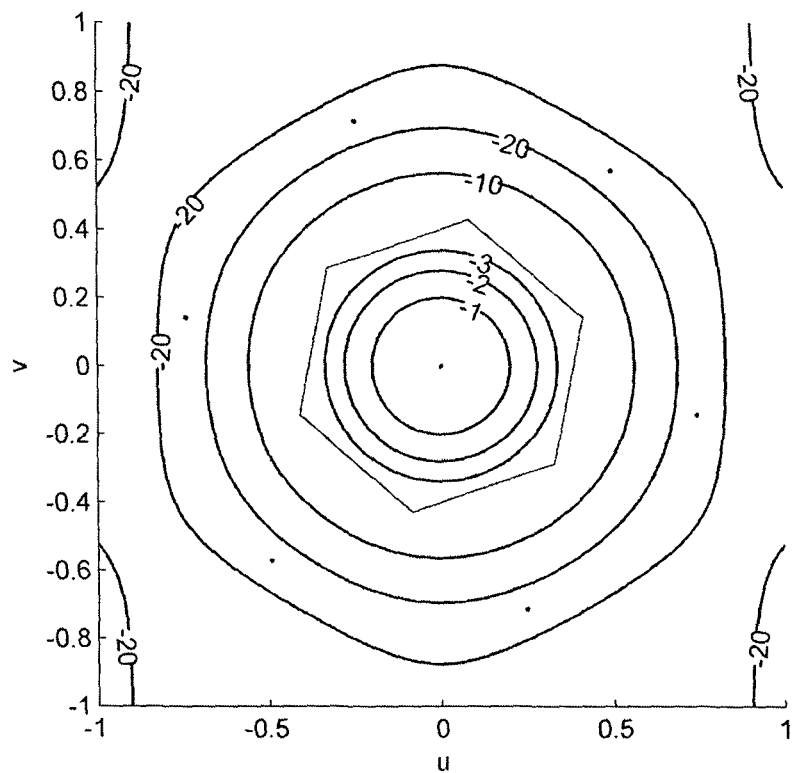
FIG. 50, a Sub-Array Radiation Pattern performance contour plot for a Non-Overlapping Sub-Array (FIG. 50A) and an Overlapping Sub-Array (FIG. 50B) according to said third exemplary embodiment of the invention.
Figure 50B:
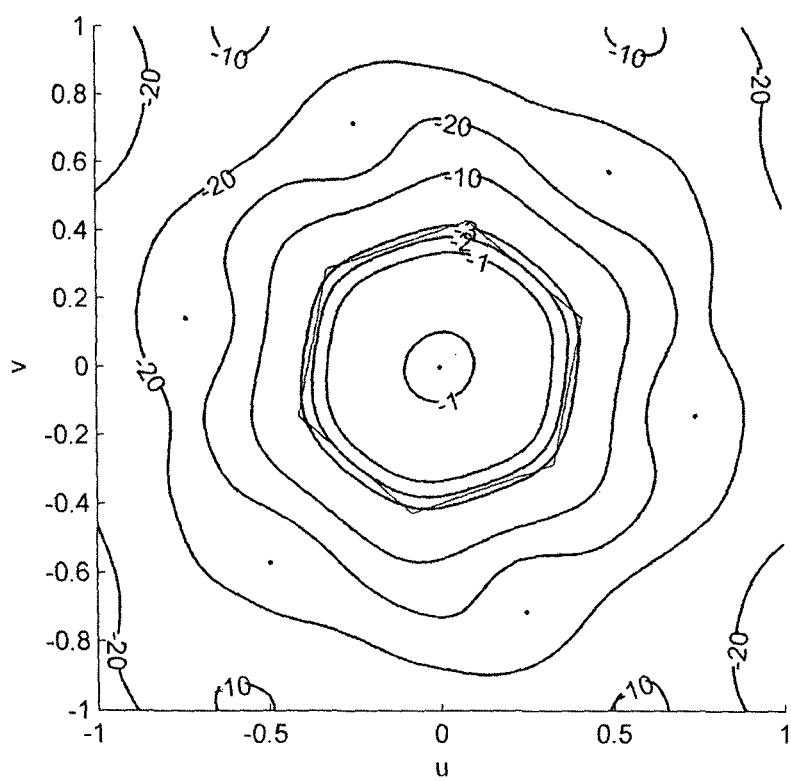

The details of the synthesis according to the present invention are reported in FIGS. 33 to 47. The scanning performances of the Overlapped Sub-Array are reported in FIGS. 48 to 50 and therein compared with the scanning performances of a Non-Overlapped Sub-Array of similar geometry (i.e. composed of 7 AEs on a hexagonal lattice).

FIGS. 33A-50B correspond to FIGS. 4A-21B mutatis mutandis, therefore it is not necessary to discuss them in detail.

It is worth noting that the scan losses are reduced of about 4 db in the Field of View.

The design examples discussed above refer to multi-beam application. The design of single-beam antennas according to the present invention is performed essentially in the same way, the only special feature being that $N_B$=1, i.e. instead of generating a plurality of beams over a region of interest, a single beam is generated to scan said region of interest.

REFERENCES

[1] G. Toso, P. Angeletti, *A Method of Designing and Manufacturing an Array Antenna*, U.S. Pat. No. 7,797,816.
[2] G. Ruggerini, G. Bellaveglia, G. Toso, P. Angeletti, *Multibeam Active Aperiodic Lens*, European Patent Application EP2090995.
[3] W. Patton, "Limited Scan Arrays", in *Phased Array Antennas: Proc.* 1970 *Phased Array Symposium*, A. A. Oliner and G. A. Knittel, Eds. Artech House, pp. 254-270, 1972.
[4] G. Borgiotti, "Degrees of freedom of an antenna scanned in a limited sector", IEEE International Symposium, pp. 319-320, 1975.
[5] J. Stangel, "A basic theorem concerning the Electronic scanning capabilities of antennas", URSI Commission 6, spring meeting, June 1974.
[6] M. C. Viganó, G. Toso, C. Mangenot, "Direct Radiating Arrays With Quasi-Flat-Top Pattern Sub-Arrays", 29th ESA Antenna Workshop on Multiple Beams and Reconfigurable Antennas, 18-20 Apr. 2007.
[7] S. P. Skobelev, "Methods of constructing optimum phased-array antennas for limited field of view", IEEE Antennas Propagation Magazine, Vol. 40, No. 2, pp. 39-49, April 1998.
[8] R. J. Mailloux, P. R. Caron, "A class of phase interpolation circuits for scanning phased arrays", IEEE Trans., Vol. AP-18, No. 1, pp. 114-116, January 1970.
[9] R. J. Mailloux and P. R. Franchi, *Phased Array Antenna with Array Elements Coupled to Form a Multiplicity of Overlapped Subarrays*, U.S. Pat. No. 3,938,160, 1976.
[10] R. J. Mailloux, "An Overlapped Subarray for Limited Scan Application", IEEE Transactions on Antennas and Propagation, Vol. 22, No. 3, pp. 487-489, March 1974.
[11] R. J. Mailloux, L. Zahn, A. Martinez, and G. Forbes, "Grating Lobe Control in Limited Scan Arrays", IEEE Transactions on Antennas and Propagation, Vol. 27, No. 1, pp. 79-85, January 1979.
[12] R. J. Mailloux, "Synthesis of Spatial Filters with Chebyshev Characteristics", IEEE Transactions on Antennas and Propagation, Vol. 24, No. 2, pp. 174-181, March 1976.
[13] P. R. Franchi and R. J. Mailloux, "Theoretical and Experimental Study of Metal Grid Angular Filters for Sidelobe Suppression", IEEE Transactions on Antennas and Propagation, Vol. 31, No. 3, pp. 445-10 450, May 1983.
[14] E. C. DuFort, *Limited Scan Phased Array System*, U.S. Pat. No. 4,228,436.
[15] S. P. Skobelev, "Analysis and Synthesis of an Antenna Array with Sectoral Partial Radiation Patterns", Telecommunications and Radio Engineering, Vol. 45, pp. 116-119, November 1990.
[16] D. Petrolati, P. Angeletti, A. Morini, G. Toso, "Skobelev Network Optimization by Sequential Quadratic Programming", Electronics Letters, Vol. 46, No. 8, pp. 553-554, April 2010.
[17] J. P. Shelton, "Multiple Feed Systems for Objectives", IEEE Transactions on Antennas and Propagation, Vol. 13, pp. 992-994, November 1965.
[18] D. Betancourt, P. Angeletti, C. del Rio Bocio, "Bea Forming Networks Design Using Bi-dimensional Double Fast Fourier Transforms", Proceedings of the 26th AIAA International Communications Satellite Systems Conference (ICSSC 2008), San Diego (California), USA, 10-12 Jun. 2008.
[19] G. Ploussios, *Large element antenna array with grouped overlapped apertures*, U.S. Pat. No. 4,257,050.
[20] Jeffrey S. Herd et al, "Design Considerations and Results for an Overlapped Sub-array Radar Antenna", Proceedings of the 2005 IEEE Aerospace Conference, pp. 1087-1092, 2005.
[21] A. D. Craig, S. J. Stirland, *System for Simplification of Reconfigurable Beam-Forming Network Processing Within a Phased Array Antenna for a Telecommunication Satellite*, WO 2009/013527.
[22] P. Angeletti, "Simple Implementation of Vectorial Modulo Operation based on Fundamental Parallelepiped". Electronics Letters, Vol. 48, No. 3, pp. 159-160, doi: 10.1049/el.2011.3667, 2 Feb. 2012.
[23] J. L. Butler, *Multiple beam antenna system employing multiple directional couplers in the leadin*, U.S. Pat. No. 3,255,450.
[24] R. Mersereau, T. Speake, "A unified treatment of Cooley-Tukey algorithms for the evaluation of the multidimensional DFT", IEEE Transactions on Acoustics, Speech, and Signal Processing, Vol. 29, No. 9, pp. 1011-1018, October 1981.
[25] A. Guessoum, R. Mersereau, "Fast algorithms for the multidimensional discrete Fourier transform", IEEE Transactions on Acoustics, Speech, and Signal Processing, Vol. 34, No. 4, pp. 937-943, August 1986.
[26] R. Bernardini, G. Cortelazzo, G. Mian, "A new technique for twiddle factor elimination in multidimensional FFT's", IEEE Transactions on Signal Processing, Vol. 42, No. 8, pp. 2176-2178, August 1994.
[27] F. Coromina, J. Ventura-Traveset, M. Yarwood, W. Bosch, *Beam forming network for radiofrequency antennas*, U.S. Pat. No. 5,812,088.
[28] P. Angeletti, *Reconfigurable Beam-Forming-Network Architecture*, European Patent No. 2,296,225; US Patent Application No. 2011/0102263.

The invention claimed is:

1. A beam-forming network (BFN) for an emitting array antenna, having $N_B \geq 1$ beam ports (BP), each corresponding to an antenna beam, and $N_E > 1$ antenna ports (AP), each corresponding to an antenna element, the network comprising:
   a multi-beam network (MBN) having at least $N_B$ input ports connected to respective beam ports of the beam-forming network and at least $N_{OSA} > 1$ output ports, for associating to each said output port a linear combination of input signals from respective input ports;
   a set of at least $N_{OSA}$ lossless single-mode networks (SMN), each single-mode network having an input port (OSA-IP) connected to a respective output port of said multi-beam network and at least $N_{NOSA}^{OSA} > 1$ output ports, for associating to each said output port a signal obtained by weighting an input signal from said input port; and
   a set of at least $N_{NOSA} \geq N_{NOSA}^{OSA}$ lossless multi-mode networks (MMN), each lossless multi-mode network having at least $N_{NOSA}^{OSA}$ input ports (NOSA-IP), each one connected to an output port of a respective single-mode network, and at least $N_E^{NOSA} > 1$ output ports connected to respective antenna ports of the beam-forming network, for associating to each said output port a linear combination of input signals from respective input ports.

2. A beam-forming network according to claim 1, wherein all said single-mode networks are identical to each other and all said multi-mode networks are identical to each other, and wherein the output ports of each single-mode network are connected to different homologue input ports of different homologue ports of said $N_{NOSA} \geq N_{NOSA}^{OSA}$ multi-mode networks.

3. A beam-forming network according to claim 1, wherein each said multi-modes network implements a one- or two-dimensional Fourier transform.

4. A beam-forming network according to claim 1, wherein said multi-beam network is reconfigurable.

5. A beam-forming network according to claim 1, further comprising power amplifiers (HPA) placed at the input ports of said single-mode networks.

6. A beam-forming network according to claim 1, further comprising power amplifiers (HPA) placed at the output of said multi-mode networks.

7. A beam-forming network (BFN) for a receiving array antenna, having $N_B \geq 1$ beam ports (BP), each corresponding to an antenna beam, and $N_E > 1$ antenna ports (AP), each corresponding to an antenna element, the network comprising:
- a set of at least $N_{NOSA} > 1$ lossless multi-mode networks (MMN), each multi-mode network having at least $N_E^{NOSA} > 1$ input ports connected to respective antenna ports of the beam-forming network, and at least $N_{NOSA}^{OSA} > 1$ output ports, for associating to each said output port a linear combination of input signals from respective input ports;
- a set of at least $N_{OSA}$ lossless single-mode networks (SMN), each single-mode network having at least $N_{NOSA}^{OSA}$ input ports connected to respective output ports of respective multi-mode networks and an output port, for associating to said output port a signal obtained by weighting an input signal from said input ports; and
- a multi-beam network (MBN) having at least $N_{OSA}$ input ports connected to the output ports of respective single-mode networks and at least $N_B$ output ports connected to respective beam ports of the beam-forming network, for associating to each said output port a linear combination of input signals from respective input ports.

8. A beam-forming network according to claim 7, wherein all said single-mode networks are identical to each other and all said multi-mode networks are identical to each other, and wherein the input ports of each single-mode network are connected to different homologue output ports of different homologue ports of said $N_{NOSA} \geq N_{NOSA}^{OSA}$ multi-mode networks.

9. A beam-forming network according to claim 7, wherein each said multi-modes network implements a one- or two-dimensional Fourier transform.

10. A beam-forming network according to claim 7, wherein said multi-beam network is reconfigurable.

11. An array antenna comprising $N_E$ antenna elements (AE) and a beam-forming network (BFN) according to claim 1, whose antenna ports are connected to said antenna elements.

12. An array antenna according to claim 11, wherein said antenna elements (AE) form a lattice partitioned into identical non-overlapping sub-arrays (NOSA) which, in turn, form an array of sub-arrays which is partitioned into identical overlapping sub-arrays (OSA), each of said overlapping sub-arrays being constituted by a plurality of non-overlapping sub-arrays, and wherein:
- all the antenna elements belonging to a same non-overlapping sub-array are connected to a same multi-mode network (MMN); and
- all the multi-mode networks connected to non-overlapping sub-arrays belonging to a same overlapping sub-array are connected to a same single-mode network (SMN).

13. An array antenna according to claim 11, wherein said antenna elements are organized in a bi-dimensional lattice.

* * * * *